US007376707B2

(12) United States Patent
Hachiya et al.

(10) Patent No.: US 7,376,707 B2
(45) Date of Patent: *May 20, 2008

(54) METHOD AND APPARATUS FOR AUTOMATIC SENDING OF E-MAIL AND AUTOMATIC SENDING CONTROL PROGRAM SUPPLYING MEDIUM

(75) Inventors: Kazuhiko Hachiya, Tokyo (JP); Michio Kitamura, Kanagawa (JP); Takashi Koki, Tokyo (JP); Namie Otaki, Tokyo (JP)

(73) Assignee: Sony Corporation, Tokyo (JP)

( * ) Notice: Subject to any disclaimer, the term of this patent is extended or adjusted under 35 U.S.C. 154(b) by 272 days.

This patent is subject to a terminal disclaimer.

(21) Appl. No.: 11/206,238

(22) Filed: Aug. 17, 2005

(65) Prior Publication Data

US 2006/0036700 A1    Feb. 16, 2006

Related U.S. Application Data

(60) Division of application No. 10/013,197, filed on Oct. 29, 2001, now Pat. No. 7,159,009, which is a continuation of application No. 08/992,770, filed on Dec. 17, 1997, now Pat. No. 6,760,751.

(51) Int. Cl.
G06F 15/16   (2006.01)
(52) U.S. Cl. .................... 709/206; 345/419
(58) Field of Classification Search ............ 709/205, 709/206, 218, 223; 434/350; 345/474, 419
See application file for complete search history.

(56) References Cited

U.S. PATENT DOCUMENTS 5,727,950 A * 3/1998 Cook et al. ............... 434/350
5,764,750 A * 6/1998 Chau et al. ............... 379/229
5,872,924 A * 2/1999 Nakayama et al. ........ 709/205
5,907,696 A * 5/1999 Stilwell et al. .............. 703/13
5,937,161 A * 8/1999 Mulligan et al. .......... 709/206
6,031,549 A * 2/2000 Hayes-Roth .............. 345/474

(Continued)

OTHER PUBLICATIONS

Multi-perspective Collaborative Design in Persistent Networked Virtual Environments, Leigh et al, 1996.□□www.evl.uic.edu/EVL/RESEARCH/PAPERS/LEIGH/leigh2.ps.*

(Continued)

*Primary Examiner*—Thong Vu
(74) *Attorney, Agent, or Firm*—Bell, Boyd & Lloyd LLP

(57) ABSTRACT

A method and apparatus for sending an E-mail, dispatching or delivering mail with an animated representation as if a pet were going in and out on a GUI picture simulating the inside of a room. In addition, the user can send an E-mail with a friendly feeling using an agent. By sending agent data which is updated responsive to experiences of an electronic pet as annexed papers to the E-mail, the animation appears as if an electronic pet were going in and out on a GUI picture simulating the inside of a room for dispatching or delivering a mail. The behavior of the animated pet is varied depending on the keeping environment. The electronic pet selects an illustrative sentence in keeping with the agent data from preset illustrative sentences for voluntary sending the sentence as an E-mail to a user who is a keeper or to a counterpart of past mailing of the user.

6 Claims, 54 Drawing Sheets

U.S. PATENT DOCUMENTS

| | | | | |
|---|---|---|---|---|
| 6,040,841 | A * | 3/2000 | Cohen et al. | 345/473 |
| 6,085,238 | A * | 7/2000 | Yuasa et al. | 709/223 |
| 6,421,047 | B1 * | 7/2002 | de Groot | 345/419 |
| 6,535,907 | B1 * | 3/2003 | Hachiya et al. | 709/202 |
| 6,745,236 | B1 * | 6/2004 | Hawkins et al. | 709/218 |
| 6,760,751 | B1 * | 7/2004 | Hachiya et al. | 709/206 |
| 7,159,009 | B2 * | 1/2007 | Hachiya et al. | 709/206 |
| 7,178,095 | B2 * | 2/2007 | Hachiya et al. | 715/500 |
| 2003/0005062 | A1 * | 1/2003 | Hachiya et al. | 709/206 |

OTHER PUBLICATIONS

Decision Networks for Integrating the Behaviors of ..—Trias, Chopra.. (1996) ☐☐ftp.cis.upenn.edu/pub/reich/paper8.ps.Z.*

Extending VRML to Support Collaborative Virtual Envrionments—Broll (1996) ☐☐orgwis.gmd.de/~broll/papers/CVE96.ps.gz.*

* cited by examiner

| INNER PARAMETERS | OUTER PARAMETERS |
|---|---|
| (1) MAIL COUNT | (1) POSITION |
| (2) AGE | (2) COMFORTABILITY |
| (3) SEX | (3) USER ACTION-CARESSING |
| (4) INTELLIGENCE | (4) USER ACTION-BLOWING |
| (5) BODILY POWERS | (5) GUEST ACTION-CALLED |
| (6) VIGOR | (6) GUEST ACTION-SHOWN FRIENDSHIP |
| (7) FRIENDSHIP WITH KEEPER | (7) GUEST ACTION-SHOWN HOSTILITY |
| (8) HUNGRY DEGREE | (8) GUEST ACTION-ITEM GIVEN |
| (9) HAPPINESS DEGREE | (9) GUEST ACTION-ITEM REQUESTED |
| (10) CLEANNESS DEGREE | |
| (12) BIO-RYTHM (INDEFINITE) | |
| (13) NOISE (INDEFINITE) | |
| (11) FRIENDSHIP (WITH COUNTERPART) | |
| (12) PARAM 01 | |
| (13) POSITIVE / NEGATIVE (+/−) | |
| (14) CHEERFULNESS / GLOOMINESS (+/−) | |
| (15) HEARTFULNESS / INDIFFERENCE (+/−) | |
| (16) CONCENTRATION / DIFFUSENESS (+/−) | |
| (17) CHIC / AUKWARD (+/−) | |
| (18) PARAM 02 | |
| (19) PARAM 03 | |
| (20) PARAM 04 | |
| (21) PARAM 05 | |
| (22) PARAM 06 | |
| (23) MAKEUP DEGREE | |
| (24) PARAM 07 | |
| (25) PARAM 08 | |
| (26) PARAM 09 | |
| (27) ATTRACTIVENESS | |
| (28) PARAM 10 | |
| (29) PARAM 11 | |
| (30) GOURMET | |

FIG.8

```
Content-Type : application/x-postpet
Content-Transfer-Encoding : Base64
IAAEAAgAAAAAAAAAAAAAAAAAAAAAAAAAAAPABQAAAAAAAAAAAA8AFAAEADzoH/gf/B/z9NTOIVTIJYVIhWXVNF
ROVMTFFPTk9RTURFSE5MUVBUSO5MSkpRUVIWWV1fXFpZWIFUTk9SUIFRSkRDSIBQTVNUJYIFMRVFX
Y4u52ODf4ODI5eTo5ubn4+Pl4+Lh5OPm4unf5d714t7m4ubi3+fn3t7i5ODf4ODI5uXh4+Xn4N/J
40jm4+bm4uPo40Xe5+jm5d/i60Dj5Ofg6ebm60bf3ufo2dDOINP+zxjROM7NIM7LzdPTOtHOz9HM
z9DNOc/UldfTZ9bPztbNlNPoZNPRONPPy9TWO9LMOM7OOs3WONDTOdHPIM7TzdPUO9LPz9LUzdDV
IMrROM3Qzsu4i2RTTU9MSOILUVNQUVVUVk9QTOIFOzk5RkZQSIRPWIhWUIFOTUIMTEPHROZESUZI
/kUUQkBHTOILTIVMTOhERkZQUIFGREFGAC/+LXsqLTIwLZUyMCMolSsoKSwtLS4pJIknJIigsLIow
LSOoJIYsMC4yNzAwMy4xKSwpKIwpKSUmISYoLCswLCUnJScsKz54sdPK4OPI3uXj4uTh4+Xe3+Th
4OPg3t3j4uXj4d//j4+Dj5d7k5uDj4+XJ5ODI4d/h5OXg3uHe3+Dibt7g4uLh4+Tn5OLe5OPk4Obm
4+f5+jh6N/l4++Xg3+LZztXMIMrTO87NIM/MzszVzdLSz9DTzNTVONHQzNLROTIWONPROM7VO8zS
```

FIG.9

METHOD AND APPARATUS FOR AUTOMATIC SENDING OF E-MAIL AND AUTOMATIC SENDING CONTROL PROGRAM SUPPLYING MEDIUM

RELATED APPLICATION DATA

The present invention is a divisional of U.S. patent application Ser. No. 10/013,197 filed on Oct. 29, 2001, now U.S. Pat. No. 7,159,009 which is a continuation of U.S. patent application Ser. No. 08/992,770 filed on Dec. 17, 1997, which issued as U.S. Pat. No. 6,760,751 on Jul. 6, 2004, the disclosures of which are incorporated by reference herein.

BACKGROUND

The present invention relates to a method and apparatus for automatic sending of an E-mail and an automatic sending program supplying medium, used in exchanging an E-mail between computer terminals of, for example, a personal computer, over a communication network.

As a configuration of utilizing the Internet, providing a global-scale communication network environment capable of exchanging the information between mutually spaced-apart computers, an electronic mail (E-mail) is in widespread use.

In an Internet E-mail system, mail servers are provided in a distributed fashion in each domain. The client user sends or receives an E-mail to or from a mail server of the domain to which he or she belongs.

That is, a sender states the contents he or she desires to send and accords a required address and name by a client tool for an E-mail termed a mailer (software for sending/receiving the mail) for sending the mail to the receiver.

The mail server of a domain to which the sender belongs sends the mail for transmission to a representative mail server of an organization. The representative mail server accords an address of the server/node to be arrived at next to send the address to the network, which then refers to the address to sequentially transfer the mail to the mail server to which belongs the counterpart of the communication (receiver).

The receiver recognizes the arrival of the E-mail in his or her post by various means such as display of a notice of arrival on starting the mailer so that he or she can read the sent mail.

For delivery of the E-mail, the simple mail transfer protocol (SMTP), which is the upper-order protocol of the transmission control/Internet Protocol (TCP/IP), is used as the communication protocol. Usually, the format is automatically formulated by the mailer. To the leading end of the main text of the mail is appended a header made up of rows stating a date [Date:], a name of mail sender [From:], an address [To:], a title [Subject:] or a carbon copy (blind carbon copy) [Bcc:], in accordance with SMTP.

Although the E-mail system of the Internet is based on the text (letter information: character codes), an extension format, configured for enabling handling of languages other than English or multimedia such as pictures or speech, is also defined as multipurpose Internet mail extension (MIME). That is, still-picture information, moving picture information or speech information is compressed and converted to character codes which are assembled in the MIME system into the text and sent in this form. The receiver side automatically interprets the MIME system to check the form in which the information is assembled into the text to start a viewer/player tool for displaying/reproducing the information.

Such an E-mail system in which the picture information is annexed to the E-mail for enabling sending/reception of the E-mail made up of co-existing pictures and letters is known from the Japanese Laid-open Patent Application JP-A-5-274233 assigned to the assignee of present application. With this E-mail system, a terminal keyboard or a mouse is operated for drawing or writing main text and a picture on a letter pad displayed on a CRT and the keyboard or the mouse is further operated for issuing a send command for an E-mail. It is then determined whether or the name of the receiver is stated on an uppermost row of the text. If the receiver name is determined to be entered, an E-mail header made up of the receiver's name, sender's name and the current data is formulated. It is then checked whether a picture is drawn on the letter pad. If the picture is found to have been drawn, the picture information data made up of the page information stating the page of the letter pad having the picture, the position information specifying the position of the picture and the picture title is formulated and appended to the E-mail header. The main text is then appended and sent as the E-mail.

Although the above-described E-mail system is highly convenient if one is accustomed to it, the system is unfriendly to a user sending or receiving the E-mail for the first time using a personal computer, because the system is significantly different from the usual letter or mail delivery system customarily used in everyday life. That is, the E-mail system can be utilized only after the user has learned and fully understood the operating method for the mailer as the E-mail exchanging software with the aid of a manual.

Recently, a set-top box, termed an Internet terminal, having assembled therein the Internet accessing function, is on the market, such that a user not in possession of a personal computer can easily utilize Internet services by connecting the Internet terminal to the television receiver in his or her home. However, the mailer operating method cannot be intuitively understood even by this Internet terminal user.

As the graphical user interface (GUI) which takes user-friendliness into account, there is known a desk top metaphor picture imitating the desk top which is implemented by the operating system termed a Magic Cap® developed by General Magic Inc. FIG. 1 shows a typical display of the GUI picture of Magic Cap. This GUI picture images the metaphor of the every-day tools or daily life environment using a desk top picture 300 simulating a study. On this desk top picture 300 are displayed a timepiece 301 showing the current time, an inbox 302 showing the number of received E-mails, an out-box 303 showing the number of E-mails already sent and a file cabinet 304 for keeping files. In addition, a telephone 305, an address book 306, a postcard 307 for formulating a message sent by the E-mail, a note-book 308, and a schedule memorandum 309, are displayed as being put on a desk fitted with a drawer so that these can be actuated by a pen touch.

However, although an image simulating an actual postcard is displayed in the GUI picture by Magic Cap, the process of receiving and delivering the postcard 307 or the process of arrival of the postcard from another user is not displayed, such that the user cannot intuitively comprehend the delivery process. That is, the user cannot surmise the process or the exchanging method of the E-mails or the operating method from the customary letter delivery system.

Meanwhile, there is disclosed in the Japanese Laid-Open Patent Application JP-A-3-222033, corresponding to U.S. Pat. No. 5,347,628, a technique concerning GUI which enables intuitive accessing to electronic data of a desk top metaphor picture simulating a room by a moving-picture-like icon, as an interface for a data processing device, the disclosure of which is incorporated herein by reference.

SUMMARY

An object of the present invention is, therefore, to provide a method and apparatus for automatic sending of an E-mail and an automatic sending program supplying medium, according to which not only a user can entrust his or her mail to a pet as an agent acting on his or her behalf to enable facilitated sending/reception of the E-mail by an intuitively comprehensible operation under utilization of the real-world-oriented GUI, but also the user or client can use the agent with a friendly feeling.

It is another object of the present invention to provide a method and apparatus for automatic sending of an E-mail and an automatic sending program supplying medium, according to which the function of the agent can be terminated at a time when the user has lost interest in the contents of the E-mail voluntarily sent by the agent and this effect can be intimated to the user or his or her counterpart by an E-mail addressed to the user or to his or her counterpart.

In a method and apparatus for automatic sending of an E-mail and an automatic sending program supplying medium, according to the present invention, agent parameters controlling the behavior of an agent delivering an E-mail are appended to the main mail text, having an appended mail header, responsive to a send command designating the sending of the E-mail, for sending to a counterpart of E-mailing of a user. The agent parameters are modified responsive to the contents of experiences reflecting the operating hysteresis for the agent. An E-mail of a preset illustrative sentence is sent by the agent to the user based on the agent parameters. Thus, the user (client) can send an E-mail by an intuitively comprehensible simple operation by the agent acting on his or her behalf by exploiting the real-world-oriented GUI, while the user (client) can use the agent with an amicable feeling for the agent.

In an alternative method and apparatus for automatic sending of an E-mail and an automatic sending program supplying medium, according to the present invention, agent parameters controlling the behavior of an agent delivering an E-mail are appended to the main mail text, having an appended mail header, responsive to a sending command designating the sending of the E-mail, for sending to a counterpart of E-mailing of a user. The agent parameters are modified responsive to the contents of experiences reflecting the agent's operating hysteresis. An E-mail of a preset illustrative sentence is sent by the agent to a counterpart of E-mailing of the user based on the agent parameters. Thus, the user (client) can send an E-mail by an intuitively comprehensible simple operation by the agent acting on his or her behalf by exploiting the real-world-oriented GUI, while the counterpart of E-mailing of the user can respond to the mail with an amicable feeling for the agent, thus assuring mail exchange with a friendly feeling.

In a still alternative method and apparatus for automatic sending of an E-mail and an automatic sending program supplying medium, according to the present invention, agent parameters controlling the behavior of an agent delivering an E-mail are appended to the main mail text, having an appended mail header, responsive to a sending command designating the sending of the E-mail, for sending to a counterpart of E-mailing of a user. The agent parameters are modified responsive to the contents of experiences reflecting the operating hysteresis for the agent. An E-mail of a preset illustrative sentence is sent by the agent to the user or to a counterpart of E-mailing of the user based on the agent parameters. Thus, both the sender and the receiver of the E-mail can have a common consciousness of keeping electronic pets, thus assuring mail exchange with a friendly feeling.

According to the present invention, the process of exchanging an E-mail is represented as an agent behavior simulating the letter dispatching and delivery in everyday life, thus enabling the function or the operating procedure to be surmised easily, such that even a beginner can learn and utilize E-mailing easily. By the sending side sending agent data updated responsive to the experiences of the electronic pet as annexed papers to the E-mail, and by the receiving side automatically returning only pet data, the E-mail can be sent or received with animated display as though the pet were going in and out on a GUI picture simulating the insides of both the sender's room and the receiver's room. In addition, the electronic pet, displayed by animation, can be virtually kept. That is, by updating the agent data determining the character or the behavior of the pet responsive to mouse actuation by the user, such as caressing or serving refreshments, and by varying the pet behavior responsive to the keeping environment, the electronic pet, displayed by animation, can be virtually kept. In addition, the electronic pet can select one of the preset illustrative sentences in keeping with the agent data to send the selected sentence as an E-mail to the user or to his or her E-mailing counterpart.

By exchanging the E-mail by the electronic pet virtually kept on the GUI picture simulating the insides of both the sender's room and the receiver's room, both the sender and the receiver can have a common consciousness of keeping pets thus assuring E-mailing amicable feeling.

Moreover, by having agent picture data on both the user's computer and the receiver's computer, and by actually sending agent parameters controlling the agent's behavior, the result as if the picture data of the agent were being sent is realized. By sending the agent parameters instead of the picture data, the user connection time can be reduced, such that, for a dial-up user, Internet connection charges and telephone charges can be saved. Moreover, the use of resources of the Internet in their entirety can also be reduced because a smaller volume of exchanged data suffices.

Additional features and advantages of the present invention are described in, and will be apparent from, the following Detailed Description of the Invention and the Figures.

Additional features and advantages are described herein, and will be apparent from, the following Detailed Description and the figures.

BRIEF DESCRIPTION OF THE FIGURES

FIG. 8 shows the type of an agent parameter annexed to the main text of an E-mail sent by the PostPet.

FIG. 9 shows an example of an agent parameter annexed to the main text of an E-mail sent by the PostPet.

DETAILED DESCRIPTION

Figure 1:
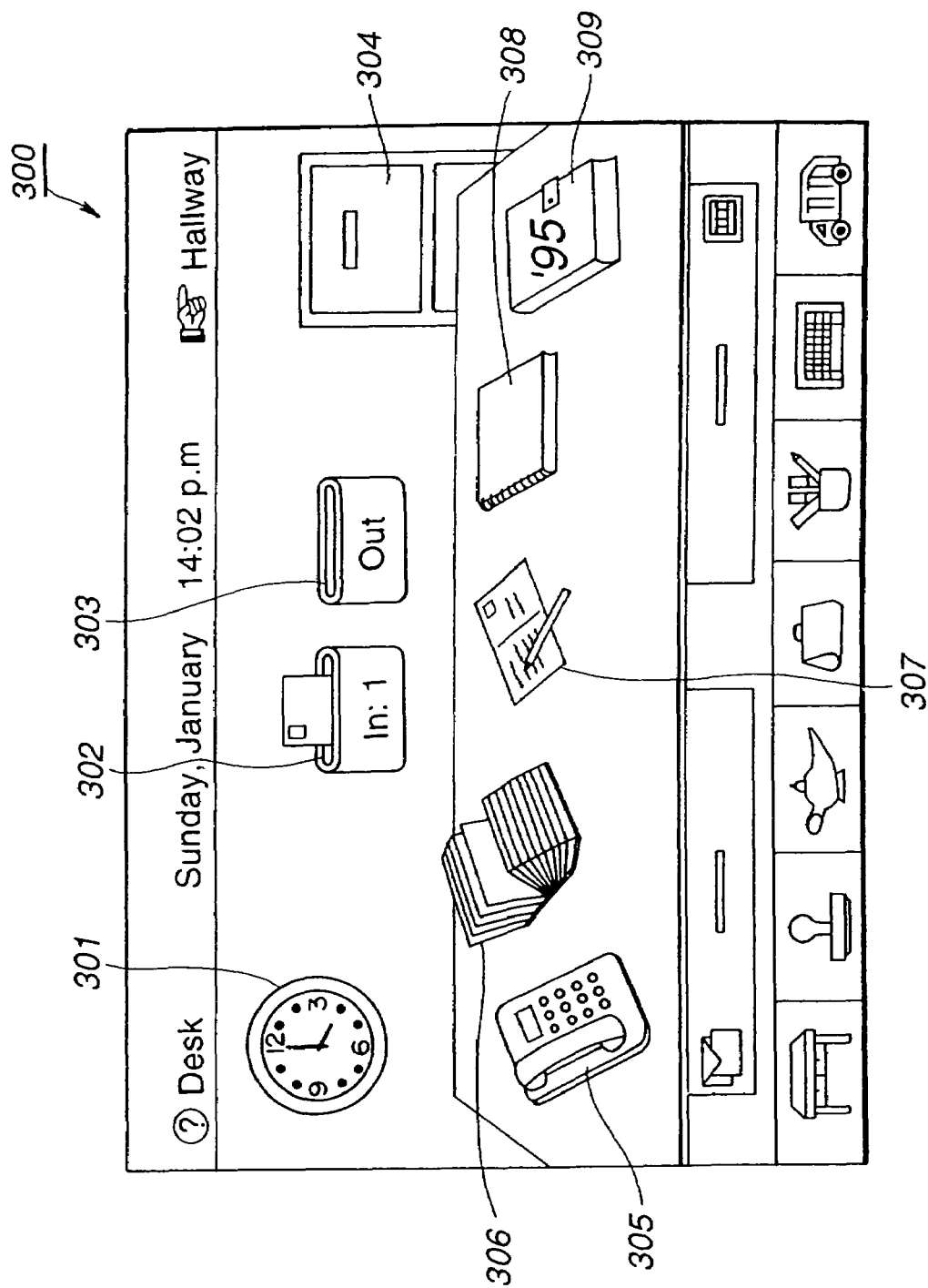
FIG. 1 shows a display example of the GUI picture of Magic Cap®.
Figure 2:
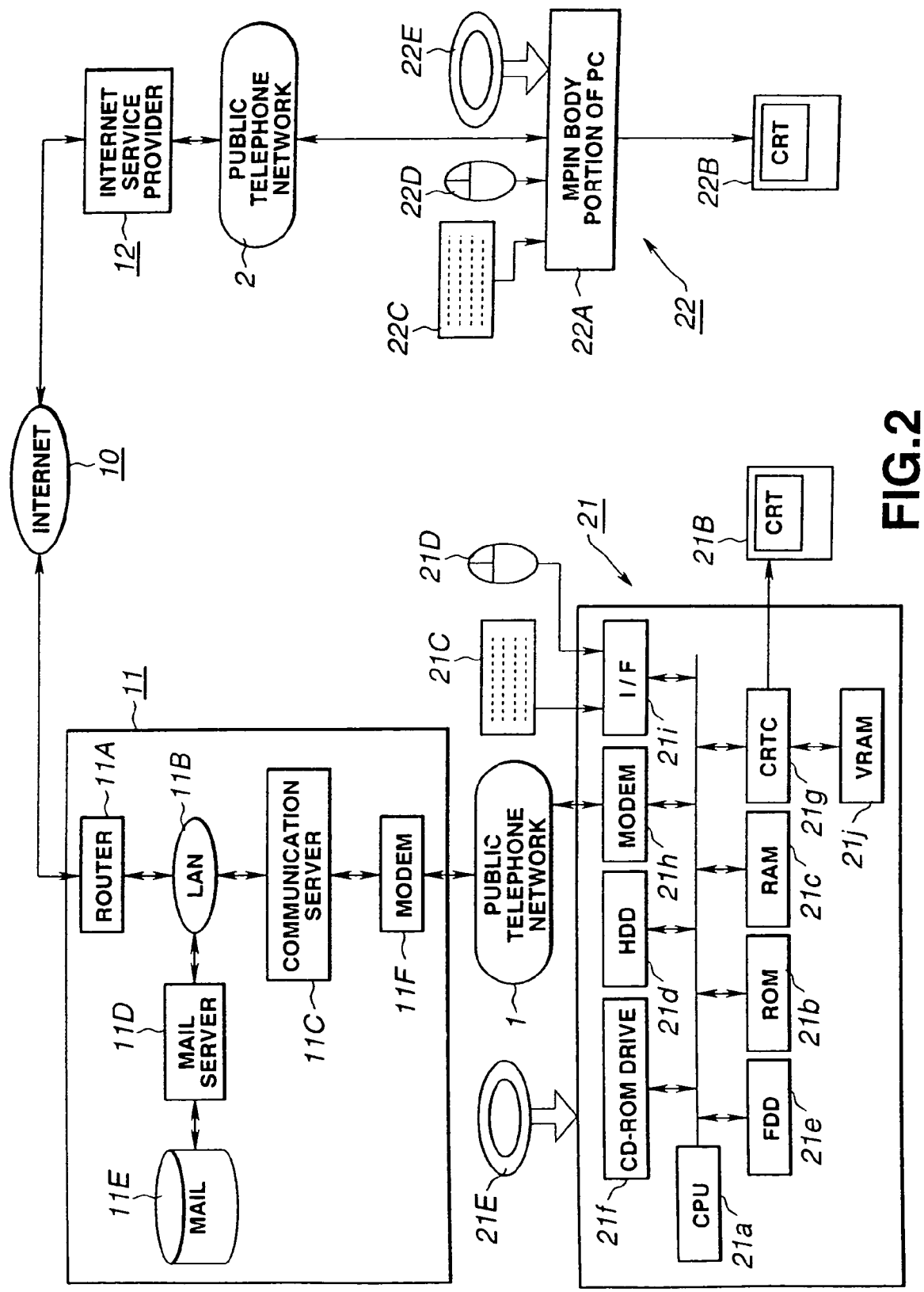
FIG. 2 is a schematic block diagram showing an E-mail system according to the present invention.

As shown in FIG. 2, the present invention is applied to an electronic mail (E-mail) system in which an E-mail is exchanged between plural personal computers 21, 22 connected respectively to Internet 10 via public telephone switched networks 1, 2 and via Internet service providers 11, 12.

The Internet service provider 11 is constituted by a router 11A, a communication server 11 C and a mail server 11 D interconnected by Local. Area Network (LAN) 11B. There is provided in the mail server 11D a mail spool 11E constituted by a hard disc drive for transient storage of the E-mail. The communication server 11C includes a modem 11F for connection over a public telephone switched network 1 to the personal computer 21. The Internet service provider 11 transfers the E-mail, sent from a personal computer 21 of a client user connected by dial-up IP over the public telephone switched network 1 to the communication server 11C, to a mail server 11 D, which then transfers this transferred E-mail over the Internet 10 to a mail server (not shown) of an Internet service provider 12 of the domain to which the receiver (counterpart of communication) belongs. When an E-mail addressed to a client user over the Internet 10 is transferred to the Internet service provider 11, the latter stores the mail in a mail spool 11E to transfer the mail to the client user whenever a transfer request is made from the valid client user. Meanwhile, other Internet service providers 12, etc., also have E-mail storage and transferring function similar to that of the Internet service provider 11.

The personal computer 21 of the client user of the Internet service provider 11 includes a main body portion 21A, a CRT display device 21B, a keyboard 21C and a mouse 21D. The main body portion 21A is provided with a central processing unit (CPU) 21a, a read-only memory (ROM) 21b, a random-access memory (RAM) 21c, a hard disc drive (HDD) 21d, a floppy-disc drive (FDD) 21e, a CD-ROM drive 21f, a cathode ray tube controller (CRTC) as a display controller 21g, a modem 21h, an interfacing (I/F) unit 21i and a video RAM 21j. The CRT display device 21B is connected to the display controller 21g, while the keyboard 21C and the mouse 21D are connected to the interfacing unit 21i.

The personal computer 21 is connected via the main body portion 21A to the public telephone switched network 1.

The personal computer 21 operates as a mailer by reading out and installing an E-mail sending/receiving program stored in the CD-ROM drive 21E. Meanwhile, the E-mail sending/receiving program may also be downloaded and installed from, for example, the following URL http://www.sonet.or.p./postpst/index.html of a World Wide Web (WWW) server on the Internet 10 managed by SONY COMMUNICATION NETWORK KK over the Internet service provider 11 and the public telephone switched network 1.

Therefore, the program purveying medium within the scope of the present invention means not only the recording medium such as CD-ROM 21E but also a medium in the broad sense of the term including Internet or digital satellite data broadcast.

In the present embodiment, other personal computers 22 also operate as a mailer by having installed therein the same E-mail sending/receiving programs as the above personal computer 21.

If, in the personal computer 21 having installed therein the above-mentioned E-mail sending/receiving program, the mailer is started, the CPU 21a generates bit map data corresponding to the graphical user interface (GUI) picture simulating a room to write the bit map data on the video RAM 21j of the display controller 21g for causing the display controller 21g to display the GUI picture 100 of FIG. 2 on the screen of the display device 21B.

For superposed display of a pointing cursor 101 on the GUI picture 100, the CPU 21a writes the bit map data of the pointing cursor 101 at a preset position of the video RAM 21j. This displays the pointing cursor 101 at a position specified by the mouse 21D on the GUI picture 100 displayed on the screen of the display device 21B.

On the top of the GUI picture 100, its title 102 is displayed. On the GUI picture 100 shown in FIG. 2 is displayed 'PostPet (Room)' as a title 102. Meanwhile, the post pet and the post pet are trademarks of a mailer which is an Internet E-mail sending/receiving program purveyed by SONY COMMUNICATION NETWORK KK.

For superposed display on the GUI picture 100 of a post pet 103 simulating a bear doll and a postman 104 simulating a robot doll as agents for performing E-mail sending/reception, the CPU 21e writes bit map data of the post pet 103 and the postman 104 at preset positions on the RAM 21j in superposition on the bit map data corresponding to the GUI picture 100. This displays the post pet 103 and the postman 104 on the GUI screen 100.

Figure 4:
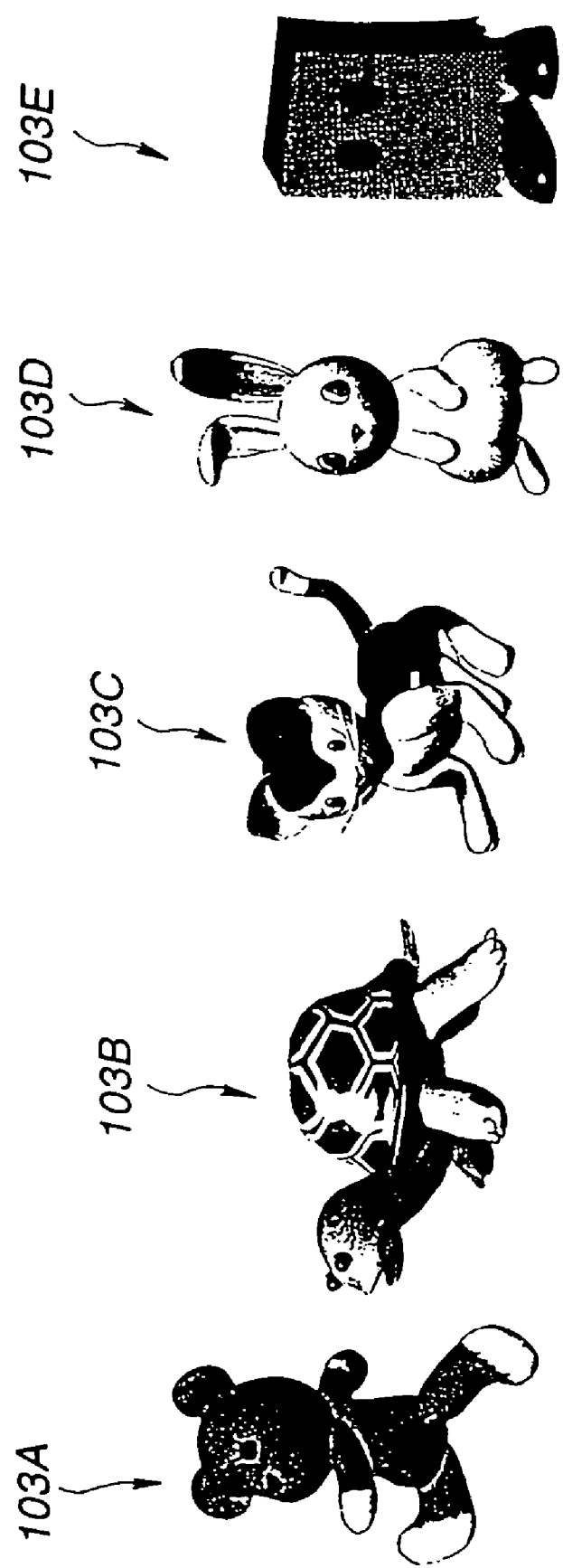
FIG. 4 shows the type of a PostPet prepared in the mailer.

As characters of the post pet 103, there are provided teddy bear (Momo) 103 simulating a bear, a tortoise (Sumiko) 103B, a hybrid cat (Furo) 103C, a mini-rabbit (Mippi) 103D and a Hatena-kun 103E, as shown, for example in FIG. 4. One of these excluding Hatena-kun 103E can be registered and used as the post pet 103, as an agent. The post pet 103 has its behavior determined by agent parameters varied by the learning function as later explained.

Figure 3:
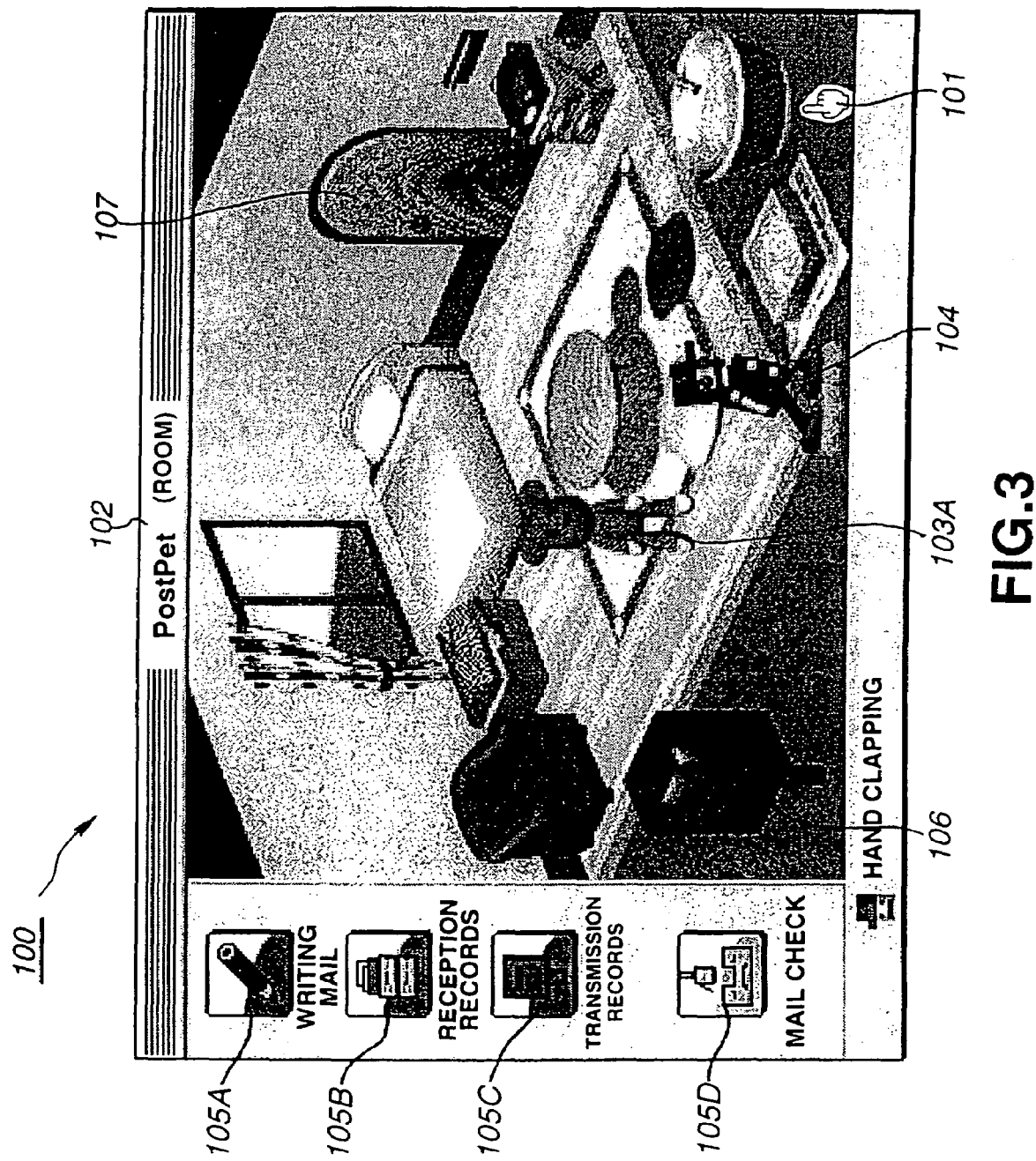
FIG. 3 shows a GUI picture of 'PostPet (Room)' displayed on starting a mailer installed on a personal computer with the E-mail system.

On the left-side portion of the GUI picture 100 of the 'PostPet (Room)' shown in FIG. 3 are displayed a mail writing icon 105A, a reception list icon 105B, a sending list icon 105C for commanding display of a GUI picture of a sending list and a mail check icon 105D for commanding the connection.

The user operates the mouse 21D for moving the pointing cursor 101 on the mail writing icon 105A on the GUI picture of the above-mentioned 'PostPet (Room)' to click the mail writing icon 105A. This causes the CPU 21a to write the bit map data, corresponding to the GUI picture 100 of the 'PostPet (Room)' and a 'Write a Mail' GUI picture 110 superposed thereon, at a preset position on the video RAM 21j, such that the GUI picture 100 of the 'PostPet (Room)' and the 'Write a Mail' GUI picture 110 are displayed by multiple window representation on the screen of the display device 21B.

On top of the GUI picture 110 is displayed 'Write a Mail' as a title 112. The upper and lower halves of the 'Write a Mail' GUI picture 110 represent a first display area 113 for displaying the contents of the mail header and a second display area 114 for displaying the mail contents, respectively. In the first display area 113, there is displayed the header information, such as the address [To:], name of mail sender [From:], title [Subject:], carbon copy [Color conversion:] or attachment [Attachment:], entered by actuation of the keyboard 2 1 C by the user are displayed. In the first display area 113, an icon 115A is displayed for handing over to a pet for instructing mail dispatch by the post pet 103 and an icon 115B for handing over to the postman 104 for instructing mail dispatch by the postman 104.

In the second display area 114 is displayed the main text of the mail entered upon keyboard actuation by the user.

If the user actuates the mouse 21D to shift the pointing cursor 101 over the icon 115A of handing over to the pet on the GUI picture 110 of 'Writing a Mail' and clicks a mouse button, the CPU 21a executes processing steps SP20 to SP27 of the send subroutine processing to send the pet mail, as will be explained below with reference to FIG. 11e.

Specifically, the CPU 21a formulates data of an E-mail composed of a main text 202 with a mail header 201 added thereto and an agent parameter 203 determining the behavior of the post pet 103 attached to the main text, and sends the data as pet mail to the receiver. The agent parameter 203 is each made up of 4-byte data of the sending data information 203A specifying the mail sending date, mail life information 203B specifying whether or not the receiver has to modify the mail to return it to the sender, serial number information 203C specifying the number of mails handled so far by the post pet, and the post pet parameter information 203D, such as the information of the environment, stimulus or desire information of the post pet.

The post pet parameter information 203D is made up of the inner information and the outer information, as shown in FIG. 8. The inner information is made up of, for example, mail count, age, sex, intelligence, vigor, friendship (with the keeper), hunger, happiness, cleanliness, bio-rhythm (indefinite element), noise (indefinite element), friendship (with the counterpart), positiveness/negativeness (+/−), cheerfulness/gloominess (+/−), gentleness/coldness (+/−), concentration/diffuseness (+/−), fashionability/rusticity, fashionability, attractiveness or taste for gourmet. The outer parameters are made up of, for example, position, comfortableness of a room, user action-number of times of hitting, guest action-called, guest action-shown friendship, guest action-shown hostility, guest action-giving items and guest action-demanding items. These parameters are entered into the feeling unit as later explained to start the behavior unit to determine the behavior of the post pet 10.

The above-mentioned agent parameters 203 are converted into Base 64 format employing letters A to Z, a to z and 0 to 9 in accordance with the Multipurpose Internet Mail Extension (MIME) of the Internet mail. FIG. 8 shows an example of the agent parameters 203 annexed to the main text of the mail 202. The MIME provides two types of encoding methods. In the Base 64 stated in Request for Comments (RFC) 1512, 3 bytes are divided into four equal parts to narrow the code width to accommodate the values specified by the bytes in 64 numerical figures of from 0 to 63 to which letter codes of A to Z, a to z and 0 to 9 are accorded. Further details on RFC is disclosed in D. Corner, "Internet working with ICP/IP TCP/IP-470154-2, 025.

If the user actuates the mouse 21D to move the pointing cursor 101 on the icon 115B of handing over the GUI picture 110 of 'Writing a Mail' to the postman to click the mouse button, the CPU 21a executes the processing from SP29 to SP33 in the sending subroutine processing as later explained with reference to FIG. 10 in order to send the usual mail.

That is, the CPU 21a simply formulates data of an E-mail made up of the main text 202 of the mail added to with the mail header 201 and sends it to the counterpart as the usual E-mail.

Referring to FIGS. 9 to 12, the operation of the personal computer 21 having installed therein the above-mentioned E-mail sending/receiving program, is hereinafter explained.

First, steps SP 1 to SP 13 of the general flowchart, comprehensively showing the entire operation of FIG. 9, is explained.

Figure 34:
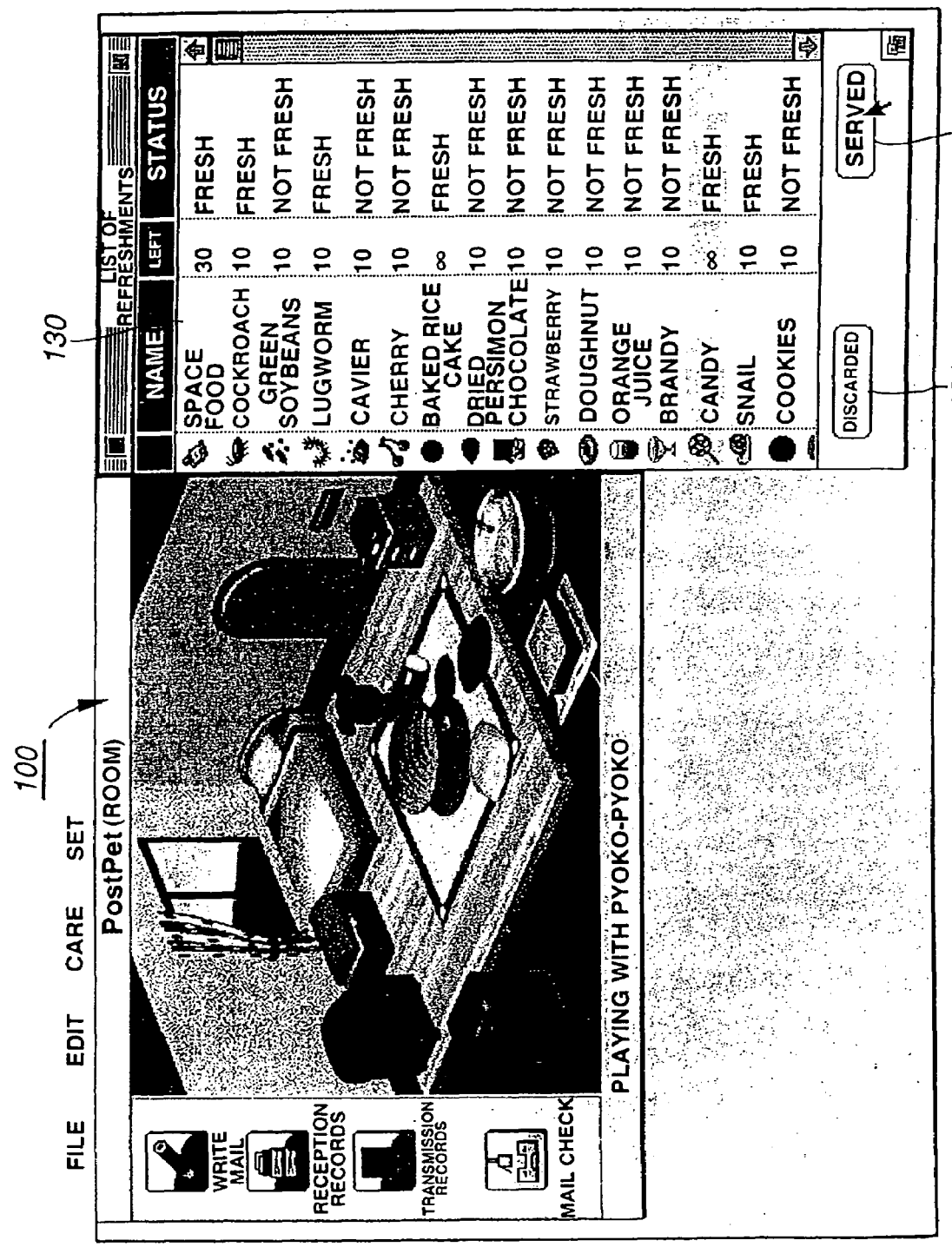
FIG. 34 shows the state in which an item 'refreshment' of the pulldown menu on the GUI picture of the 'PostPet (Room)' is selected for opening the window.

At step SP 1 of FIG. 9, it is determined whether the operation by the user is the operation on a pet owned by no one other than the user. That is, if the mouse 21D is actuated by the user such that the operation of superposing the pointing cursor 101 shown in FIG. 3 on the post pet 103 (on the teddy-bear 103A in the case of FIG. 3), shifting the mouse 21D left or right or clicking the mouse button is carried out, or, if 'wash' or 'refreshments' are selected from the looking-after pulldown menu, as shown in FIG. 34, such that the operation of looking after the post pet 103 is carried out, these operations by the user are judged to be the operation for his or her own pet (the pet owned by the user). In this case, the processing transfers to step SP2, otherwise, the processing transfers to step SP4.

At step SP2, the agent parameters of the user's own pet, read out on startup of the E-mail sending/receiving program from HDD 21d and stored in RAM 21c, are updated. The processing for updating the agent parameters will be explained later in detail with reference to FIG. 13.

At the next step SP3, the processing for animated representation of the behavior of the user's own pet in association with the updated agent parameters is executed before processing reverts to step SP1.

If, at step SP1, the operations are judged as not being the operations on the user's own pet such that the processing transfers to step SP4, it is determined at this step SP4 whether the mail writing icon 105A has been clicked. If the result of the determination at step SP4 is affirmative, processing transfers to step SP5, and, otherwise, to step SP7.

Figure 5:
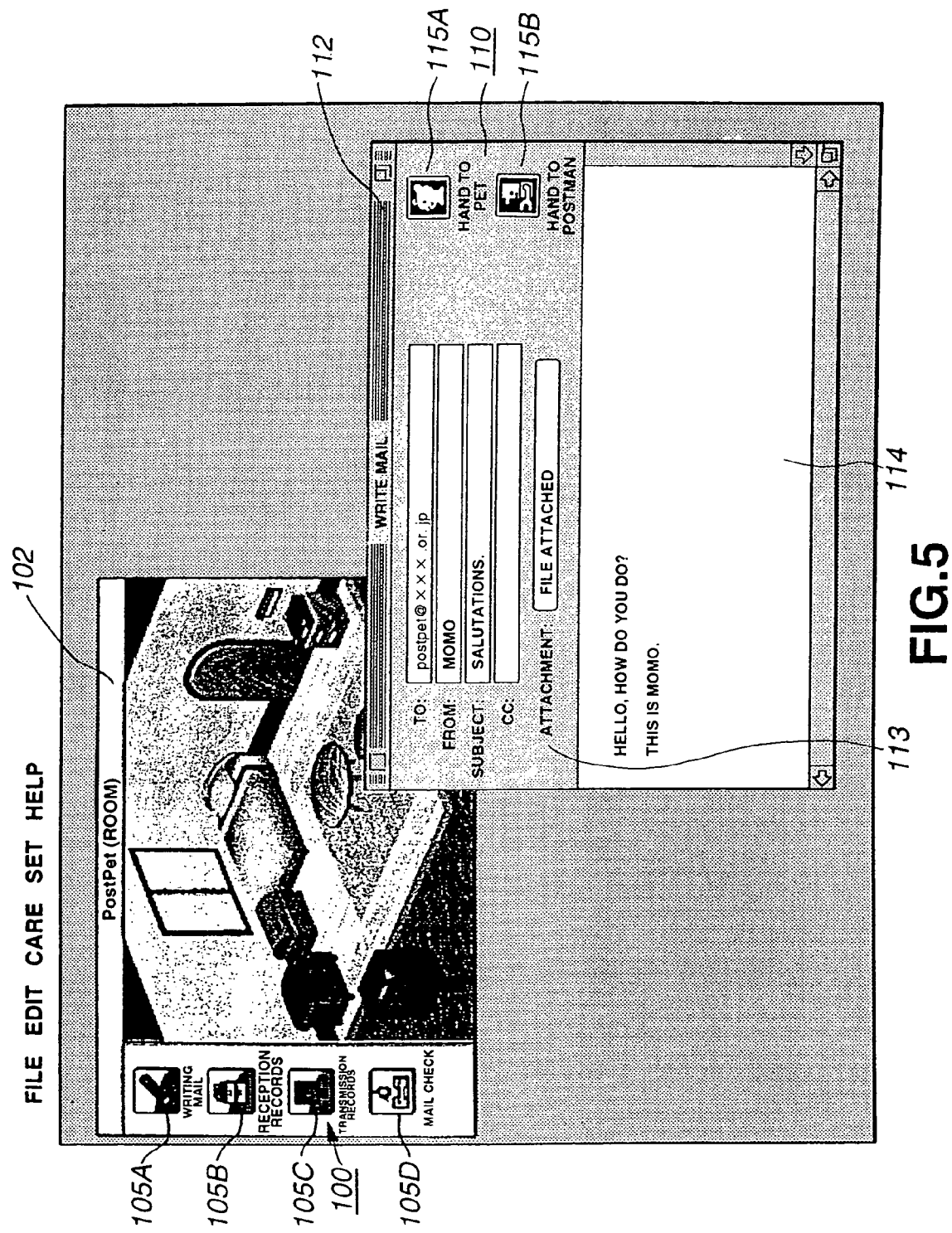
FIG. 5 shows a GUI picture 'Write a Mail' represented on the mailer.

At step SP5, the sub-routine of entering the header of the E-mail to be sent or the main text is executed. First, the GUI picture 110 of 'Writing a Mail' shown in FIG. 5 is displayed, after which the E-mail header or the main text is formulated in accordance with the text inputting command by the user before processing transfers to step SP6.

Figure 11:
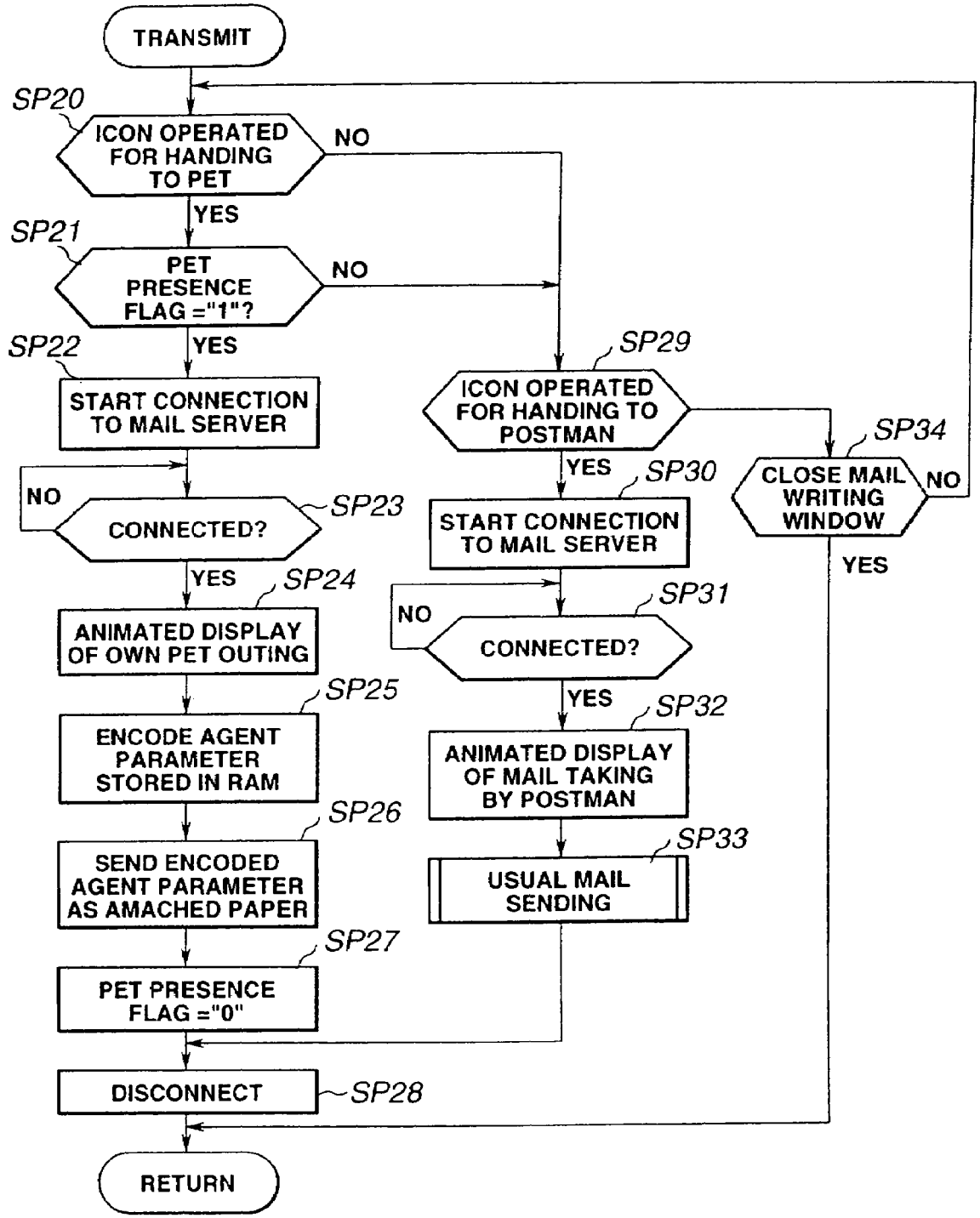
FIG. 11 is a flowchart showing the contents of send processing by the mailer.

At step SP6, the sending subroutine explained subsequently with reference to FIG. 11 is executed before processing reverts to step SP 1.

Figure 6:
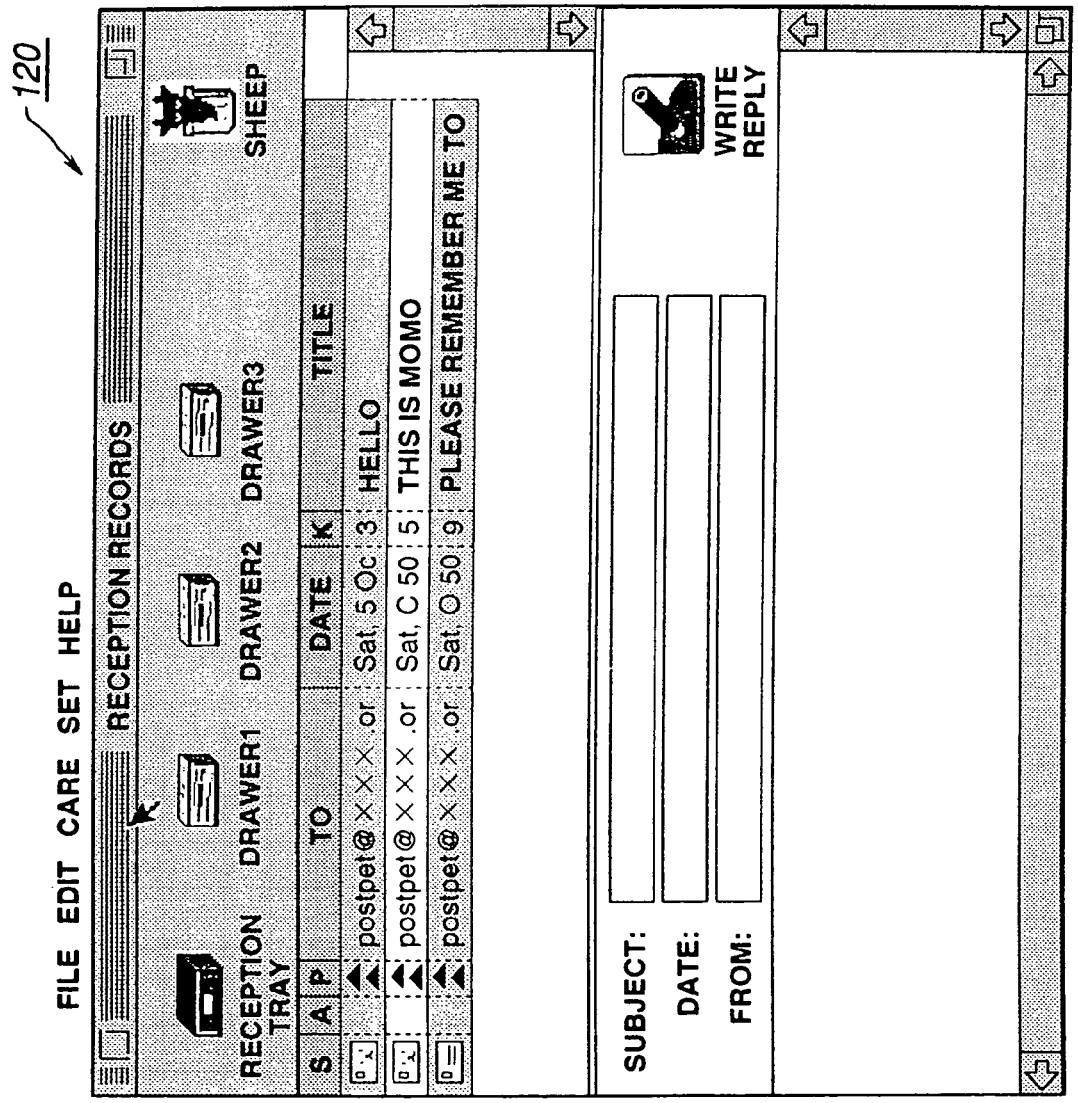
FIG. 6 shows a GUI picture of a 'reception list' represented on the mailer.
Figure 7:
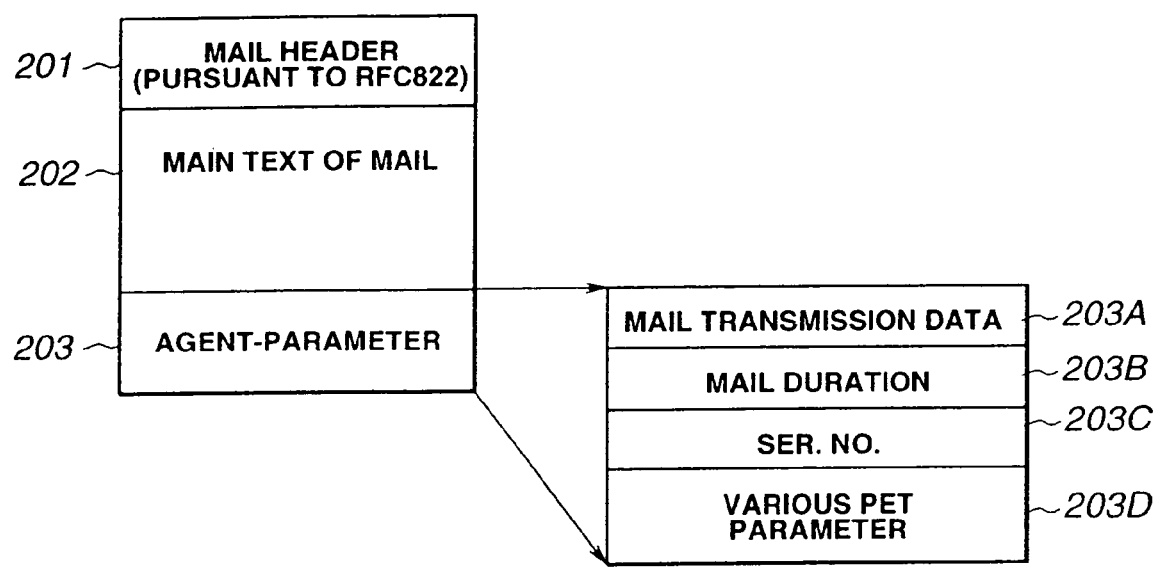
FIG. 7 shows the structure of an E-mail sent by the PostPet.

At step SP7, it is determined whether the reception list icon 105B has been clicked. If the result of the determination is affirmative, processing transfers to step SP8, or otherwise, to step SP9. At step SP8, the reception list display subroutine for displaying a GUI picture 120 of the 'reception list' shown in FIG. 6 is executed before processing reverts to step SP 1.

At step SP9, it is determined whether or not the sending list 105C has been clicked. If the result of the determination is affirmative, the processing transfers to step SP10, or otherwise, to step SP11. At step SP10, the reception list displaying subroutine for displaying the 'sending list' GUI picture (not shown) is executed, before processing reverts to step SP1.

Figure 12:
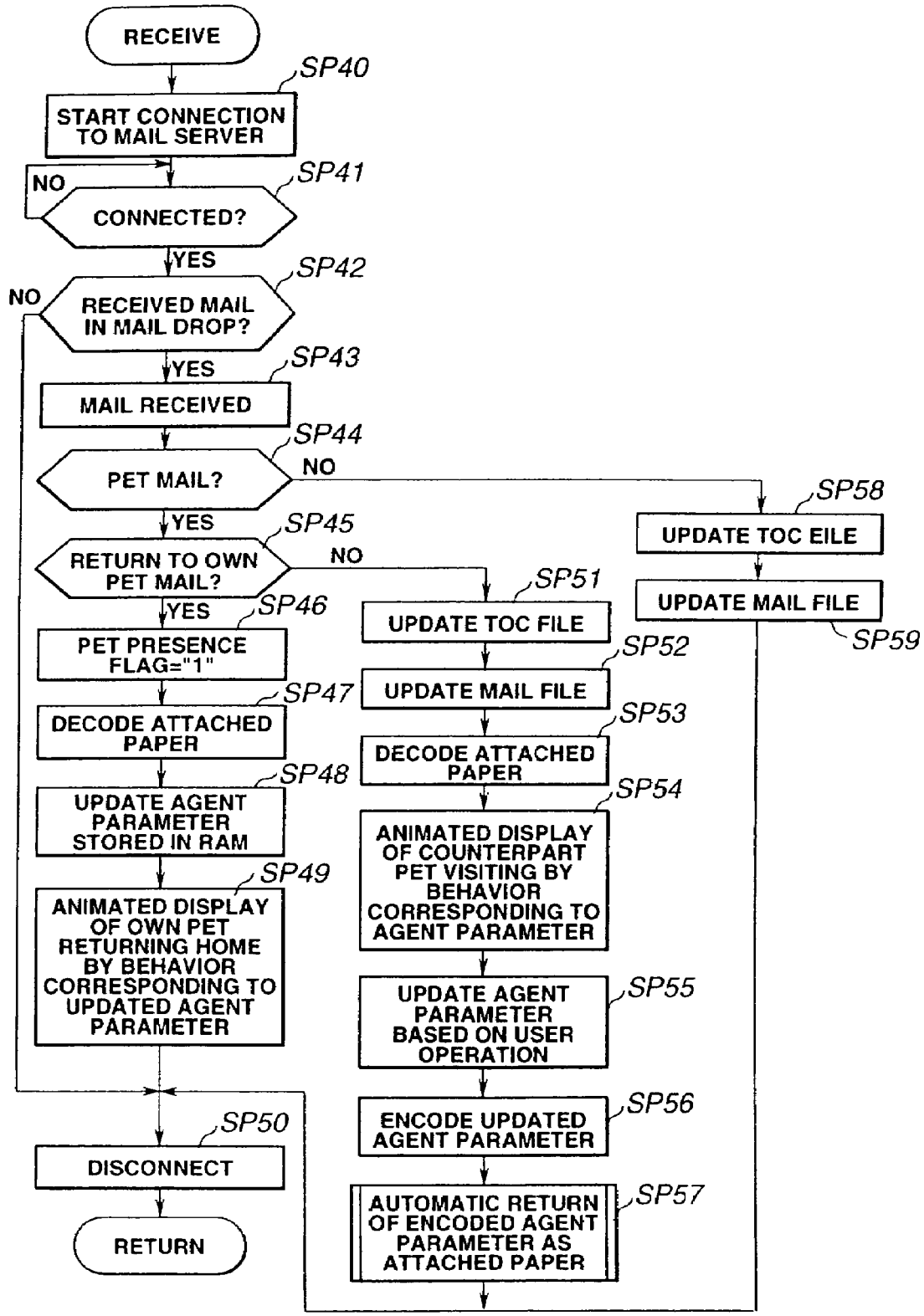
FIG. 12 is a flowchart showing the contents of receive processing by the mailer.

At step SP11, it is determined whether the mail check icon 105D has been clicked. If the result of the determination is affirmative, processing transfers to step SP12, or otherwise, to step SP13. At step SP 12, the reception subroutine explained subsequently with reference to FIG. 12 is executed before processing reverts to step SP1. At step SP13, other processing operations are executed before processing reverts to step SP1.

Next, the steps SP20 to SP33 of the flowchart of the sending subroutine processing of FIG. 11 is explained.

Figure 20:
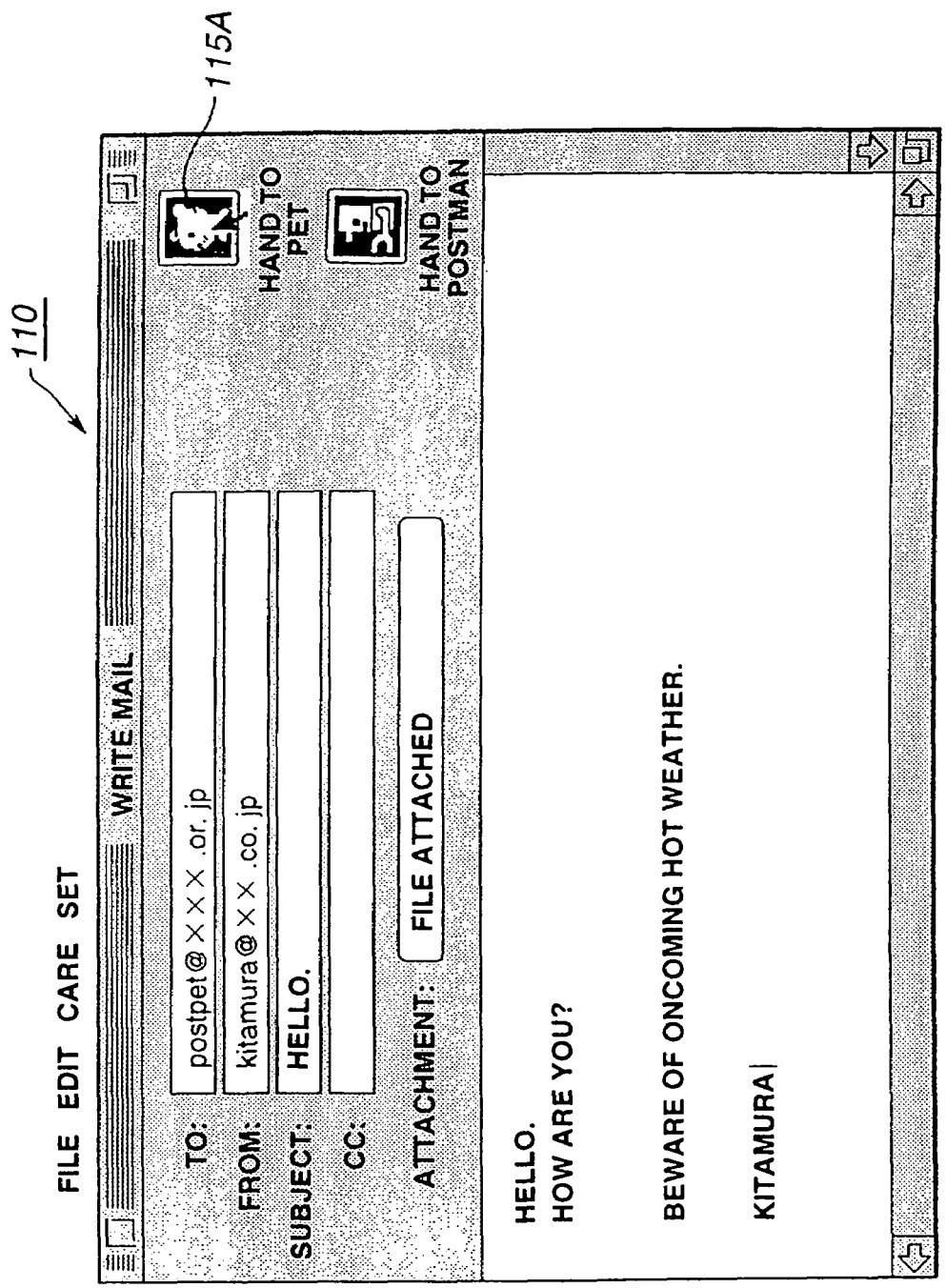
FIG. 20 shows the state of commanding mail send procedure by the PostPet on the GUI picture 'Write a Mail' represented by the mailer.

If the user actuates the mouse 21D to move the pointing cursor 101 on the icon 115A of handing over to the pet on the GUI picture 110 of 'Write a Mail' and clicks the mouse button, as shown in FIG. 20, it is determined that the icon 115A of handing over to the pet has been operated, such that processing transfers from step SP20 to step SP21 to determine whether a pet-at-home flag stored in the RAM 21c is '1'. If the user's pet is at home, that is, if the pet-at-home flag is '1', the subsequent steps SP22 to SP27 are executed to send the pet mail.

In other words, E-mail data composed of the mail main text 202 with the mail header 201 appended thereto and the agent parameters 203 determining the behavior of the post pet 103, appended as annexed papers, is formulated and sent as a pet mail to a counterpart of communication.

In this case, the pet mail can be sent only when the pet-at-home flag is '1', that is if the user's pet is at home.

First, if a connection is made at step SP22 to the mail server 11D of the service provider 11 for requesting mail transfer in accordance with the transfer protocol of the Simple Mail Transfer Protocol (SMTP), and connection is judged at the next step SP23 to have been made, the processing transfers to step SP24. At this step SP24, the user's own pet (teddy-bear 103A shown in FIG. 3) deems the E-mail of the keeper as being a letter, and animation display is made such that the pet opens a door 107 for outing for recovering the letter posted in a mail post 106 for delivery to the receiver. At the next step SP25, the agent parameters of the user's pet, stored in the RAM 21C, is encoded by the encoding method prescribed in Base 64 of MIME. At the next step SP26, the encoded agent parameters are annexed to the main text 202 as annexed papers. This pet mail is sent to the mail server 11D.

At step SP27, the pet-at-home flag stored in the RAM 21c, is set to '0', that is, to absence, before processing transfers to step SP28 to break the connection to the mail server 11D) to complete a series of the sending subroutine processing. Then, the processing reverts to step SP1 of FIG. 10.

On the other hand, if the user operates the mouse 21D to move the pointing cursor 101 on the icon 115b of handing over to the postman on the GUI picture 110 of 'Write a Mail' to click the mouse button, it is judged that the icon 115B of handing over to the postman has been actuated. Thus, the processing transfers from step SP20 through step SP29 to step SP30 so that the processing from steps SP30 to SP33 is executed to send the usual E-mail.

That is, E-mail data composed simply of the mail main text 202 having appended thereto the mail header 201 is formulated and sent to the counterpart as the usual E-mail.

First, at step SP30, a connection is made to the mail server 11D of the service provider 11 for requesting a mail transfer based on the SMTP transfer protocol. If, at the next step SP31, the connection is judged to have been completed, the processing transfers to step SP32 to display an animation in which the postman 104 deems the E-mail of the keeper as being a letter to recover the letter posted in the mail post 106 to go out for mail delivery, as shown in FIGS. 15 to 19. At the next step SP33, the usual E-mail is sent to the mail server 11D), after which, the processing transfers to step SP28 to cancel the connection to the mail server 11D to complete a series of the send subroutine operations to return to the step SP1 of FIG. 10.

Figure 10:
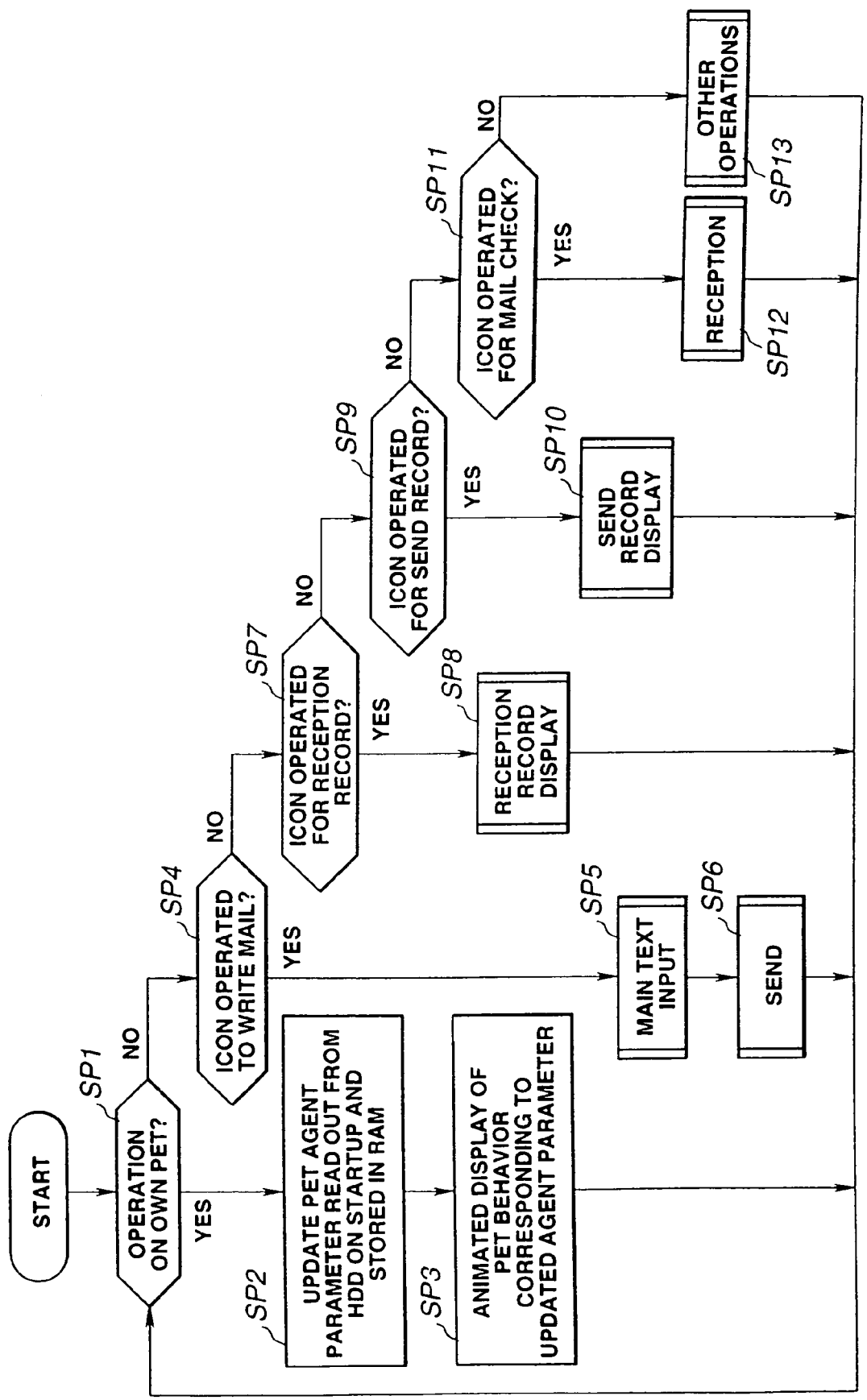
FIG. 10 is a flowchart showing the entire processing function of the mailer.

If neither the icon 115A for handing over to the pet nor the icon 115B of handing over to the postman has been operated at steps SP20 and SP29, with the closure box on the upper right side of the GUI picture 110 of 'Write a Mail' being clicked, the mail writing window is judged at step SP34 to be closed, such that processing reverts to step SP1 of FIG. 10 without executing the above-mentioned sending subroutine.

Next, steps SP40 to SP59 of the reception subroutine of FIG. 12 is explained.

First, at step SP40, connection is made to the mail server 11D of the service provider 11, based on the communication protocol of the Post Office Protocol Version 3 (POP3) which is the upper order protocol of TCP/IP. If the connection has been judged at the next step SP41 to have been completed, the processing transfers to step SP42 to make an inquiry as to whether there is a mail addressed to the user in a mail drop of the mail server 11D. This personal mail directory is an area for arriving mail for personal use, usually termed a mail drop, and has the function similar to a private box of a post office.

If it is judged at step SP42 that there is an arriving mail, the processing transfers to step SP43. If it is judged that there is no arriving mail, the processing transfers to step SP50 to cancel the connection to the mail server 11D to terminate a series of the reception subroutine operations before the processing reverts to step SP I of FIG. 10.

If it is determined at step SP42 that there is an arriving mail in the mail drop, the E-mail addressed to the user is received at step SP43 from the mail server 11D. At the next step SP44, it is determined, based on data of the mail header 201 of the E-mail addressed to the user, whether the E-mail is the pet mail. If the received E-mail is judged at step SP44 to be the pet mail, the processing transfers to step SP45 to determine whether the mail received is the return mail to the pet mail dispatched by the user.

If the pet mail sent by the user is automatically reception processed by the receiver, the mail text 202 is deleted and a part of the sent pet mail composed of the mail header 201 and the agent parameters annexed thereto as the annexed papers is returned as the return mail.

If the received pet mail is judged at step SP45 to be the return mail to the pet mail dispatched by the user, the processing transfers to step SP46 to set the pet-at-home flag stored in the RAM 21 c to '1', that is to 'at home', before the processing transfers to step SP47 to decode the annexed papers encoded by the encoding method prescribed by the Base 64 of MIME.

At the next step SP48, the agent parameters of the user's pet stored in the RAM 21c are updated based on the decoded agent parameters. At the next step SP49, the processing of displaying an animation in which the user's pet opens the door to return home with the behavior corresponding to the updated agent parameters is executed.

Then, the processing transfers to step SP50 to cancel the connection to the mail server 111) to complete a series of reception subroutine operations before the processing reverts to step SP1 of FIG. 10.

Conversely, if it is judged at step SP45 that the received pet mail is not the return mail to the user's pet mail, the processing transfers to step SP51 to execute the updating processing accompanying the addition of newly arriving mail to the Table-of-Contents (TOC) file.

The TOC file is a reception list file stored on a client's local disc (HDD 21d), and is a file composed of an extracted portion of the mail header 201. Specifically, the TOC file is made up of TO, FROM, CC, Subject, priorities, attachment flags indicating the presence or absence of the annexed papers, sort flags indicating whether the mail is a pet mail, and addresses in the local disc of the mail main text 202 corresponding to the mail header 201.

When the reception list is first opened, a list of received mails is displayed. This list is formulated from the TOC file. If a mail is designated from the list, the main text 202 of the corresponding address is sliced from the mail file (collective file of the main texts of the mail 202).

For example, if the TOC file reads: FROM: aaaaaaipd.sony.co.jp, Subject:Patent for POS:Pet . . . . . . . . . . . . . . . . . Address (from 1100 to 1120), and the main text of the mail 202 is to be displayed, the text corresponding to addresses 1100 to 1120 of the mail file is sliced and displayed.

Next, at step SP52, the update processing accompanying the addition of newly arriving mail of the mail file is executed. After updating the mail file having stored therein the main text 202, processing transfers to step SP53 to decode the annexed papers encoded by the encoding method prescribed by the Base 64 of MIME.

At the next step SP54, the processing of displaying the animation in which the pet of the counterpart of communication (teddy-bear 103A in FIGS. 25 to 28) opens the door 107 to make a call and stays for a preset time to then open the door to return home. If, during the time the counterpart pet stays indoors, the user operates the mouse 21D to superpose the pointing cursor 101 over the counterpart pet to move the mouse 21D left and right or to click the mouse button, the agent parameters of the counterpart pet are updated at step SP55 based on the actuation by the user. Next, at step SP56, the agent parameters of the counterpart pet are encoded by the encoding method prescribed by Base 64 of MIME.

At the next step SP57, the encoded agent parameters are annexed as annexed papers to the mail header 201. The pet mail, thus formulated, is automatically returned to the mail server 11D).

Then, the processing transfers to step SP50 to cancel the connection to the mail server 11D to complete a series of the reception subroutine operations before the processing reverts to step SP1 of FIG. 9.

If it is judged at step SP44, based on the data of the mail header 201 of the received E-mail addressed to the user, that the received E-mail is not the pet mail, but rather is a usual E-mail, the processing transfers to step SP58 to update the TOC file. Then, the processing transfers to step SP50 to cancel the connection to the mail server 11D) to complete a series of the reception subroutine operations before processing reverts to step SP1 of FIG. 9.

Next, steps SP60 to SP97 of the agent parameter updates processing shown in FIG. 12 are hereinafter explained.

Figure 13:
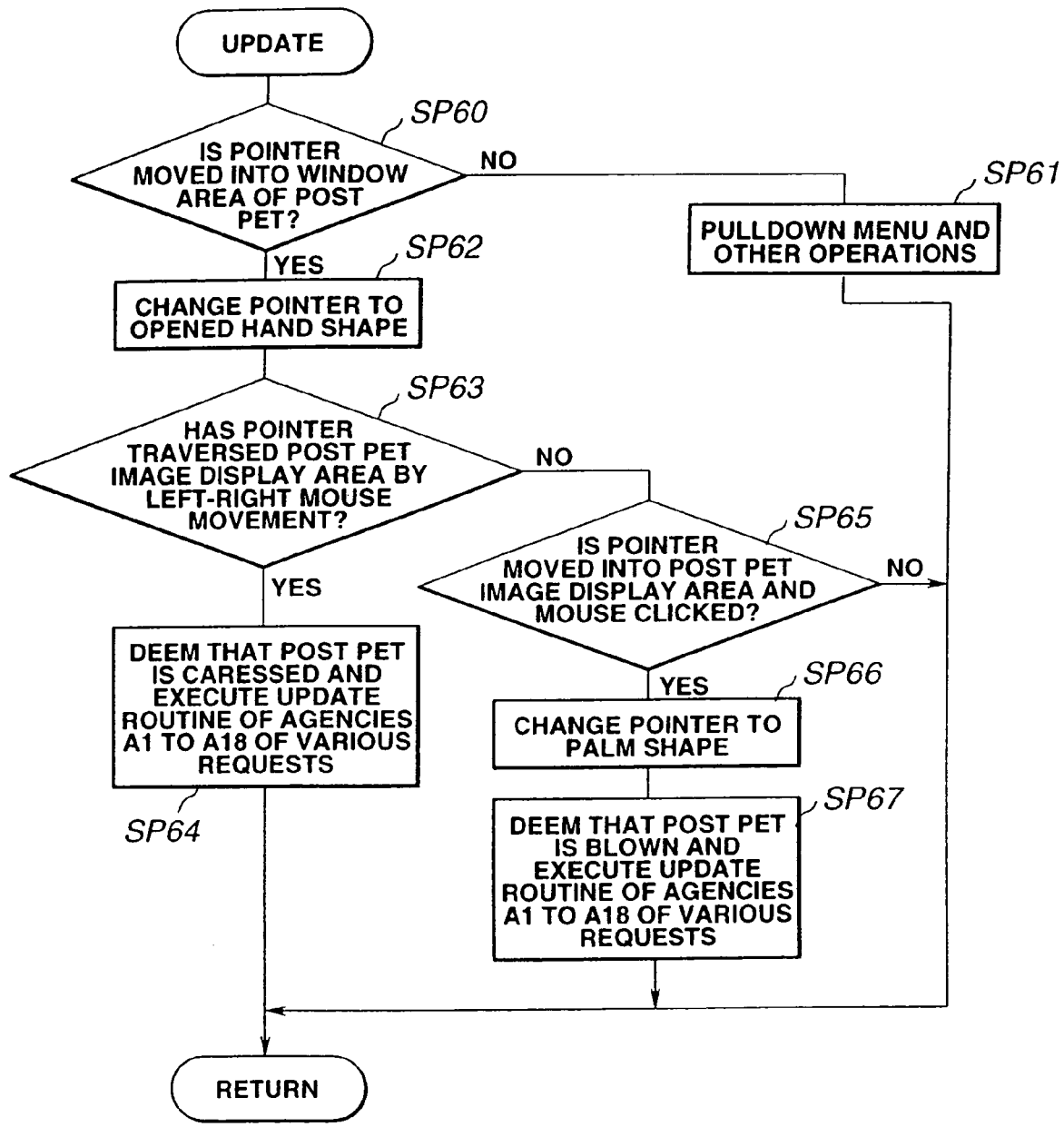
FIG. 13 is a flowchart showing the contents of update processing for the agent parameter by the mailer.
Figure 40:
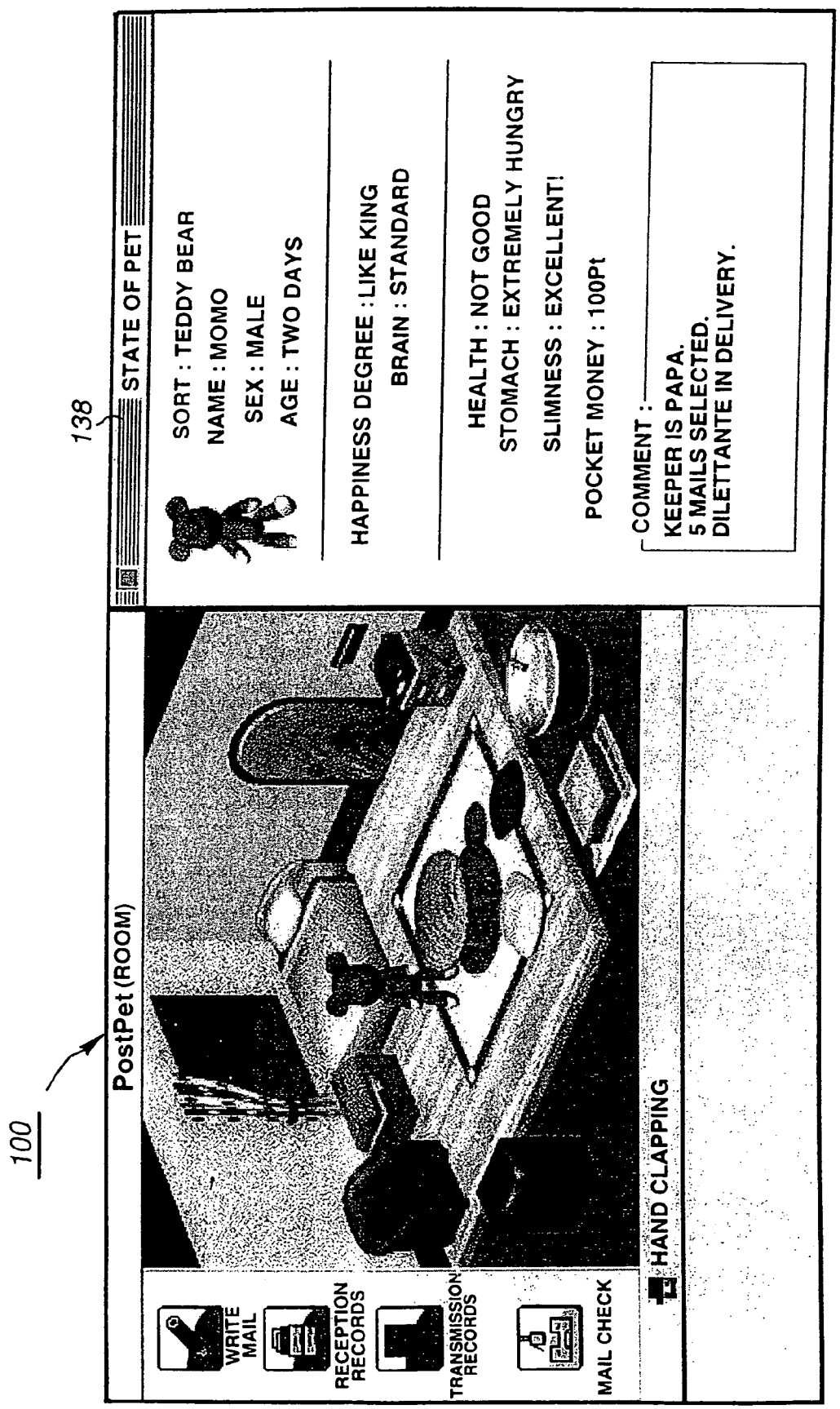
FIG. 40 shows the state in which an item 'State of Pet' of the pulldown menu on the GUI picture of the 'PostPet (Room)' is selected.
Figure 41:
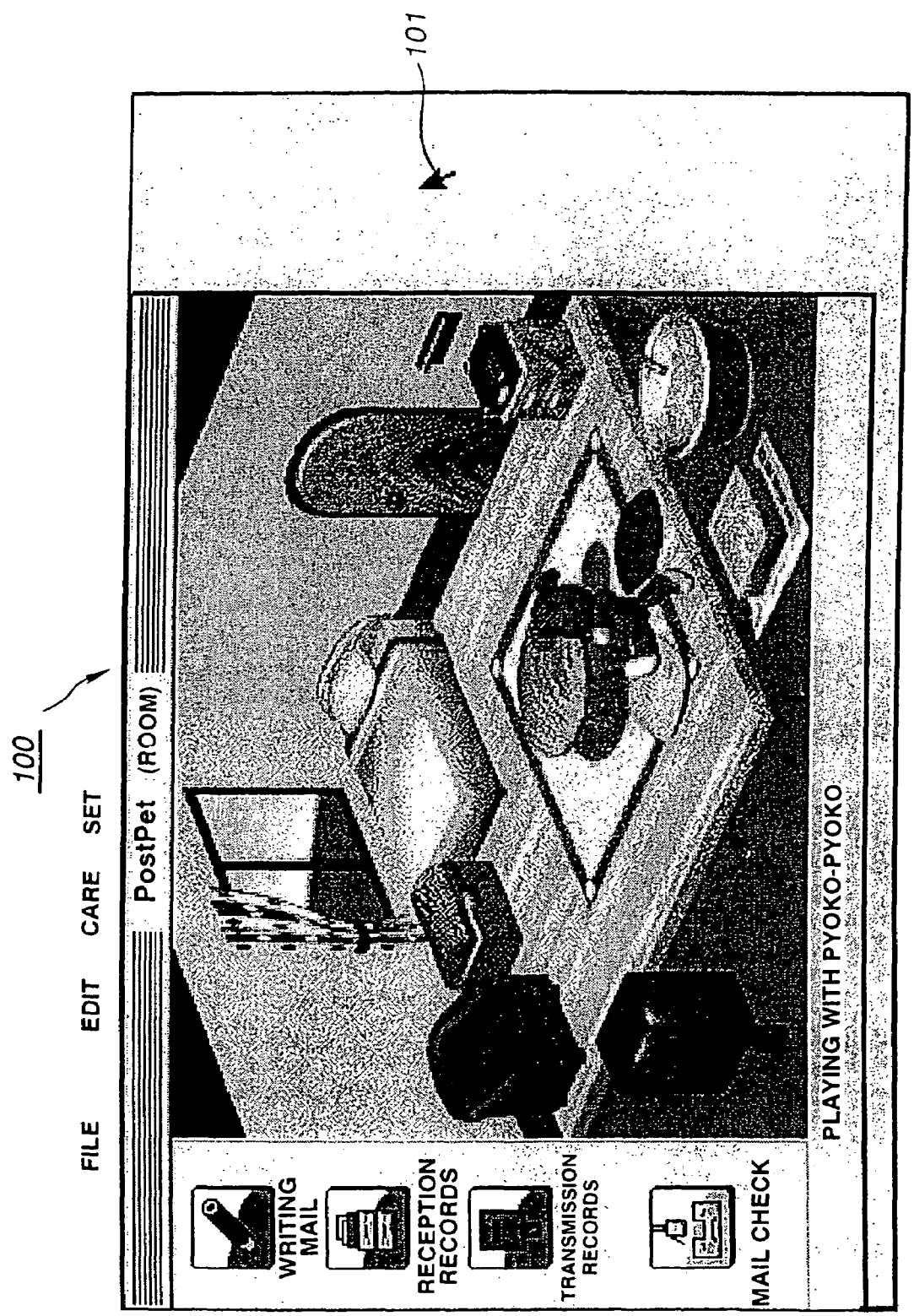
FIG. 41 shows the display state of a pointing cursor positioned outside of a room on the GUI picture of the 'PostPet (Room).'

Referring to the flowchart of FIG. 13, the CPU 21*a* monitors at step SP60 whether the pointing cursor 101 displayed on the screen of the display device 21B has moved into a window area of 'PostPet (Room)'. If the pointing cursor 101 is outside the window area of 'PostPet (Room)', pulldown menu processing or the like processing is executed at step SP61. If the pointing cursor 101 goes into the window area of 'PostPet (Room)', that is into the room, the pointing cursor 101 is changed at step SP62 to an open hand shape. Thus, if the pointing cursor 101 is positioned outside the room on the GUI picture 100 of the 'PostPet (Room)', as shown in FIG. 40, the pointing cursor 101 is represented as an arrow, whereas, if it goes into the room, as shown in FIG. 41, it is displayed in an open hand shape.

Figure 42:
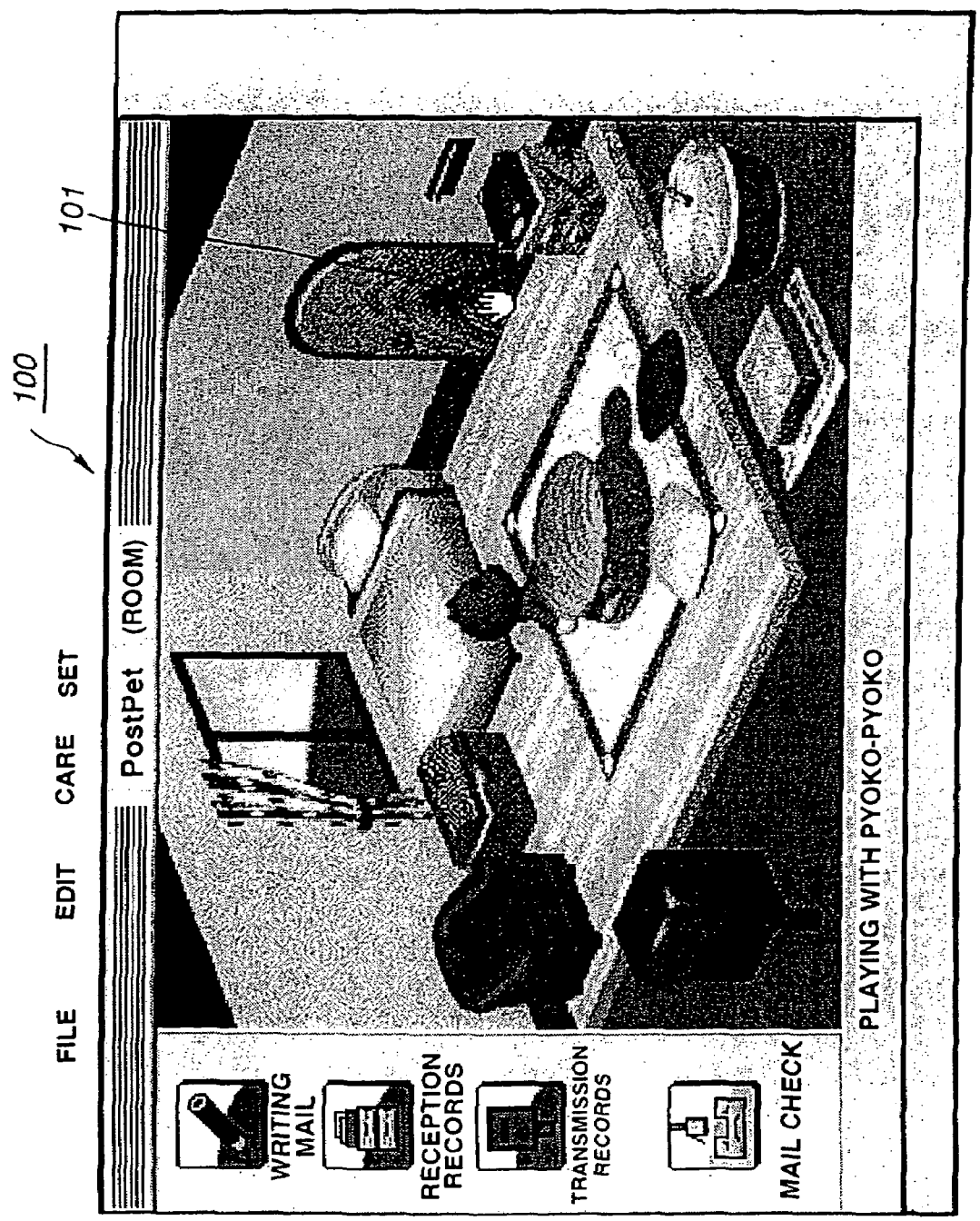
FIG. 42 shows the display state of a pointing cursor positioned within a room on the GUI picture of the 'PostPet (Room).'
Figure 43:
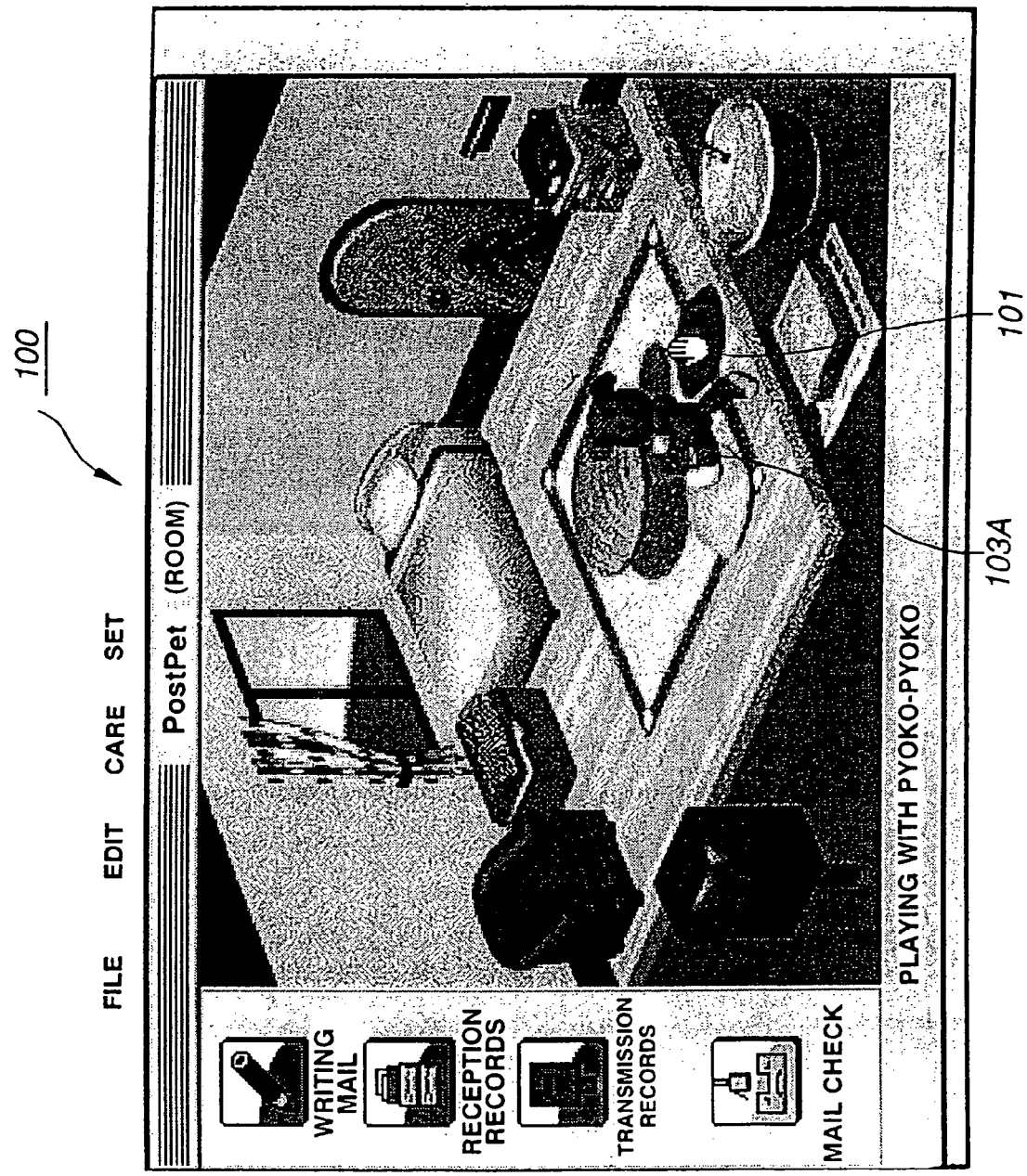
FIG. 43 shows the state of caressing the post pet on the GUI picture of the 'PostPet (Room).'
Figure 44:
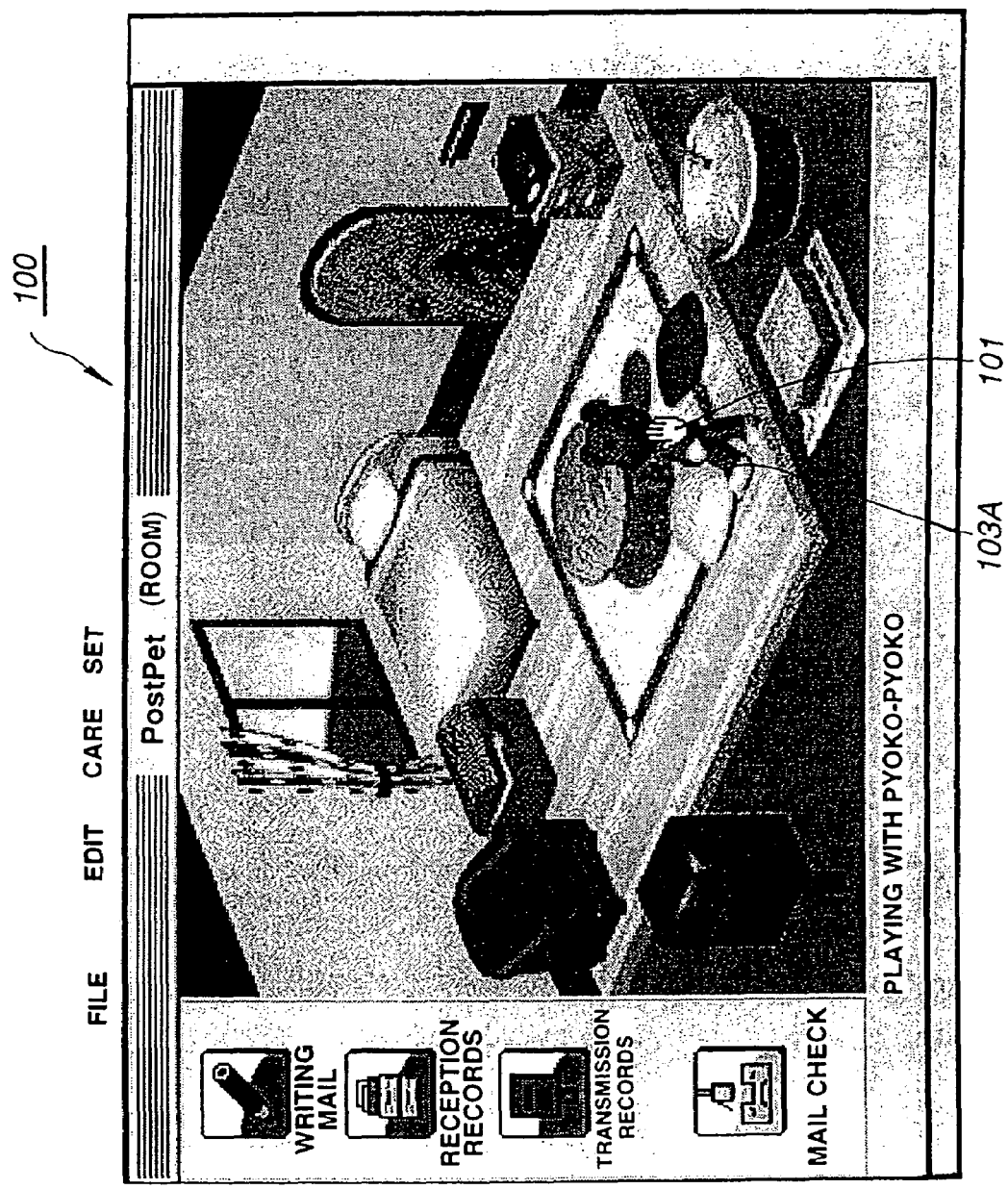
FIG. 44 shows the state of caressing the post pet on the GUI picture of the 'PostPet (Room).'

The CPU 21*a* determines at step SP63 whether the pointing cursor 101 has traversed the display area of the post pet image by the reciprocating movement of the mouse 21D in the left and right direction. If the result of determination is YES, that is if the pointing cursor 101 has traversed the display area of the post pet image, the CPU 21*a* deems that the post pet has been caressed, and executes at step SP64 an updating processing routine for the agencies A1 to A18 of various desires as later explained. Thus, on the GUI picture 100 of 'PostPet (Room)', the pointing cursor 101 represented by the open hand shape, is reciprocated in the left-and-right direction on the post pet 103 for caressing the post pet 103, as shown in FIGS. 42 to 44.

Figure 45:
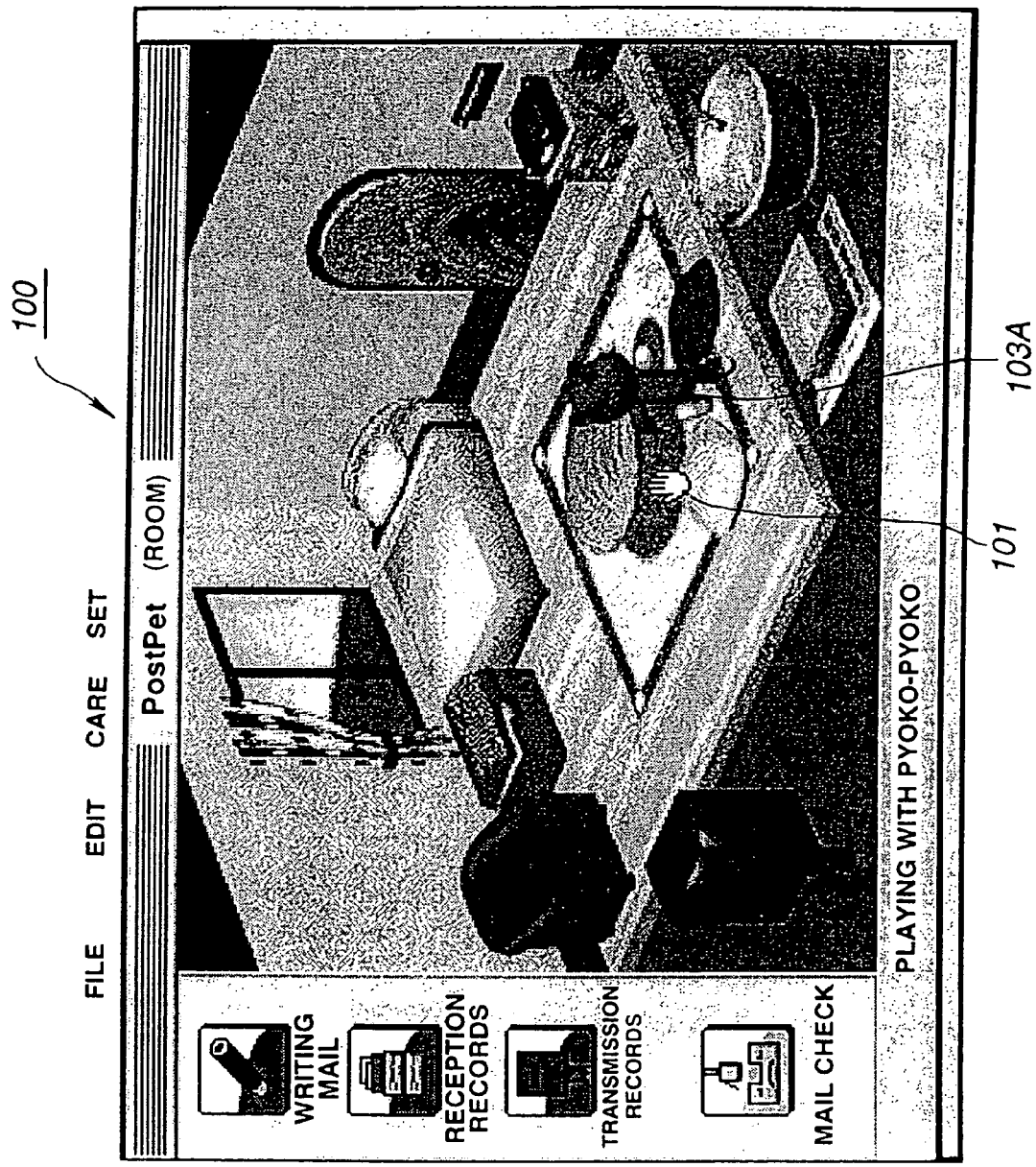
FIG. 45 shows the state of caressing the post pet on the GUI picture of the 'PostPet (Room).'
Figure 46:
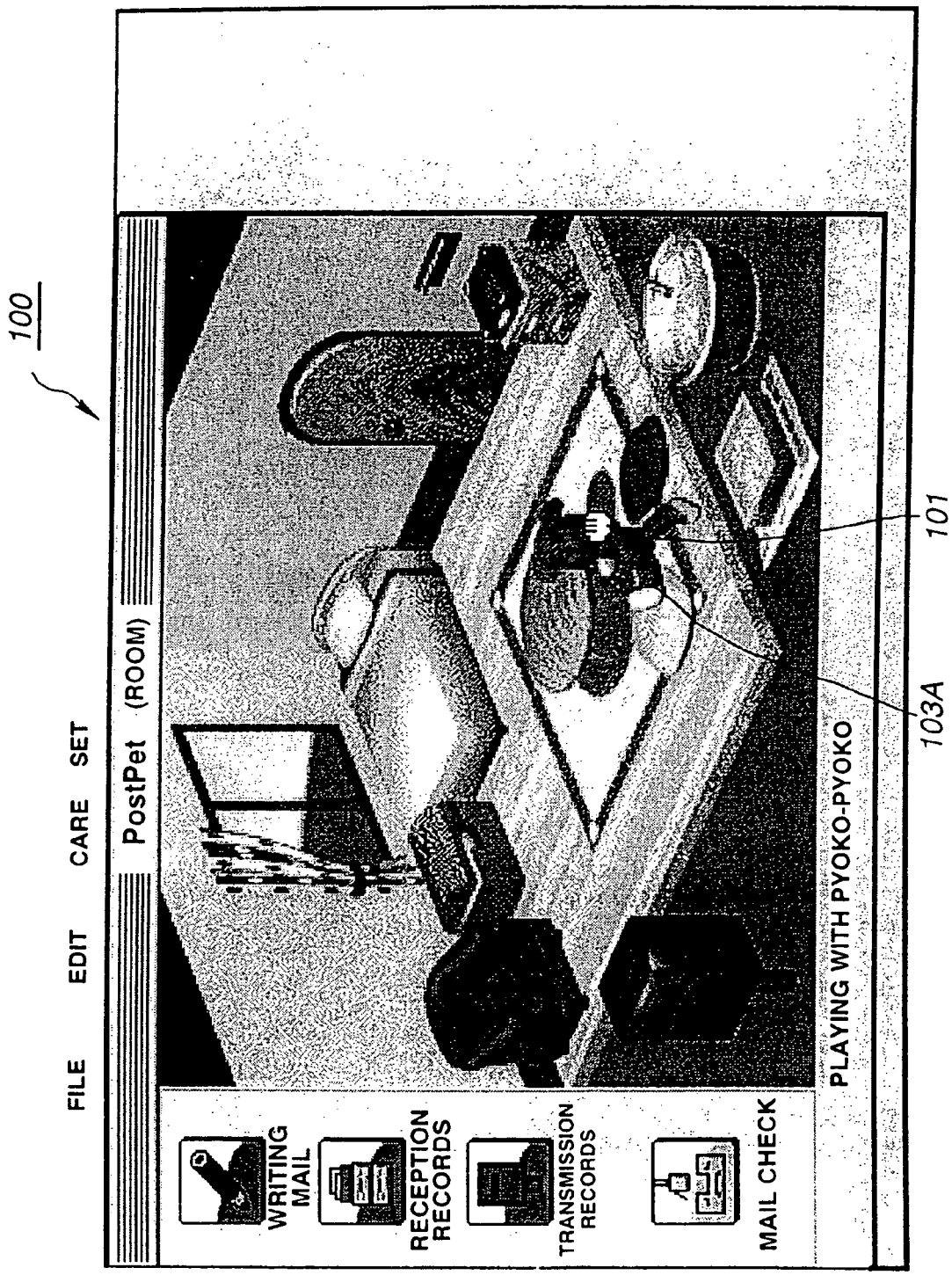
FIG. 46 shows the state of hitting the post pet on the GUI picture of the 'PostPet (Room).'

The CPU 21*a* determines at step SP65 whether the pointing cursor 101 has been moved into the display area of the post pet image and the mouse button of the mouse 21D has been clicked. If the result of the determination is affirmative, that is, if the mouse 21D has been clicked when the pointing cursor 101 is in the post pet image display area, the CPU 21*a* alters at step SP66 the pointing cursor 101 to the shape of a clenched fist to execute update processing routines of the agencies A1 to A18 of various desires at step SP67 on the assumption that the post pet has been struck. Thus, on the GUI picture 100 of the 'PostPet (Room)', the post pet 103 can be struck on the pointing cursor 101 displayed in the shape of a clenched fist, as shown in FIG. 45.

When executing mail sending by the postman 104, the CPU 21*a* sequentially alters bit map data of the postman 104 on the video RAM 21*j* to cause the display controller 21*g* to display on the display device 21B an animation in which the postman 104 moves on the GUI picture 100 of the 'PostPet (Room)' to recover the mail posted into the mail post 106 to deliver the recovered mail.

Figure 14:
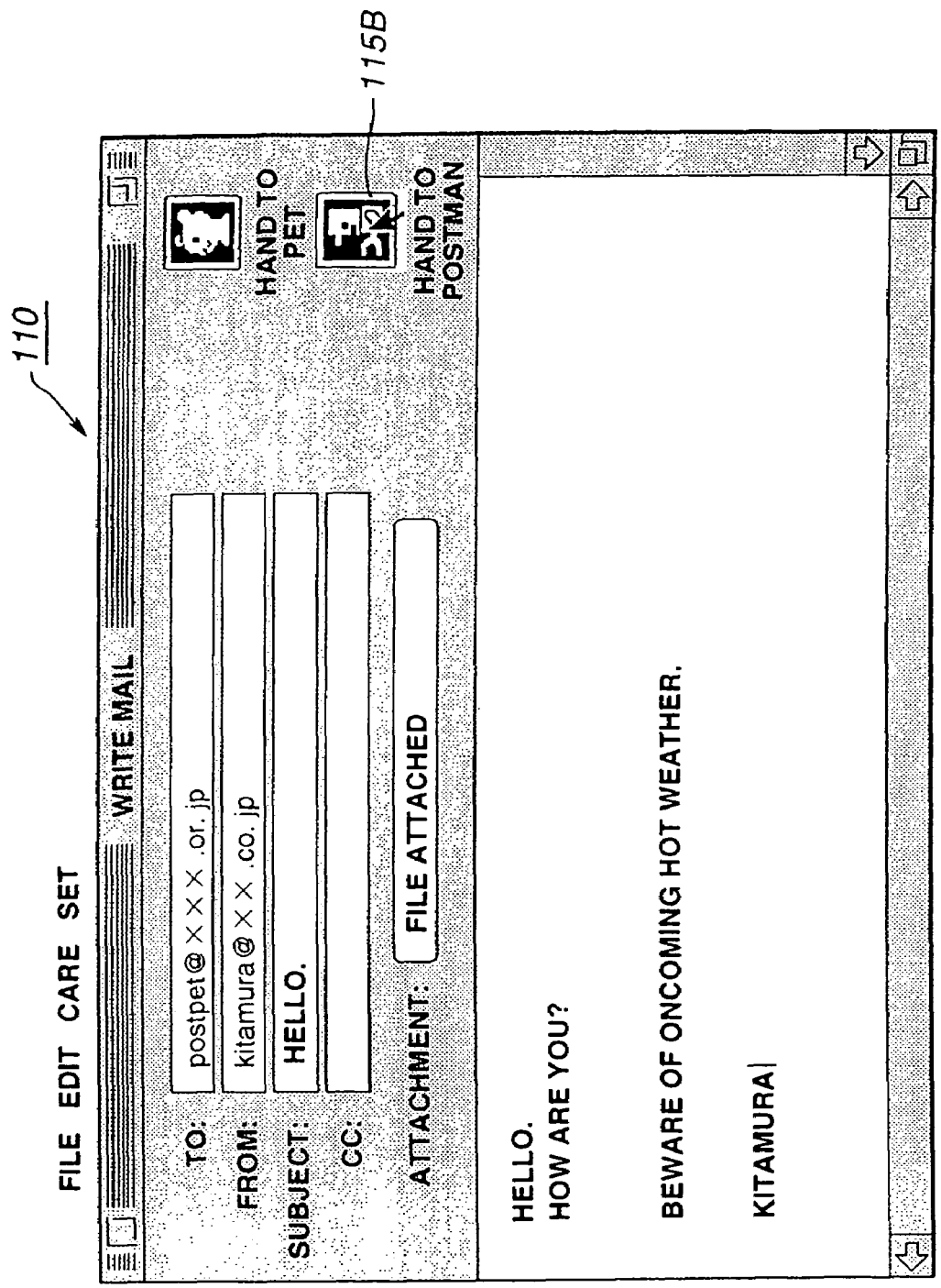
FIG. 14 shows the state of instructing mail sending by a postman in the GUI picture 'Write a Mail' represented by the mailer.
Figure 15:
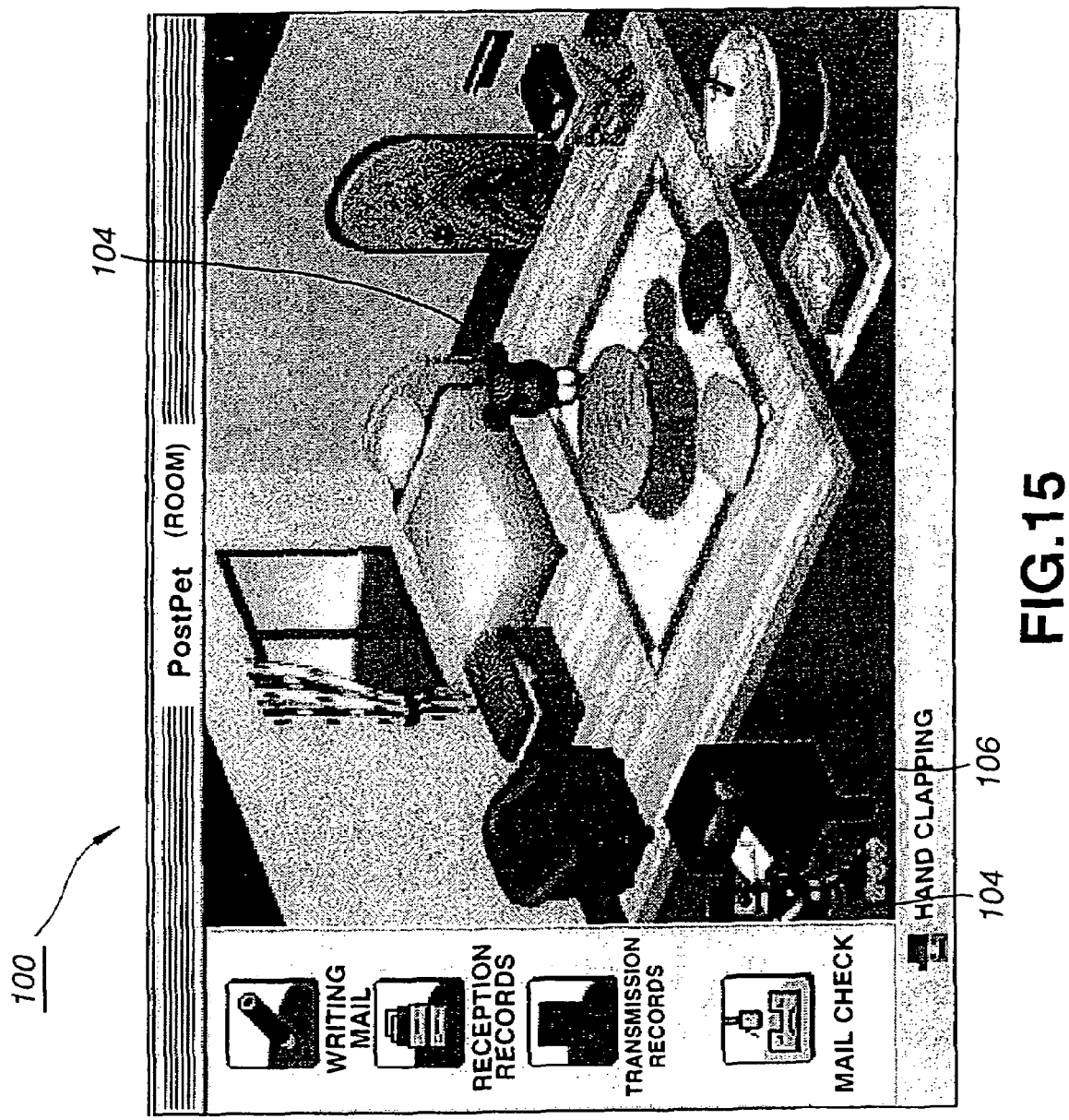
FIG. 15 shows the state of the GUI picture 'PostPet (Room)' in case mail send procedure is commanded by a postman.
Figure 16:
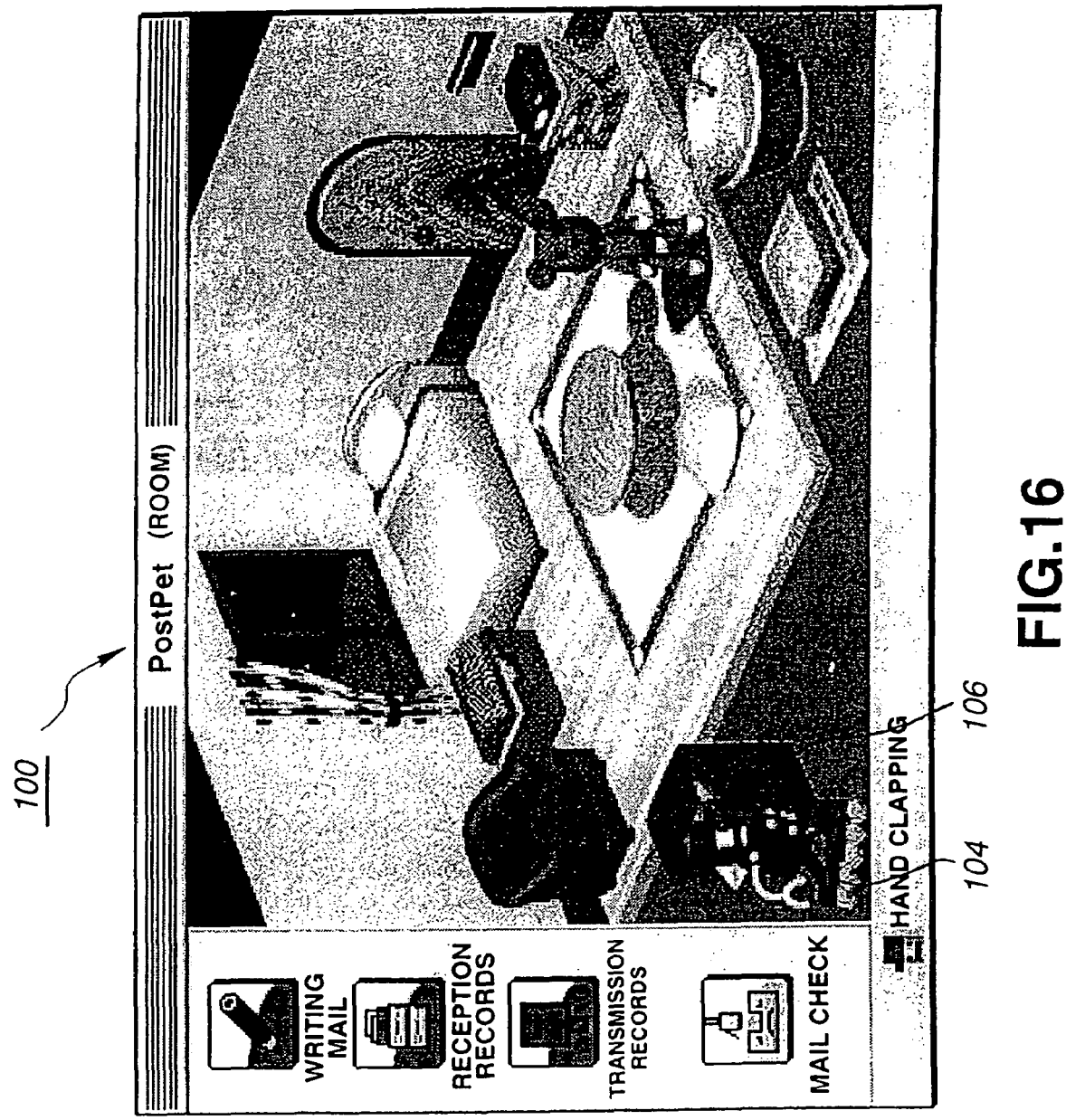
FIG. 16 similarly shows the state of the GUI picture 'PostPet (Room)' in case mail send procedure is commanded by the postman.
Figure 17:
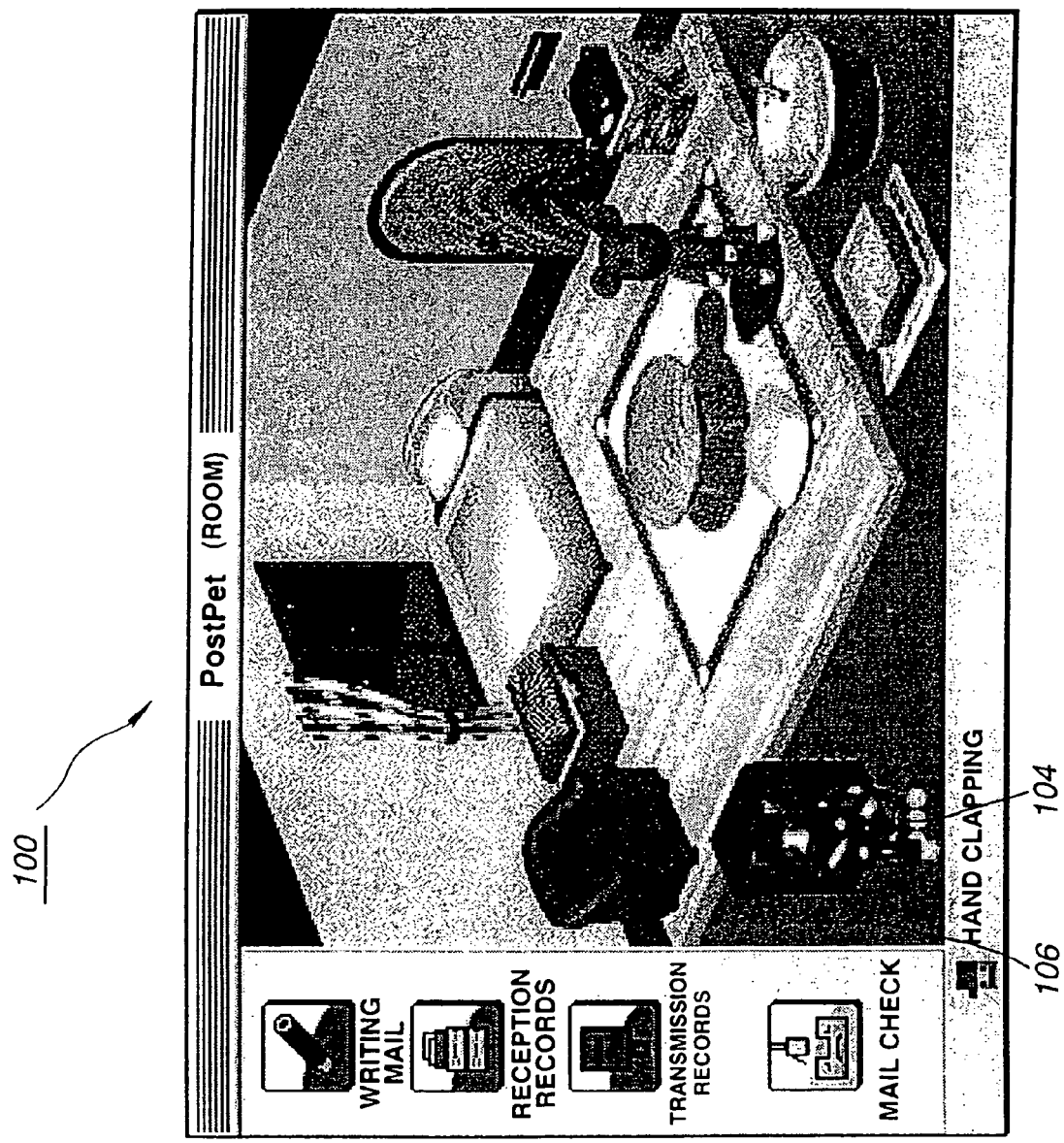
FIG. 17 similarly shows the state of the GUI picture 'PostPet (Room)' in case mail send procedure is commanded by the postman.
Figure 18:
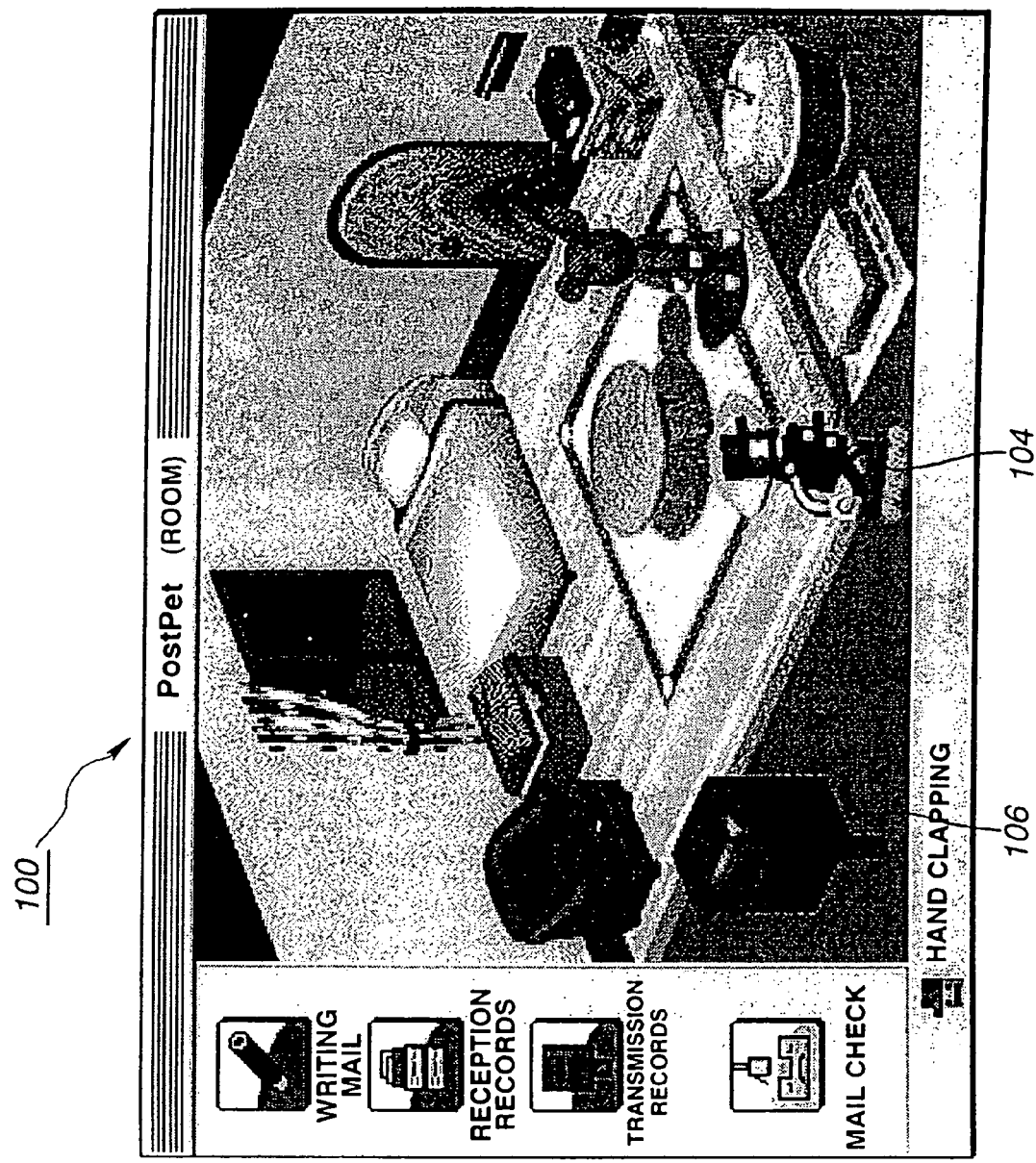
FIG. 18 similarly shows the state of the GUI picture 'PostPet (Room)' in case mail send procedure is commanded by the postman.
Figure 19:
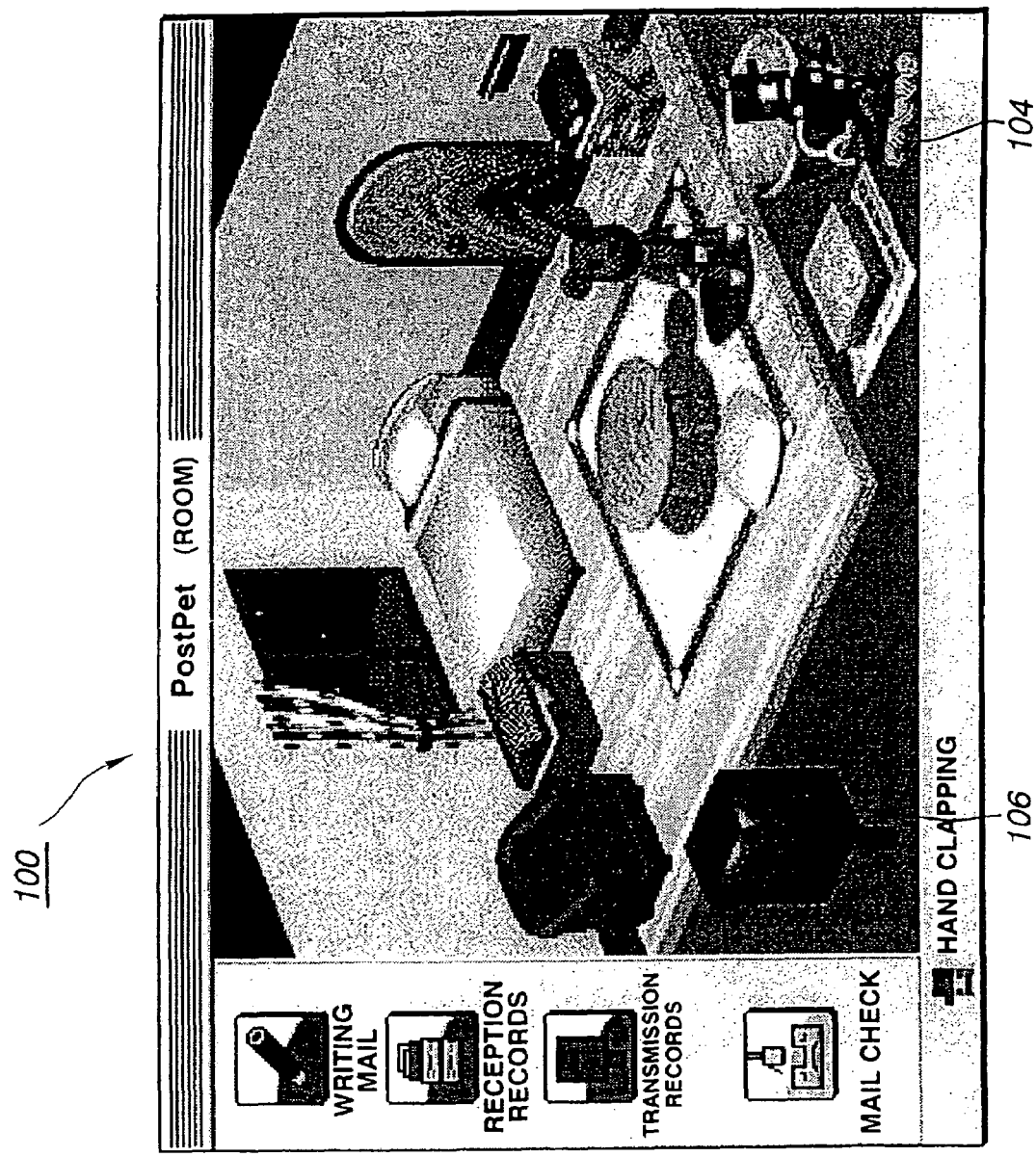
FIG. 19 similarly shows the state of the GUI picture 'PostPet (Room)' in case mail send procedure is commanded by the postman.

Specifically, if the icon 10B of handing over to the postman 104 for commanding mail dispatch by the postman on the GUI picture 110 of 'Writing a Mail' is clicked as shown in FIG. 15, an animation display is made such that the postman 104 makes a debut from the left side on the GUI picture 100 of the 'PostPet (Room)' as shown in FIG. 14 and moves to the site of the mail post 106 as shown in FIG. 15, the postman 104 then recovering the mail posted in the mail post 106 as shown in FIG. 16 and starting delivering the mail posted in the mail post 106, as shown in FIGS. 18 and 19.

Also, when executing the mail send by the post pet 103, the CPU 21*a* sequentially alters the bit map data of the post pet 103 on the video RAM 21*j* to cause the display controller 21*g* to display on the display device 21B an animation in which the post pet 103 carrying the mail moves on the GUI picture 100 of the 'PostPet (Room)' as shown in FIG. 4 as far as the door 107 on foot to open the door.

Figure 21:
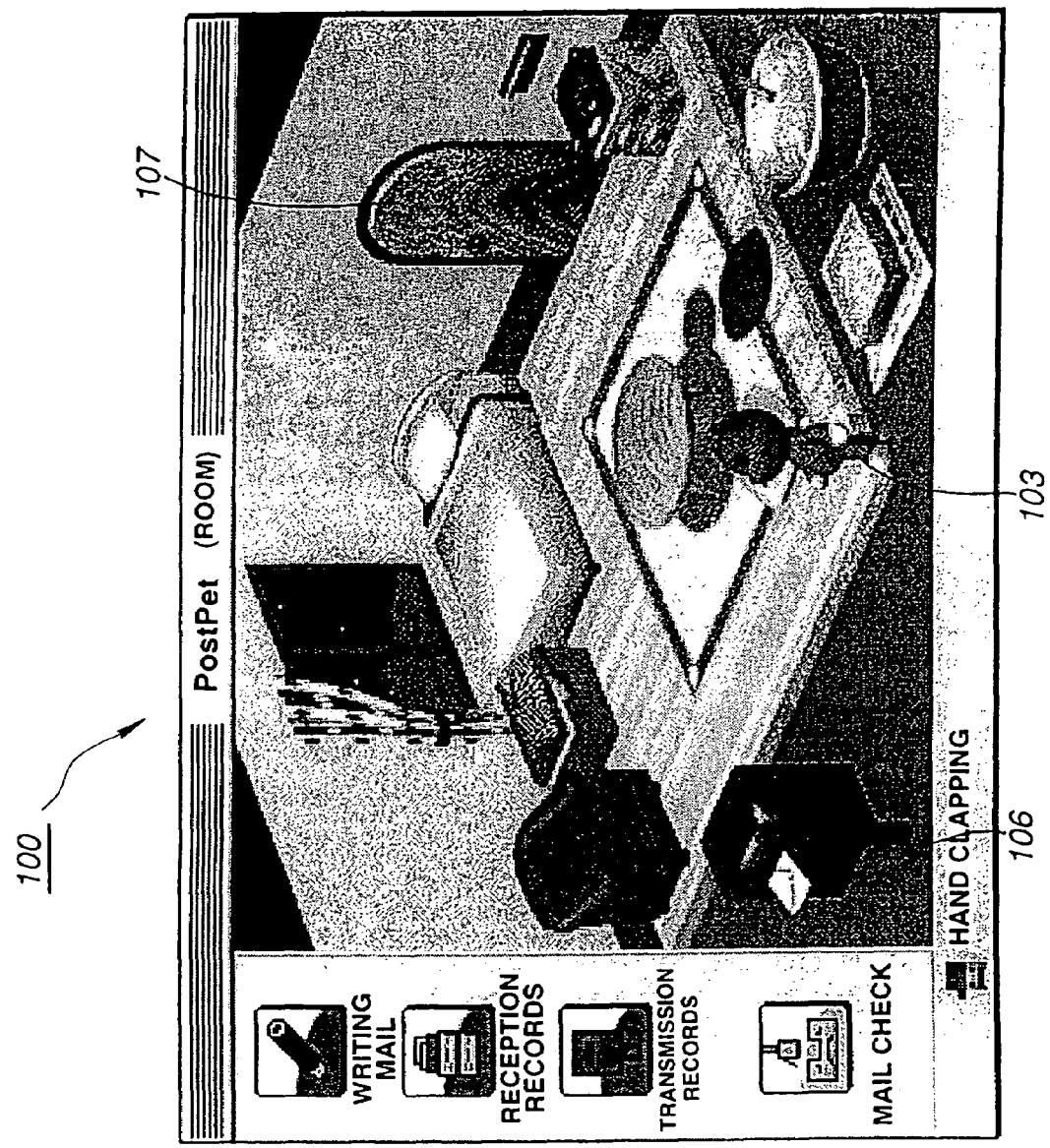
FIG. 21 shows the state of a GUI picture of 'PostPet (Room)' when mail send procedure is commanded by a post pet.
Figure 22:
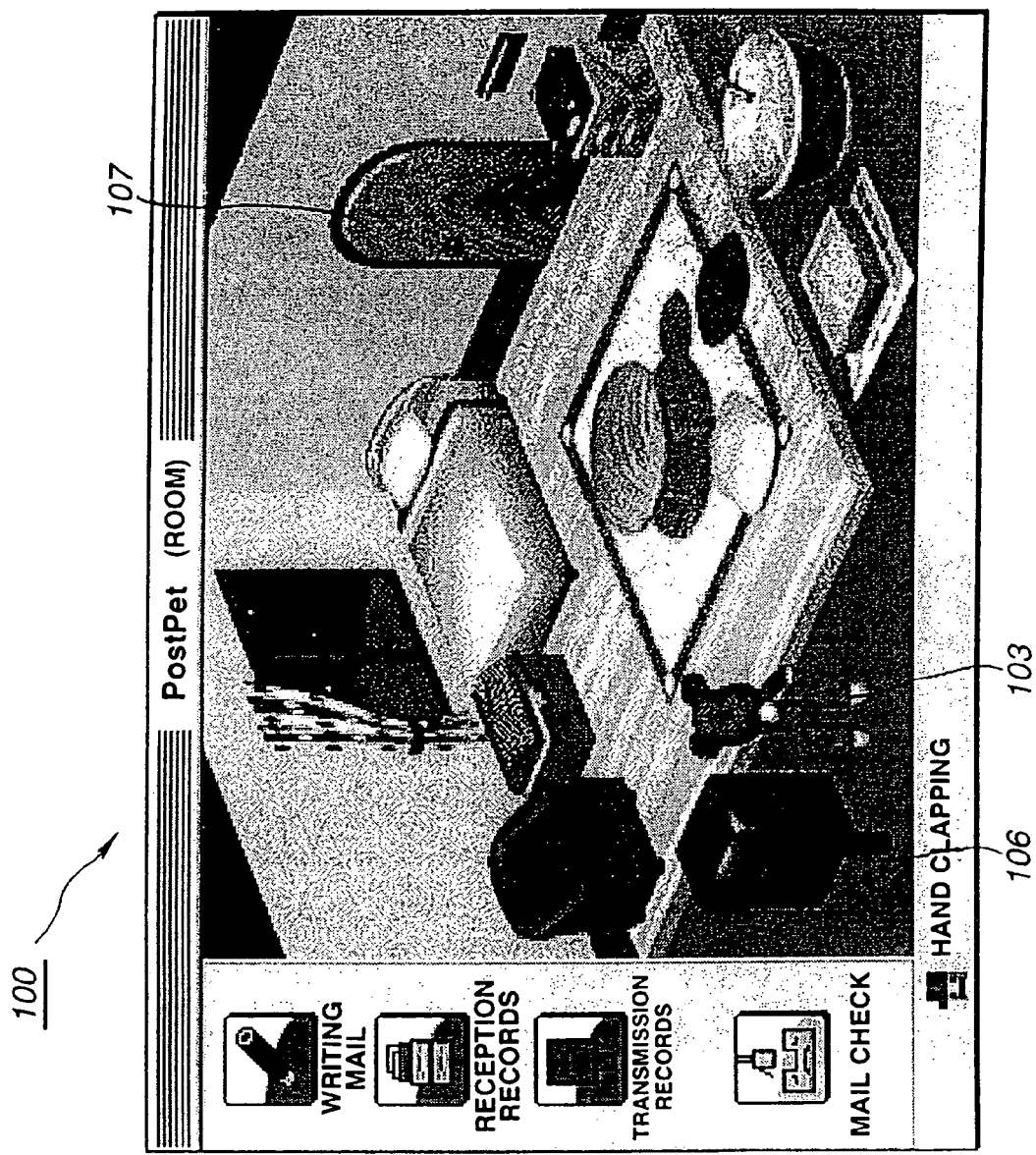
FIG. 22 similarly shows the state of a GUI picture of 'PostPet (Room)' when mail send procedure is commanded by the post pet.
Figure 23:
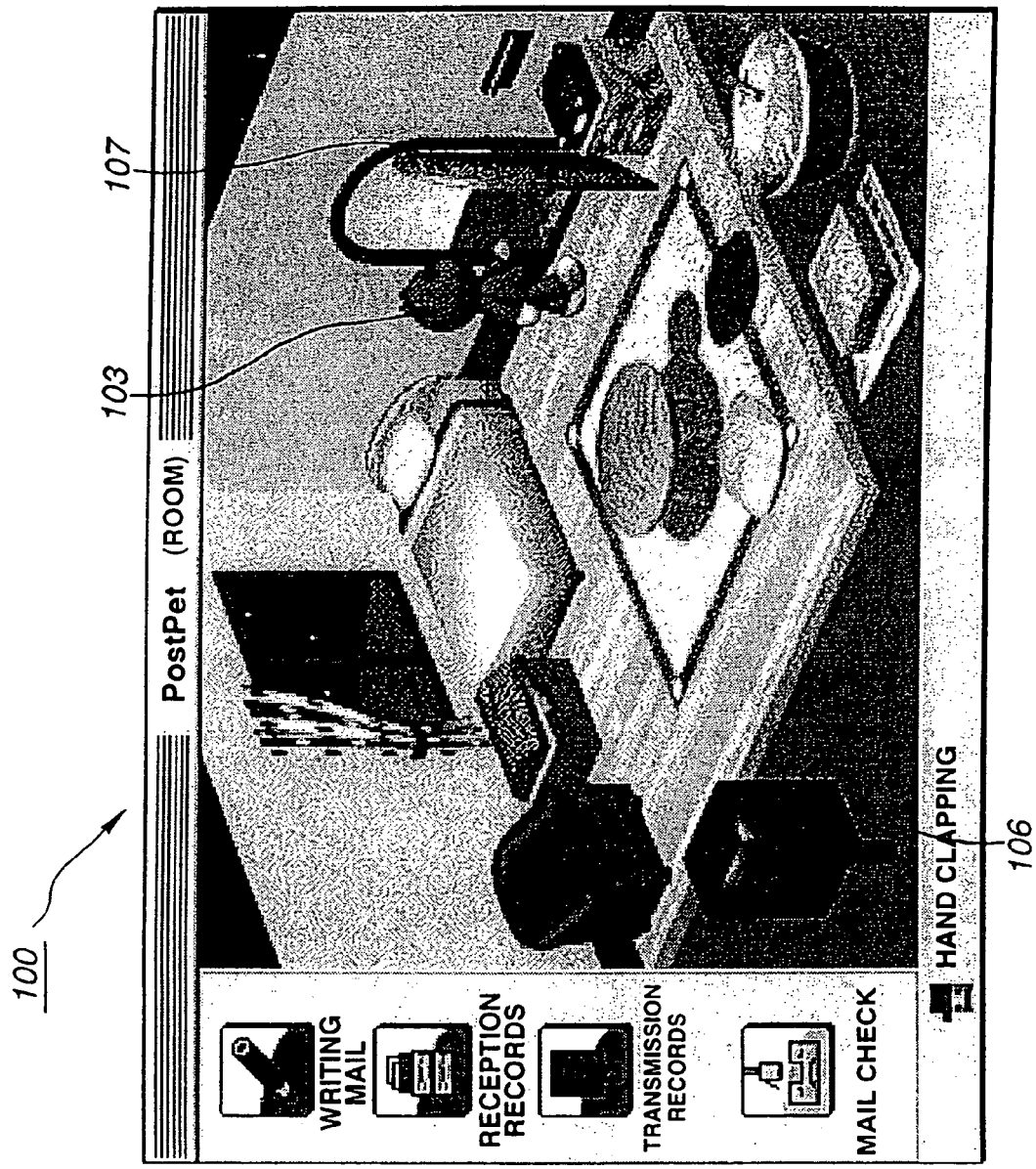
FIG. 23 similarly shows the state of a GUI picture of 'PostPet (Room)' when mail send procedure is commanded by the post pet.

Specifically, if the icon 115A of handing over to the pet for commanding mail dispatch by the post pet 103 on the GUI picture 110 of 'Writing a Mail' as shown in FIG. 19, is clicked, an animation display is made such that the post pet 103 moves on the GUI picture 100 of the 'PostPet (Room)' as far as the mail post 106 as shown in FIG. 20, the post pet 103 recovers the mail posted in the mail post 106 as shown in FIG. 21 and the post pet 103 carrying the mail then moves as far as the door 107 to open the door as shown in FIGS. 22 and 23. At this time, a message which reads: "Momo (name of the pet) went out for mail dispatching" specifying mail dispatching by the post pet 103 is displayed on the lower side of the GUI picture 100 of the 'PostPet (Room)'.

It should be noted that mail sending by the post pet 103 sends a sole E-mail by a sole post pet 103, that is, by a sole agent, while mail sending cannot be executed if the post pet 103 is absent on the GUI picture 100 of the 'PostPet (Room)', that is, if the post pet 103 is an outing.

Conversely, mail sending by the postman 104 sends one or more E-mails by a sole postman 104, that is, by a sole agent, and can be executed at any time. If the post pet 103 is absent on the GUI picture 100 of the 'PostPet (Room)', that is, if the post pet 103 is an outing, mail sending can be done by the postman 104.

The above-described behavior of the post pet is determined by the agent parameters attached to the mail, such that, if, upon mail reception by the post pet there are agent parameters, the CPU 21*a* causes the display controller 21*g* to display on the screen of the display controller 21*g* animation to indicate that the post pet 103D, for example, on the GUI picture 100 of the 'PostPet (Room)' opens the door 107 to go into the room to put the mail on the table 108 to then walk around in the room by way of performing post pet behavior as defined by the above-mentioned agent parameters.

Figure 24:
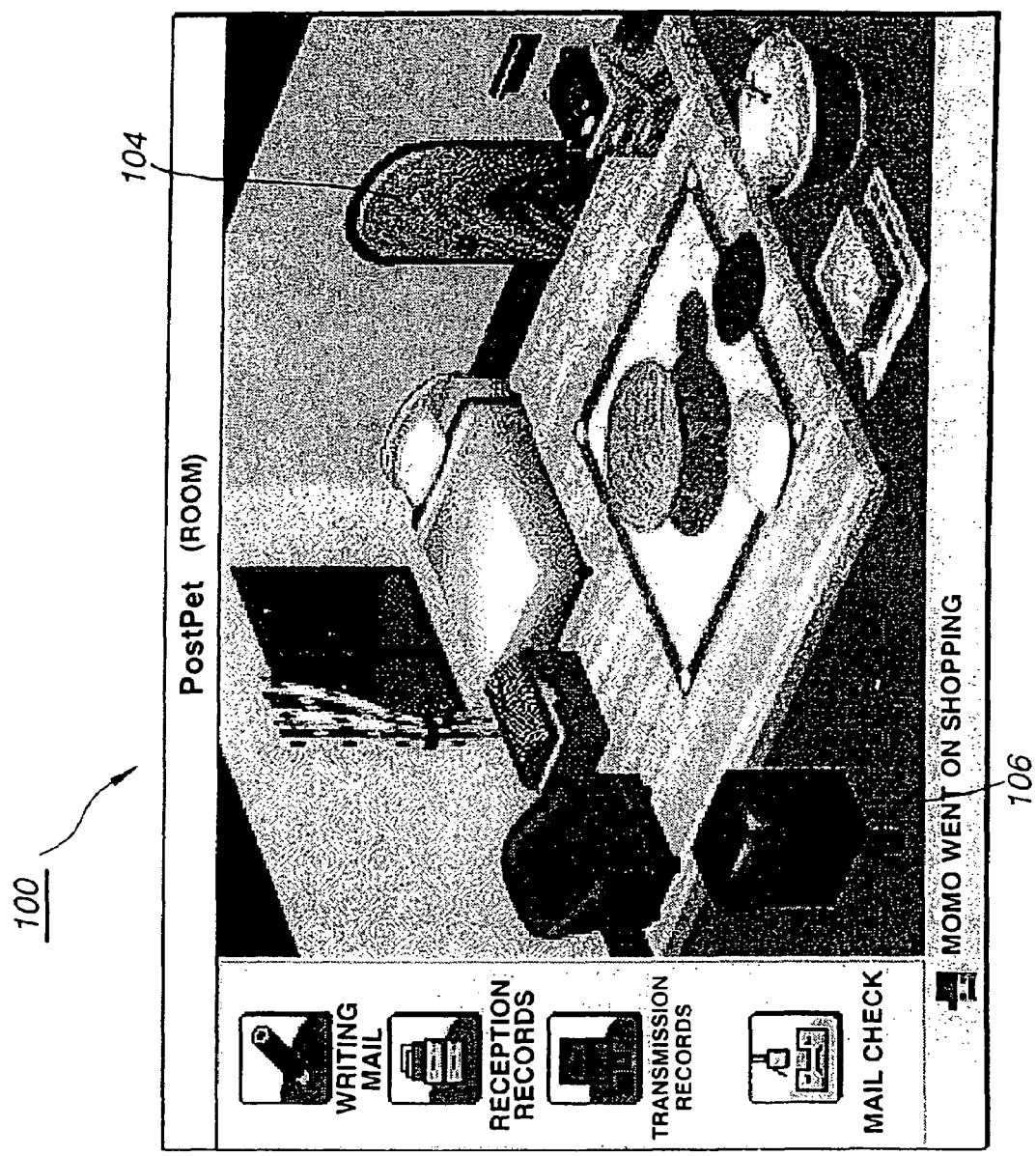
FIG. 24 similarly shows the state of a GUI picture of 'PostPet (Room)' when mail send procedure is commanded by the post pet.
Figure 25:
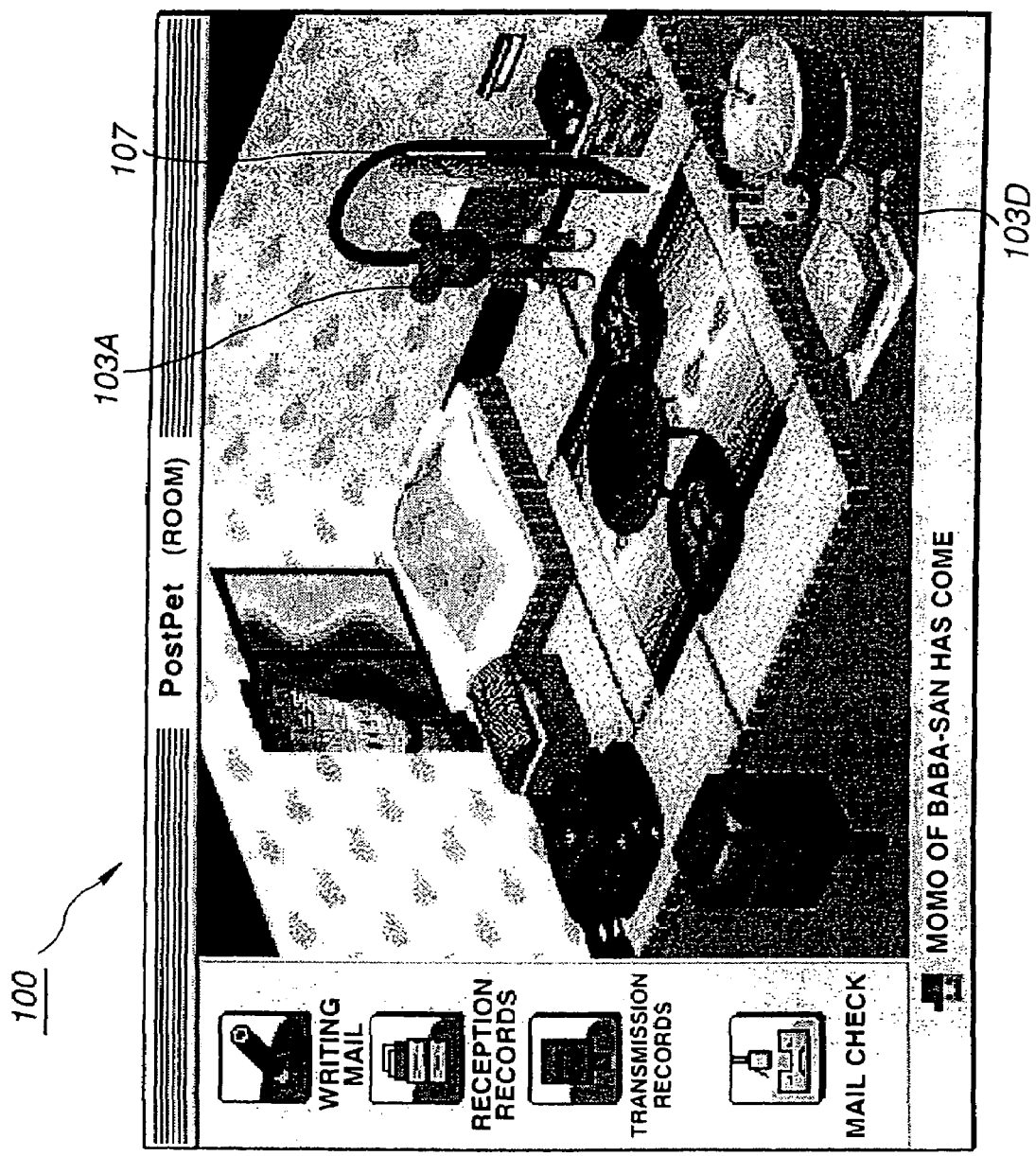
FIG. 25 shows the state of a GUI picture of 'PostPet (Room)' when an E-mail is received by the post pet.
Figure 26:
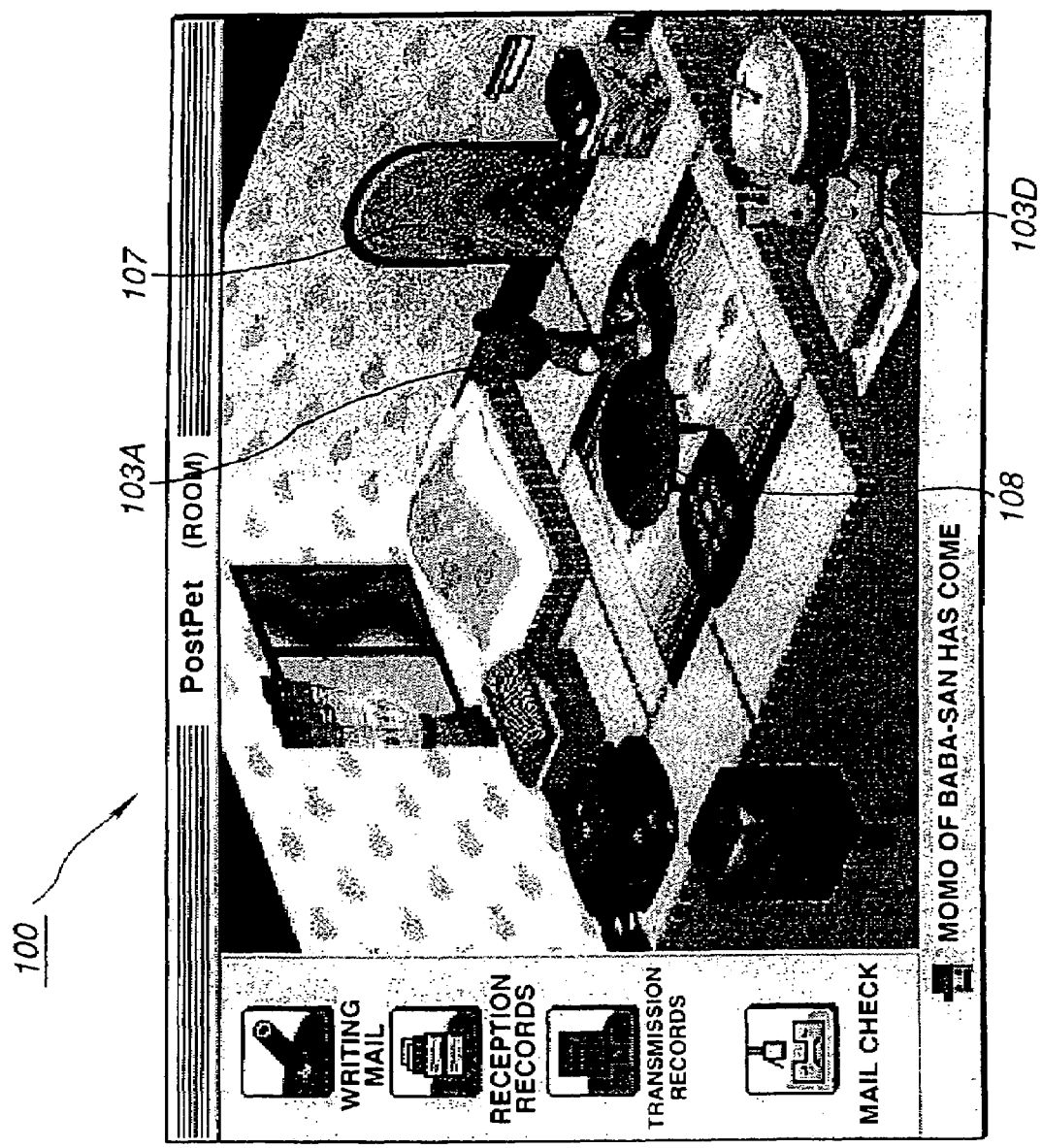
FIG. 26 similarly shows the state of a GUI picture of 'PostPet (Room)' when an E-mail is received by the post pet.
Figure 27:
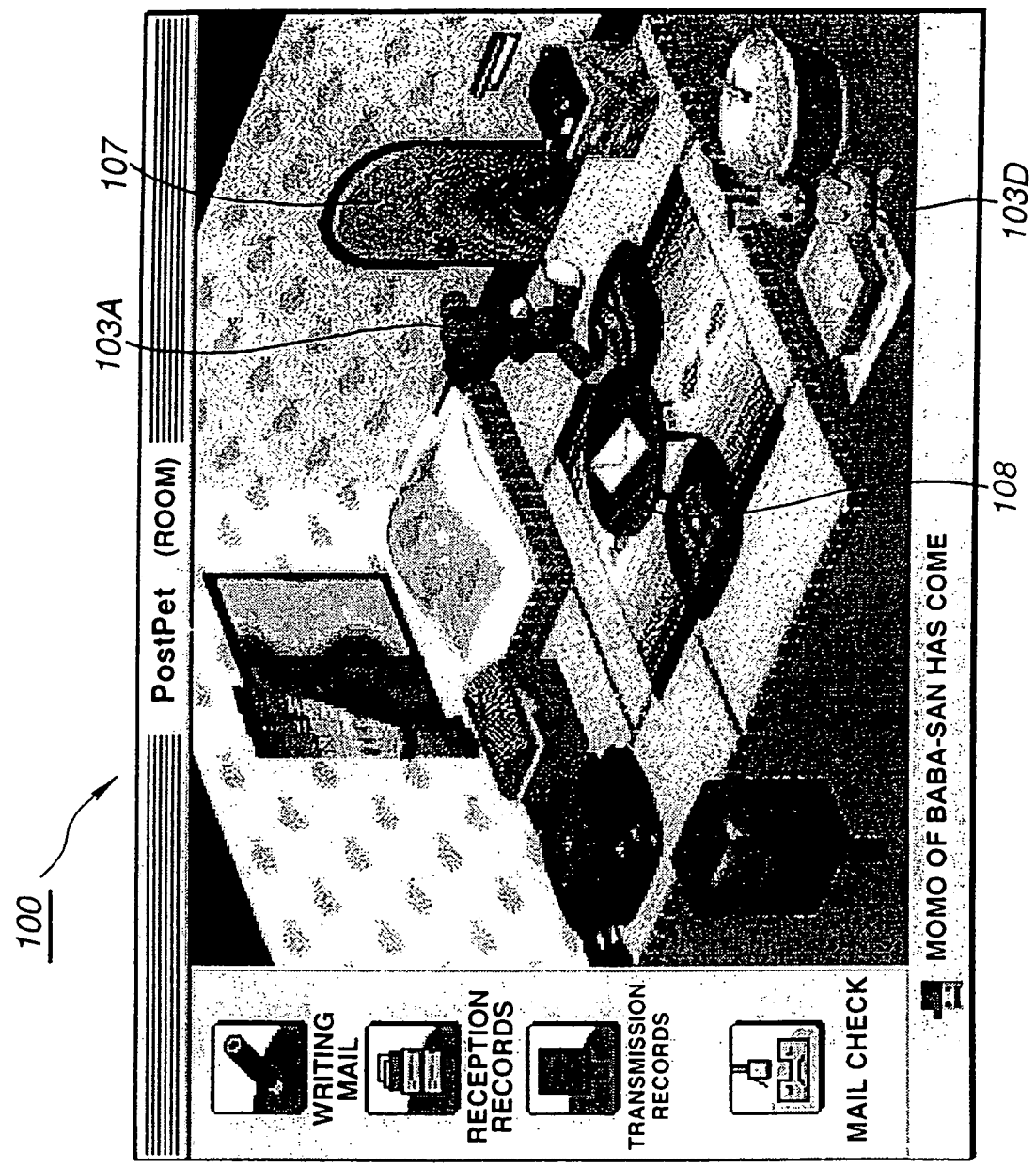
FIG. 27 similarly shows the state of a GUI picture of 'PostPet (Room)' when an E-mail is received by the post pet.

Specifically, if, upon mail reception by the post pet, there are agent parameters, animation display is made in where the door 107 is first opened on the GUI picture 100 of the 'PostPet (Room)' as shown in FIG. 24, and the post pet 103A then enters the room as shown in FIG. 25 to put the mail on the table 108 as shown in FIG. 26, the post pet 103A then walks around in the room to then go out to close the door 107 as show in FIG. 27. At this time, a message reading: "Momo of Mr. Baba has come" is displayed on the lower side of the GUI picture 100 of the 'PostPet (Room)'.

If the user operates the mouse 21D to click the post pet 103B on the GUI picture 100 of the 'PostPet (Room)' by pointing cursor 101 or acts on the keyboard 21C, the CPU 21a executes changes pre-defined in association with the contents of the operation to process the agent parameters determining the behavior of the post pet 103B. Specifically, the CPU processes the agent parameters responsive to the operating of caressing or hitting the post pet 103B by the operation of the mouse 21D.

The CPU 21 a automatically returns the processed agent parameters to the sending side.

Figure 28:
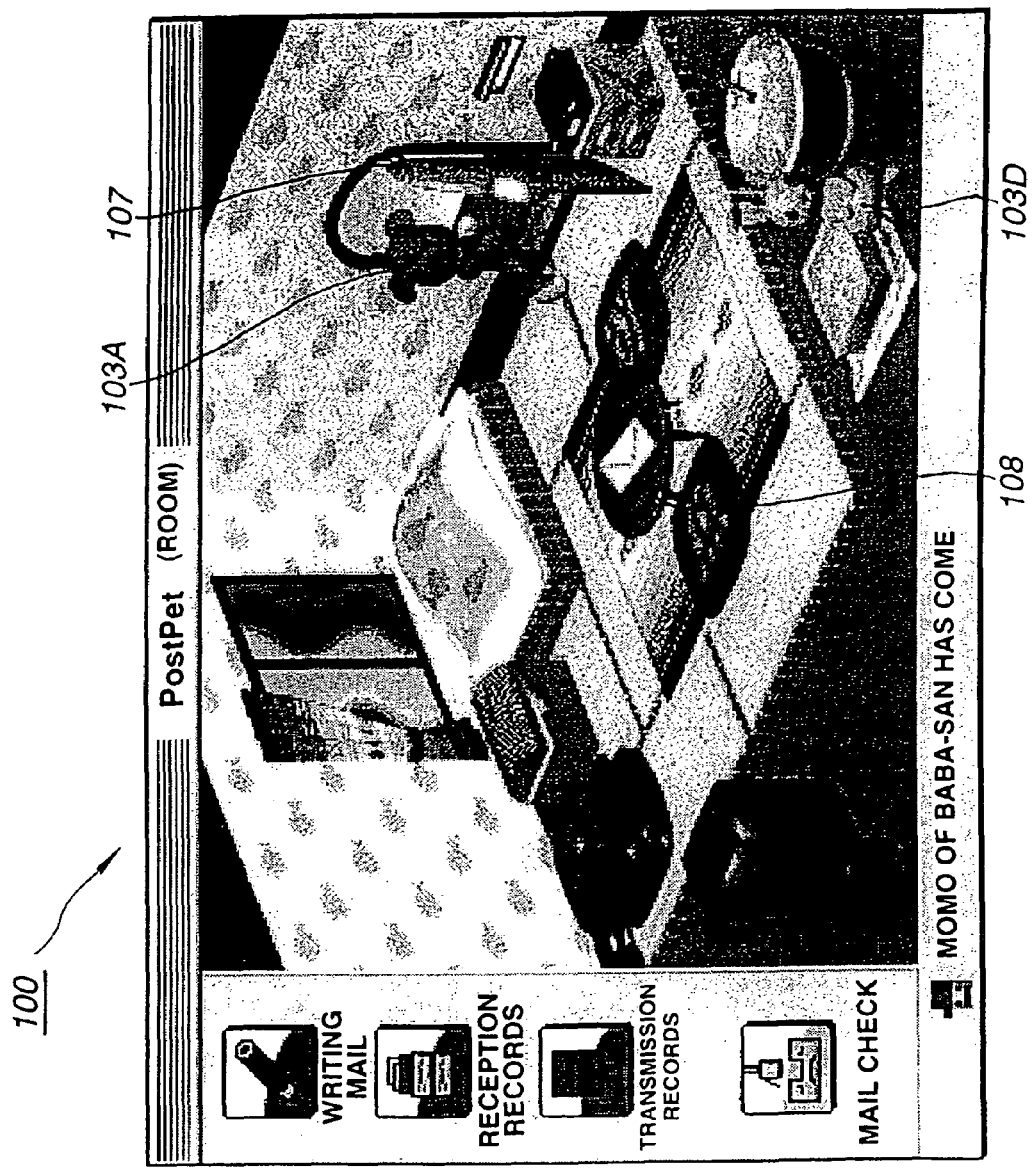
FIG. 28 similarly shows the state of a GUI picture of 'PostPet (Room)' when an E-mail is received by the post pet.
Figure 29:
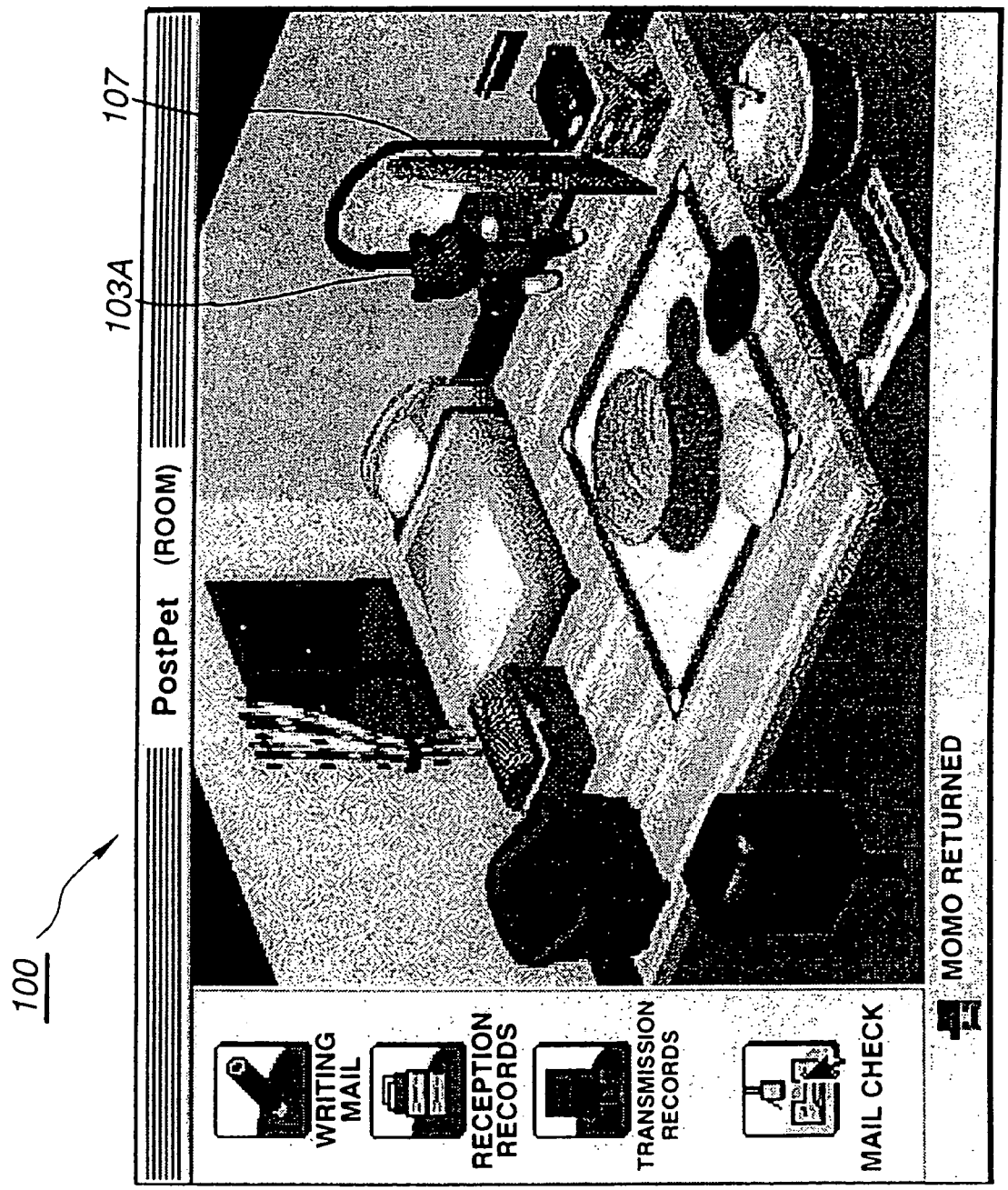
FIG. 29 shows the state of a GUI picture of 'PostPet (Room)' when the mail has been sent by the post pet and the post pet has returned.
Figure 30:
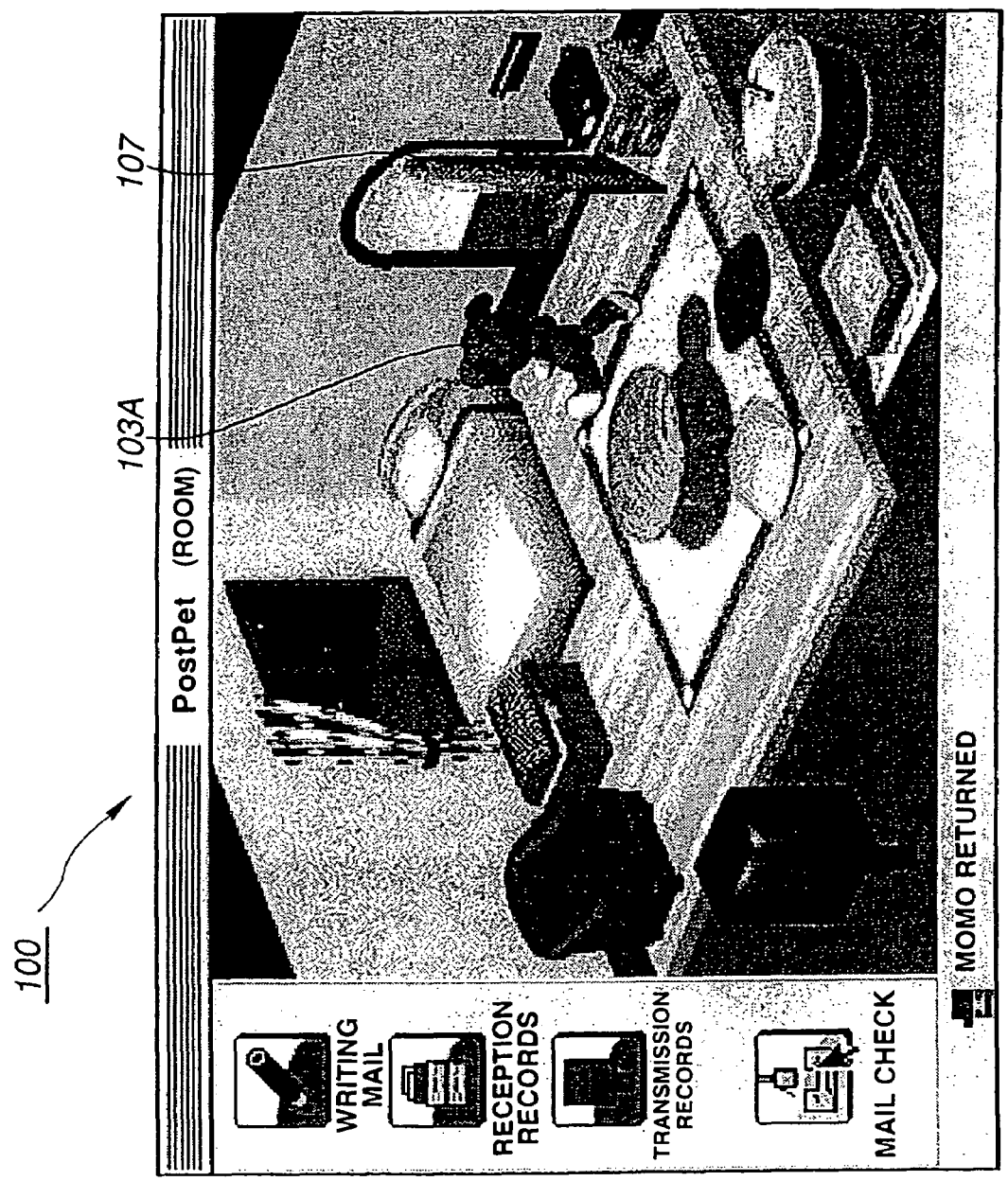
FIG. 30 similarly shows the state of a GUI picture of 'PostPet (Room)' when the mail has been sent by the post pet and the post pet has returned.

Upon reception of the automatically returned agent parameters, the CPU 21a causes the display controller 21g to display on the screen of the display device 21B an animation in which the door 107 is first opened on the GUI picture 100 of the 'PostPet (Room)' as shown in FIG. 28, the post pet 103 entering the room as shown in FIG. 29 and closing the door 107 as shown in FIG. 30. At this time, a message reading: "Momo (pet's name) has come back" is displayed on the lower side of the GUI picture 100 of the 'PostPet (Room)'.

Figure 31:
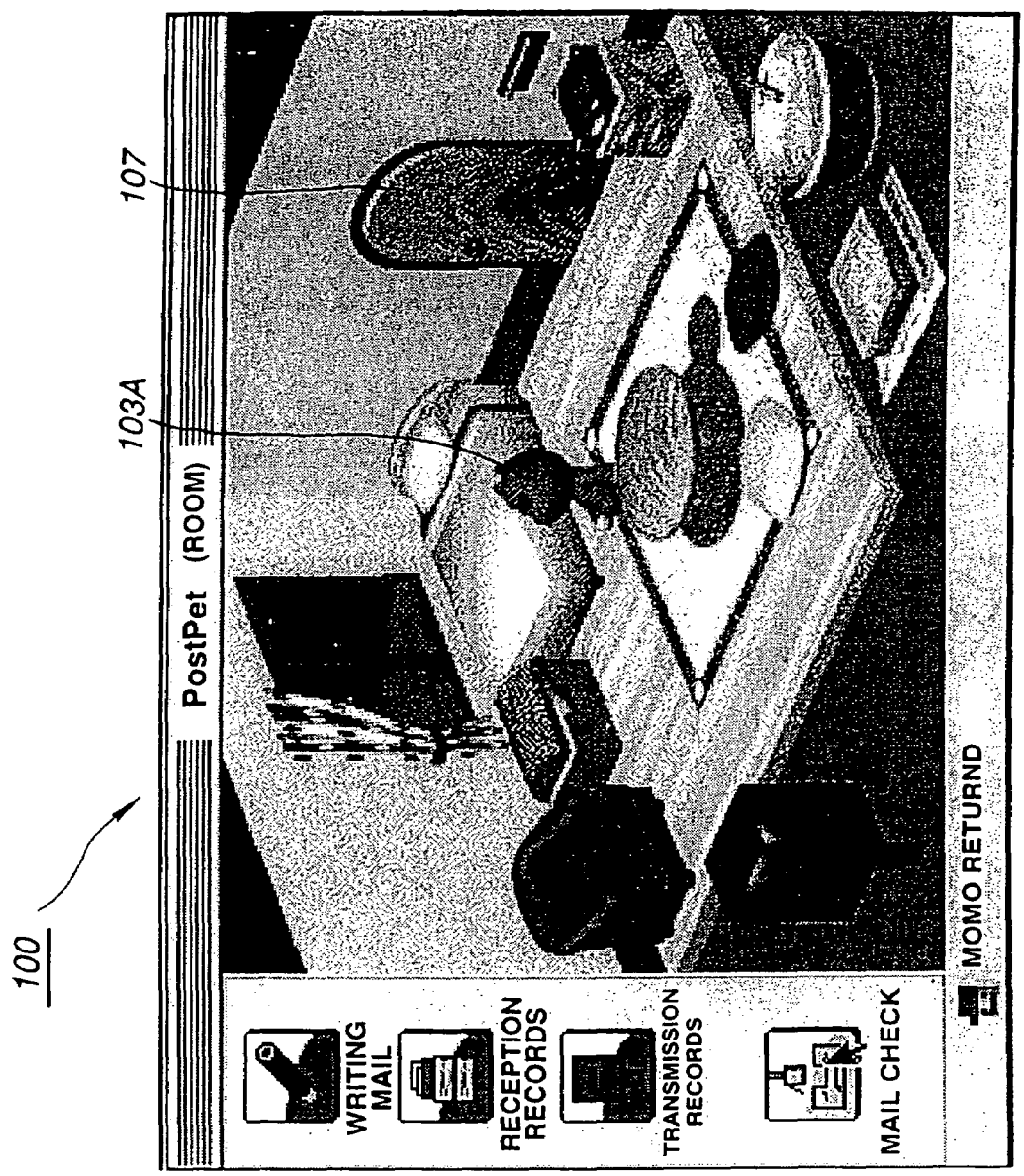
FIG. 31 similarly shows the state of a GUI picture of 'PostPet (Room)' when the mail has been sent by the post pet and the post pet has returned.
Figure 33:
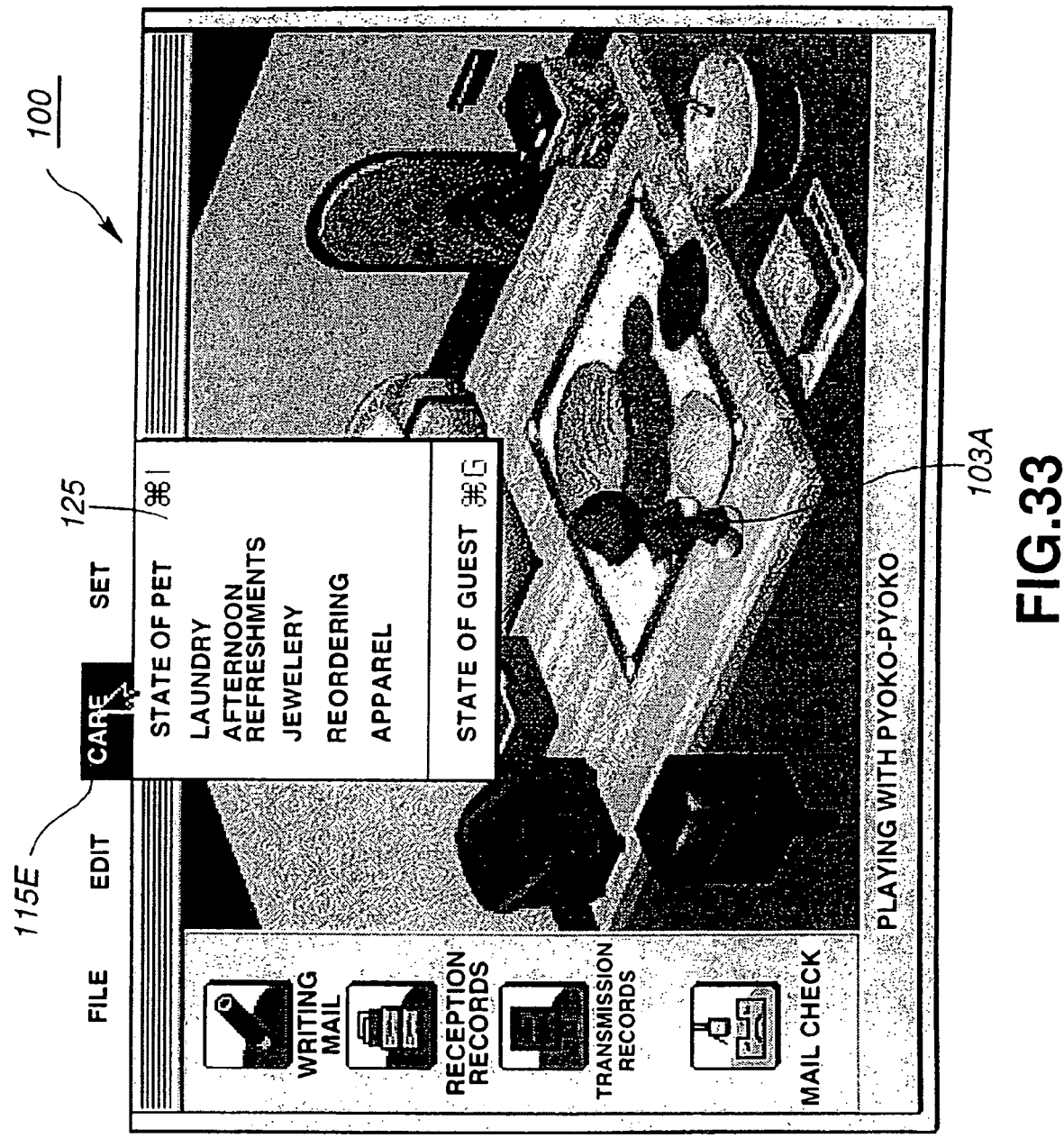
FIG. 33 shows the state of clicking an icon commanding looking after the post pet on the GUI picture of the 'PostPet (Room)' for opening a pulldown menu.
Figure 35:
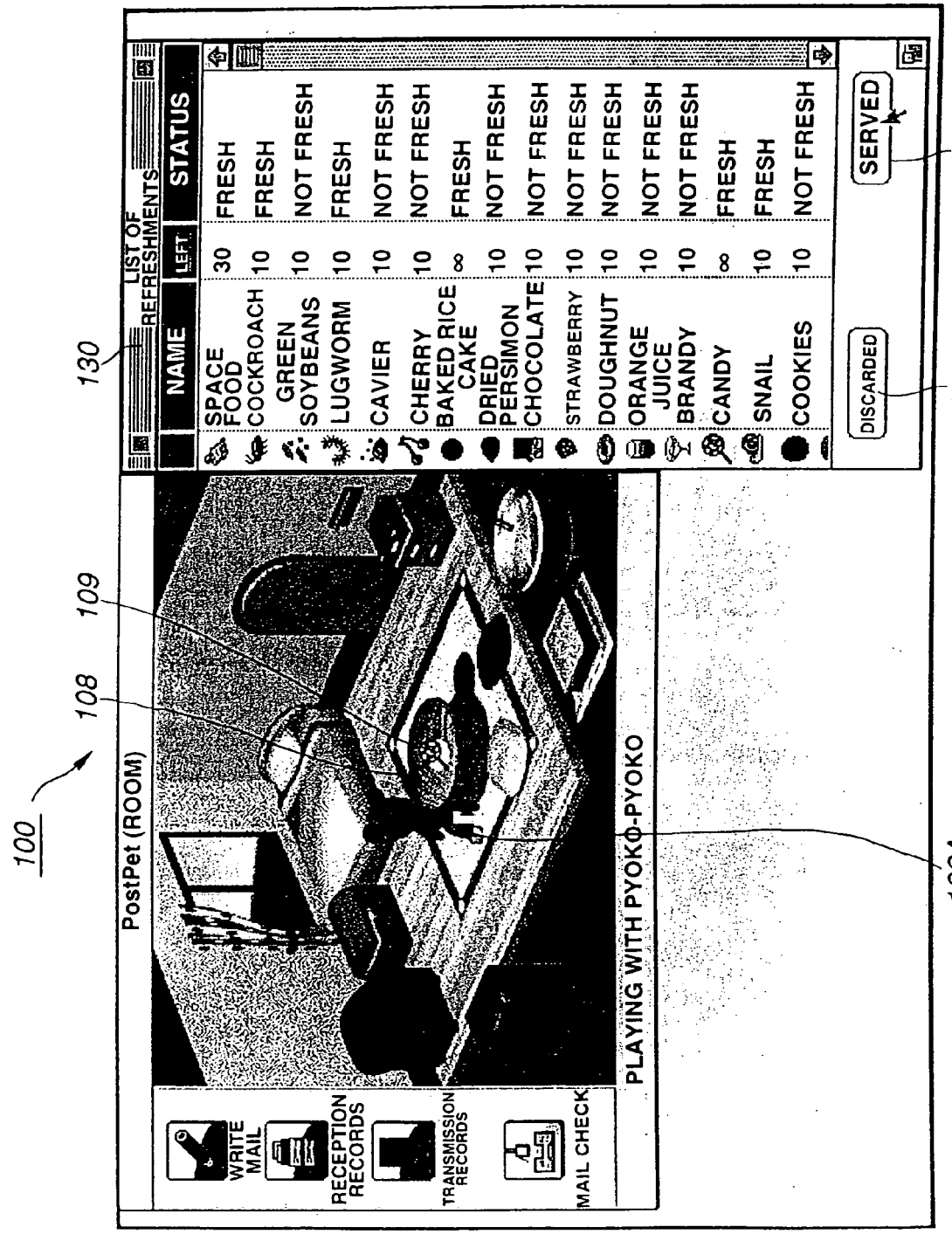
FIG. 35 shows the state of clicking a button 'served' on a window opened on selecting 'refreshment' on the pull-down menu on the GUI picture of the 'PostPet (Room).'

If the icon 115E for looking after the post pet 103 staying in the room is clicked on the GUI picture 100 of the 'PostPet (Room)' as shown in FIG. 31, there is opened a pulldown menu 125 specifying items such as 'state of the pet', 'wash' or 'refreshments' showing the contents of care as shown in FIG. 33. If the item 'refreshments' is selected, there is opened a window 130 showing a list of names of refreshments, remaining quantity and quality of the refreshments, as shown in FIG. 34. In the window 130 showing the list of names of refreshments, there are a 'discard' button for discarding of the selected refreshments and a 'serve' button for giving the selected refreshments to the post pet 103. If any of the listed refreshments is selected and the 'serve' button 122 clicked, the selected refreshment, for example a candy 109, is put on a table 108 as shown in FIG. 35. Thus, the candy 109 is given to the post pet 103 staying in the room. Although there are provided a number of sorts of refreshments as default, an up-to-date list of refreshments may be procured, such as by downloading from the WWW server on the Internet, and appended to the 'refreshments' folder present in the same directory as the PostPet.exe which is the execution file or the E-mail sending program by way of adding the new 'refreshments' file.

Figure 32:
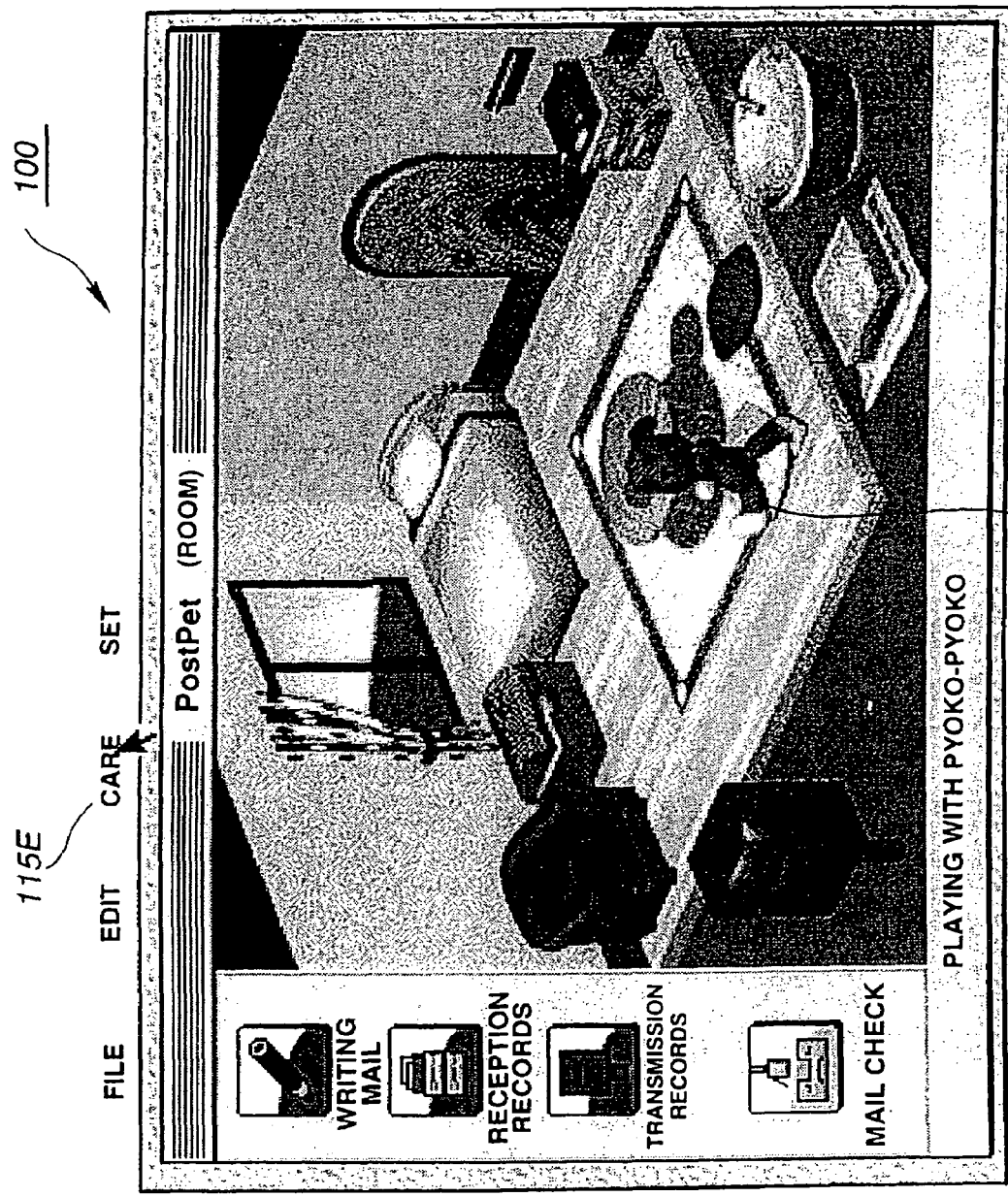
FIG. 32 shows the state of clicking an icon commanding looking after a post pet on the GUI picture of the 'PostPet (Room).'
Figure 36:
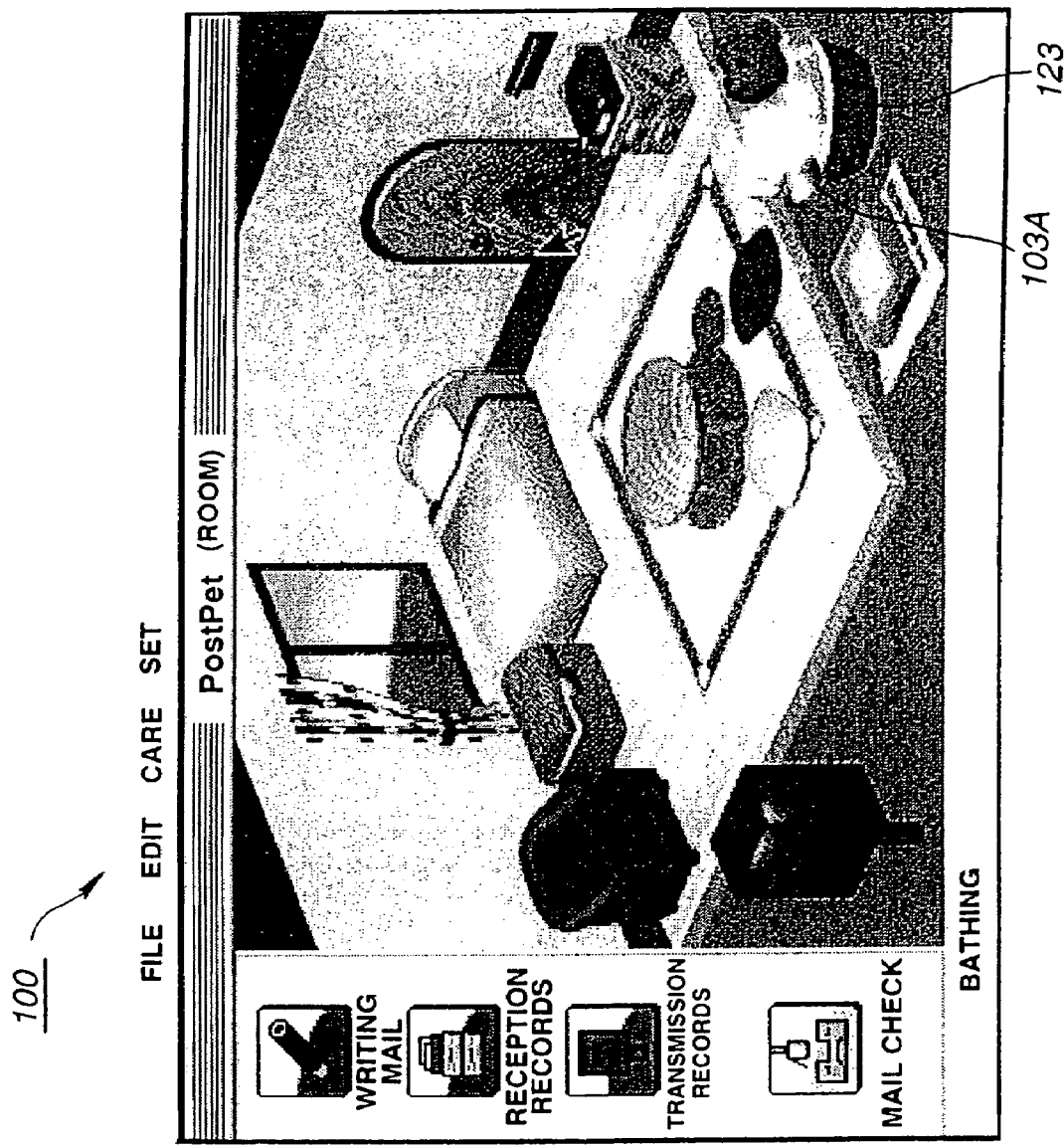
FIG. 36 shows the state in which an item 'Wash' of the pulldown menu on the GUI picture of the 'PostPet (Room)' has been selected.
Figure 37:
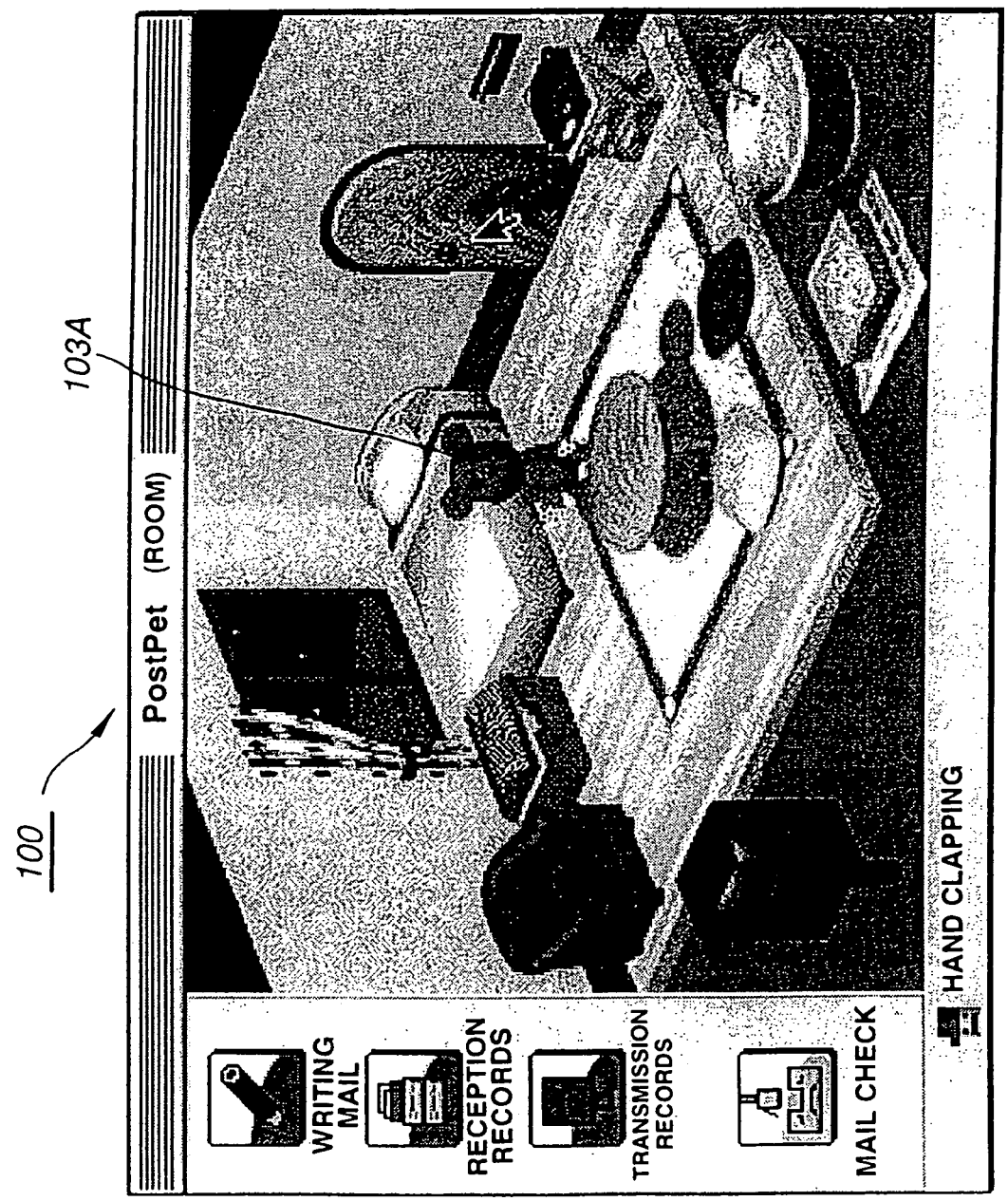
FIG. 37 shows the state in which the post pet on the pull-down menu on the GUI picture of the 'PostPet (Room)' is contaminated.

If the item 'wash' displayed on the pulldown menu shown in FIG. 32 is selected, the post pet 103 takes a bath using a pail 123 on the GUI picture 100 of the 'PostPet (Room)', as shown in FIG. 36. At this time, a message reading: "Taking Bath" is displayed on the lower side of the GUI picture 100 of the 'PostPet (Room)'.

The post pet 103 has become dirty due to outing for mail dispatch or taking refreshments. The dirty state is shown by dots on the post pet 103 as shown in FIG. 36. These dots are removed on selecting the item 'wash' displayed on the care pulldown menu 125 to get the pet take a bath.

Figure 38:
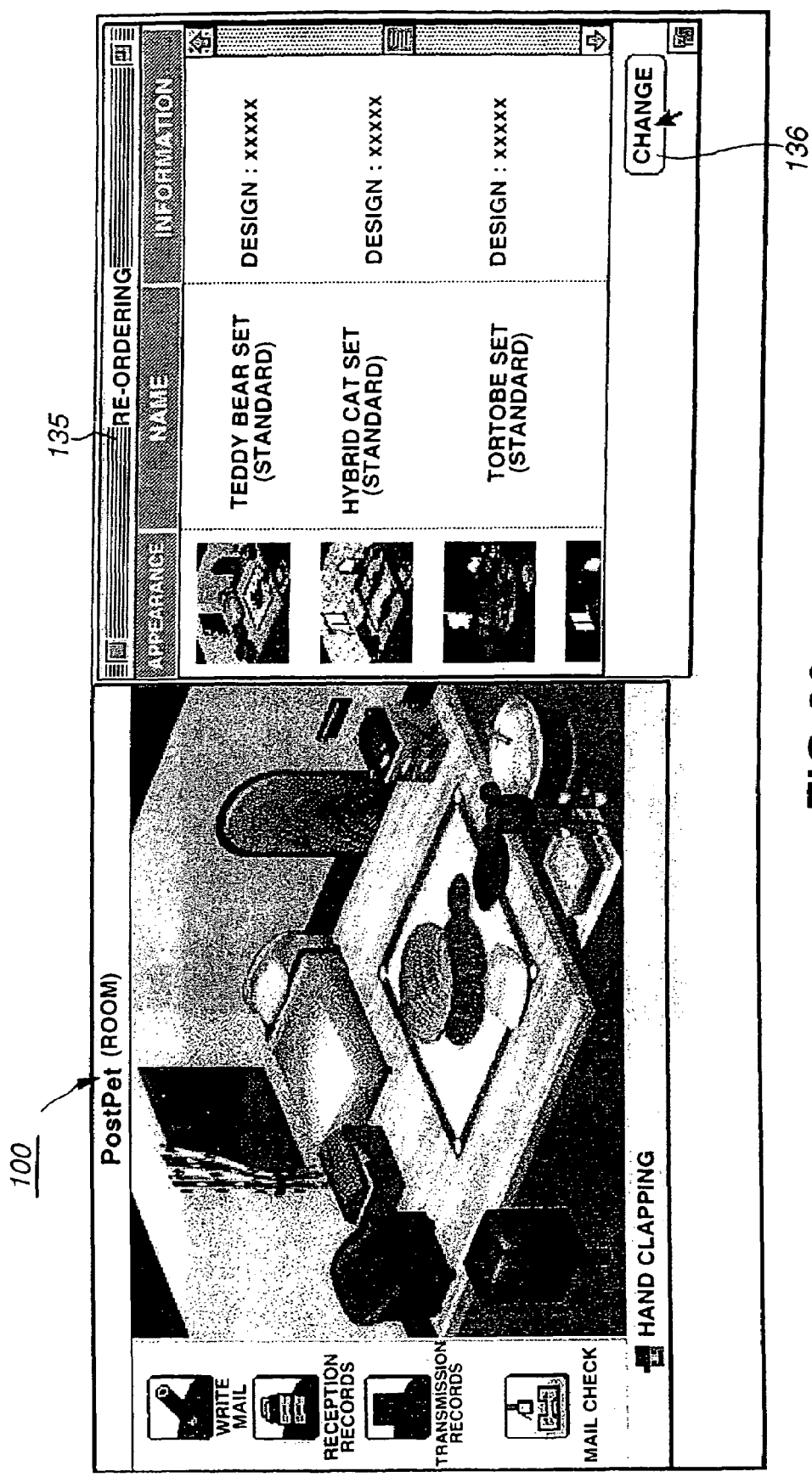
FIG. 38 shows the state in which an item 'Re-Ordering' of the pulldown menu on the GUI picture of the 'PostPet (Room)' is selected.
Figure 39:
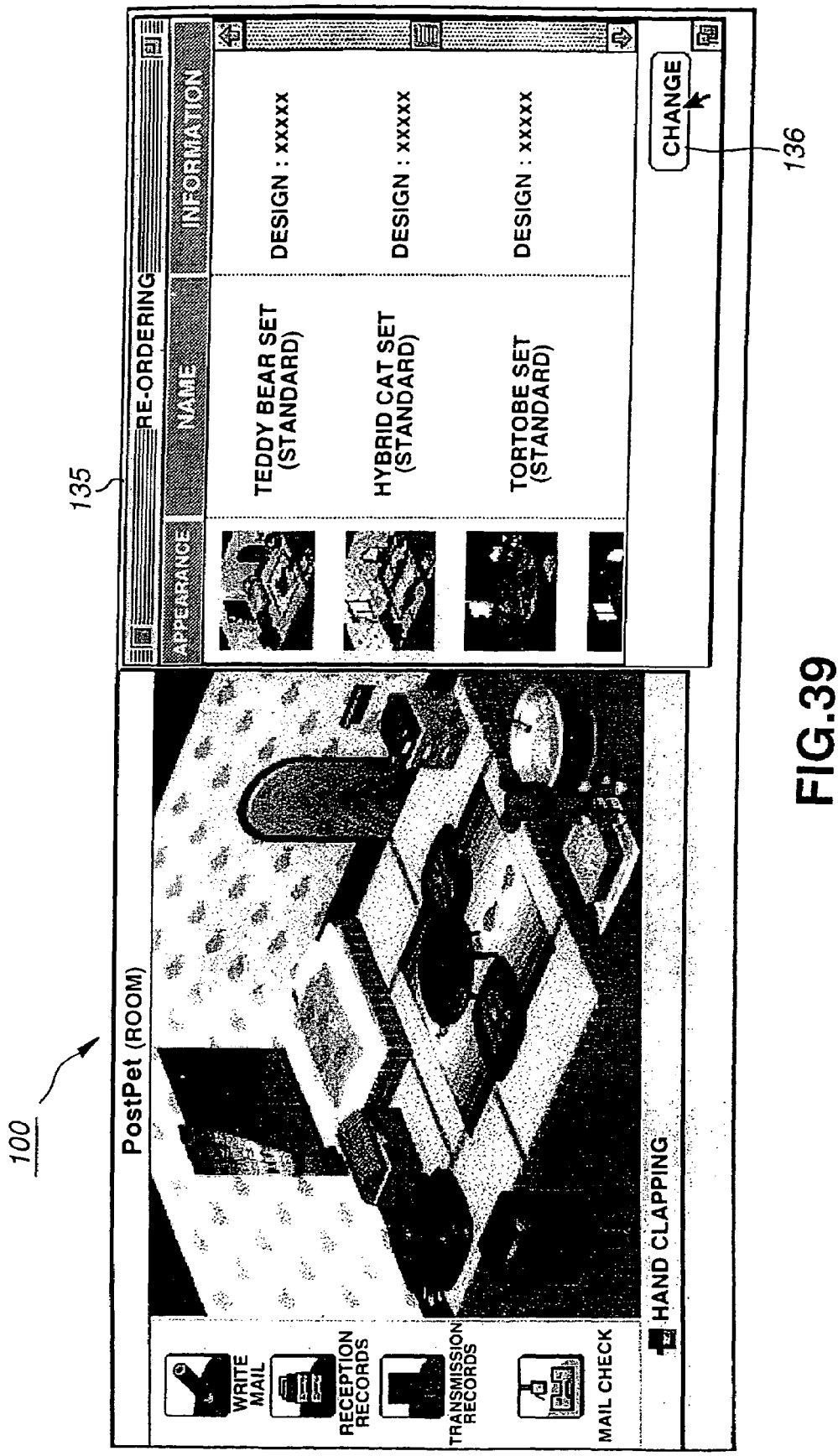
FIG. 39 shows the GUI picture of the 'PostPet (Room)' when the re-ordering is executed.

If an item 'Re-ordering' displayed on the care pulldown menu 125 is selected, a 're-ordering' window 135 shown in FIG. 38 is opened. If a desired room, such as a hybrid cat set shown netted in FIG. 38, is selected, and a changed button 136 is pushed, the room re-ordering is performed as shown in FIG. 39. Although there are provided a number of types of room re-ordering as default, an up-to-date list of refreshments may be procured, such as by downloading from the WWW server on the Internet, such as from the following URL: http.://www,so-net.or.jp/postpet/index. html, and appended to the 'plug-in' folder present in the same directory as the PostPet.exe, which is the execution file of the E-mail sending program, by way of adding the new 'room re-ordering' file.

If an item 'state of pet' displayed on the care pulldown menu 125 is selected, the window 138 shown in FIG. 40 is opened for displaying the state of the pet. Depending upon the state of the pet displayed on the window 138, the user can recognize the sort, name, sex, age, degree of happiness, brain, condition, hungriness, slimness, pocket money and comment. The degree of happiness or brain can be variably represented by pet parameter values.

Figure 47:
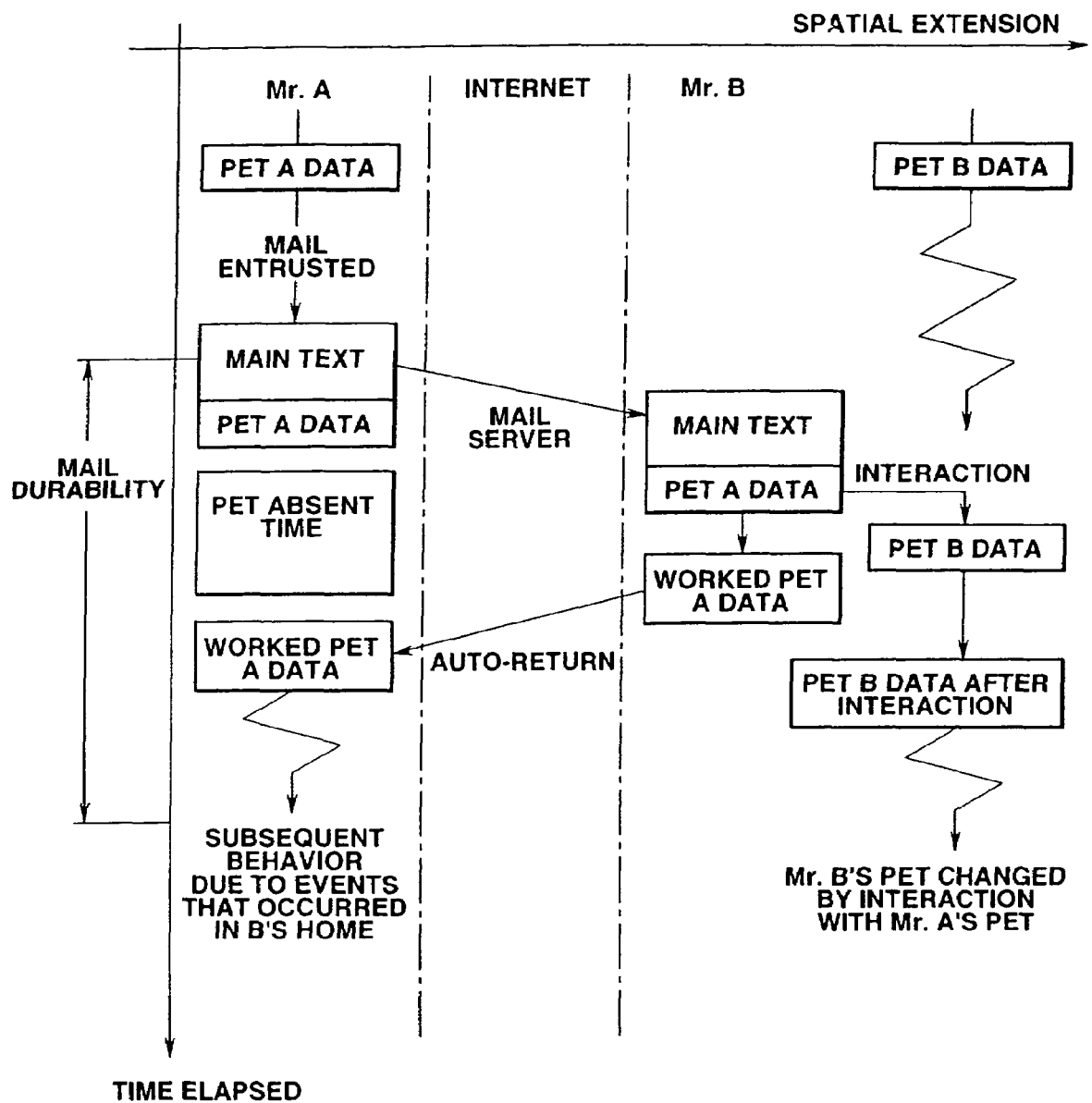
FIG. 47 is a timing chart showing the sequence of E-mail exchange in a state in which two personal computers each having installed therein the mailer are connected concurrently to the communication network.
Figure 48:
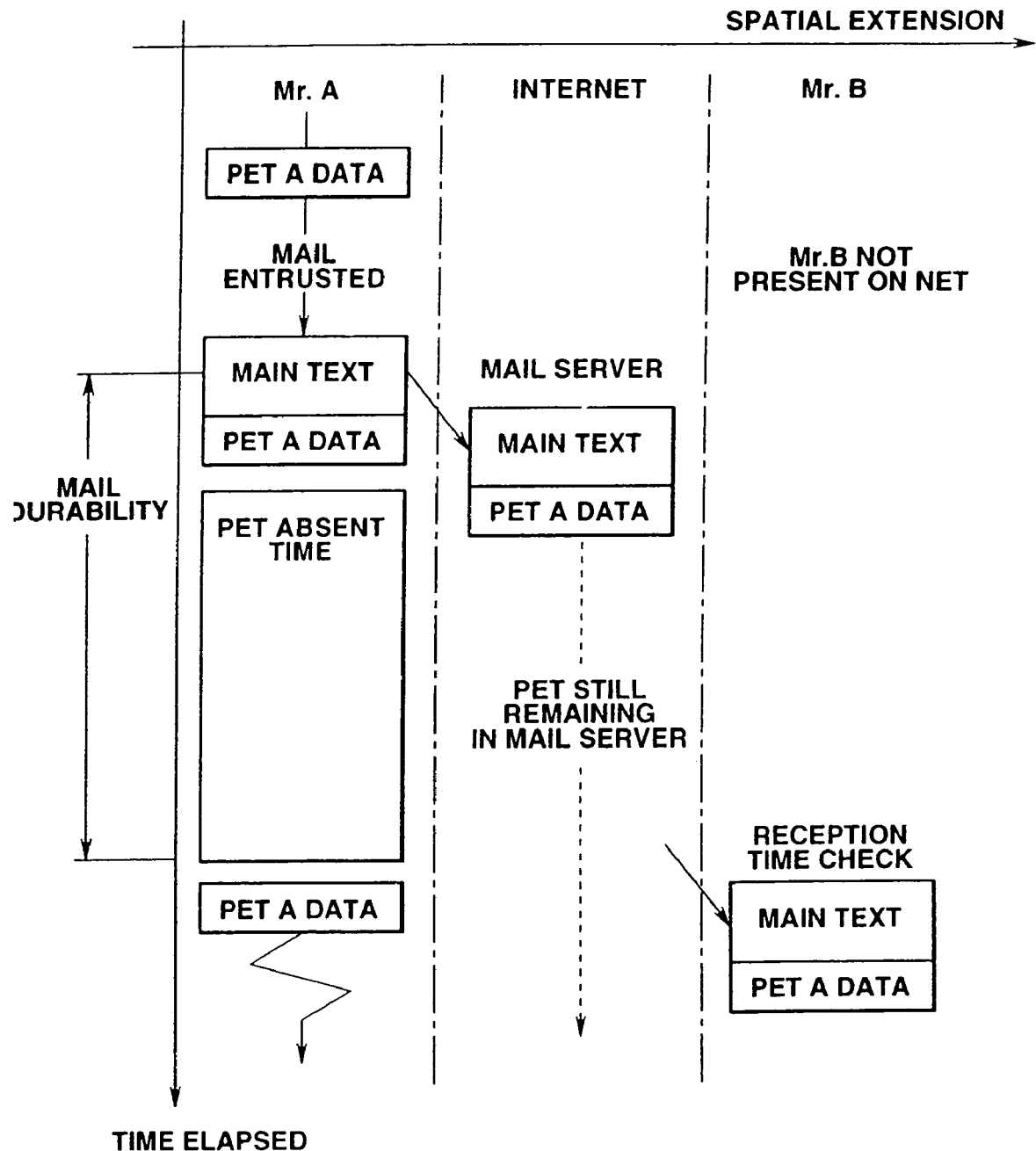
FIG. 48 is a timing chart showing the sequence of E-mail exchange in a state in which two personal computers each having installed therein the mailer are connected with a time offset to the communication network.
Figure 49:
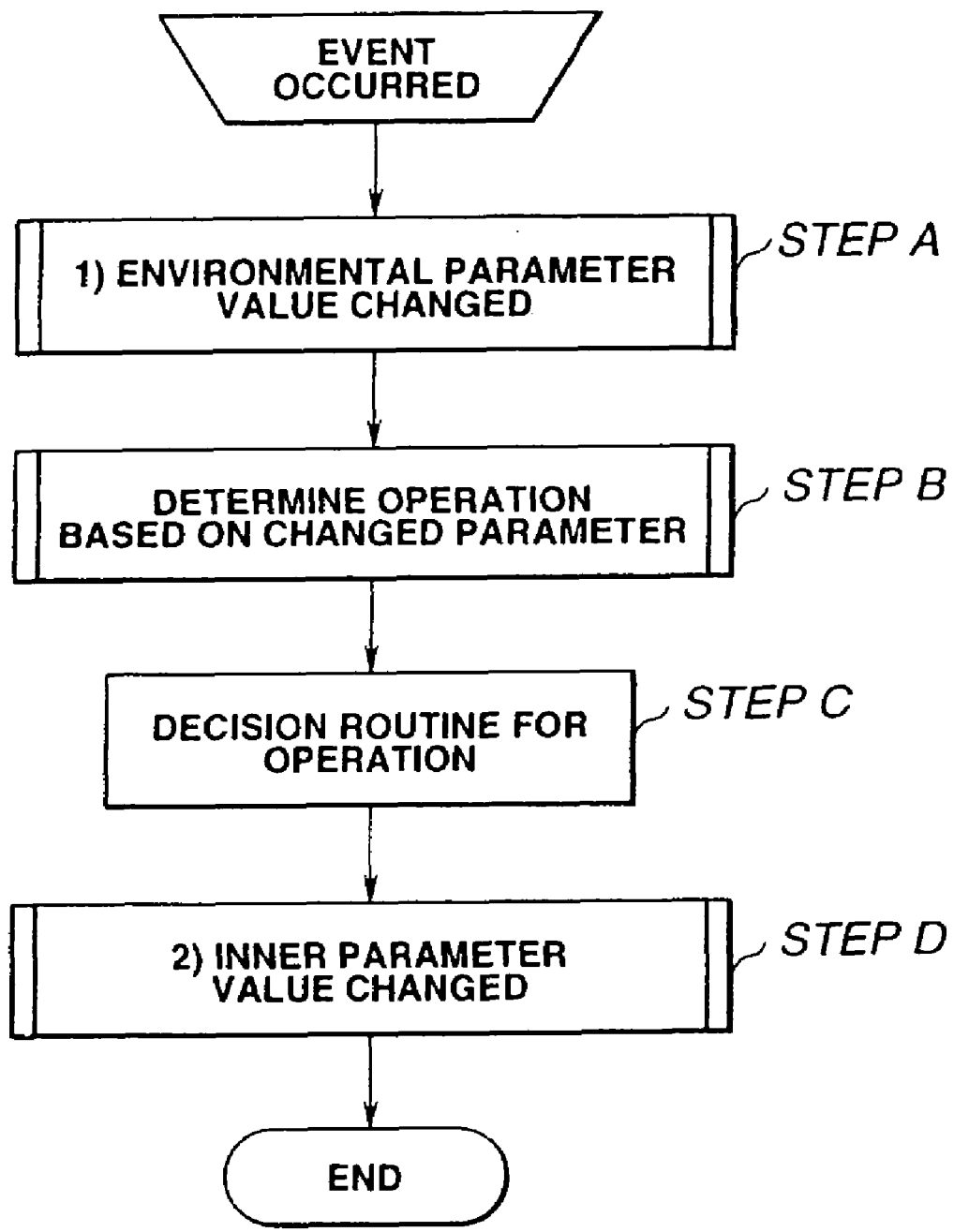
FIG. 49 is a flowchart showing event processing of a feeling unit which governs the behavior of the post pet.
Figure 50:
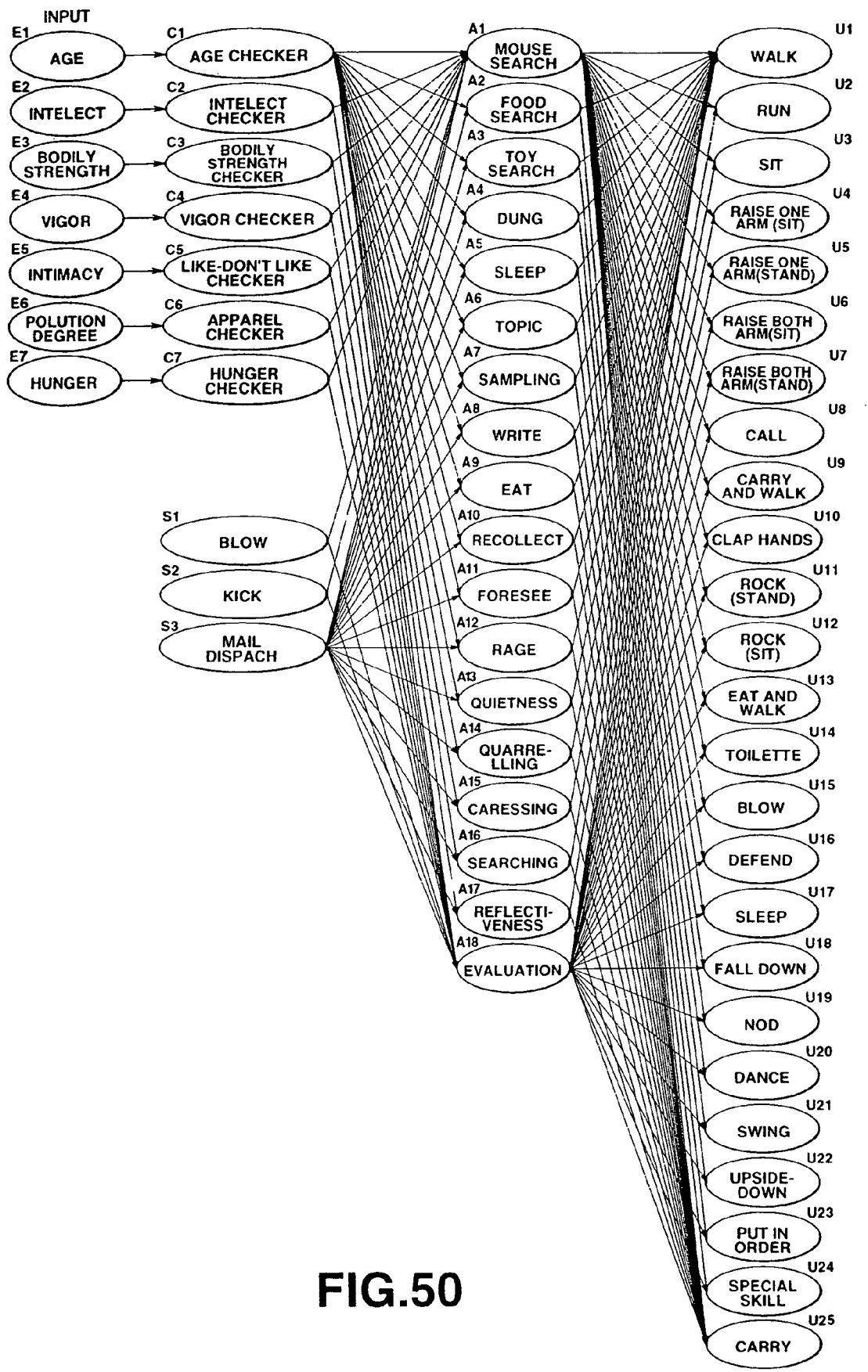
FIG. 50 illustrates the technique of determining the behavior of a post pet by an agent parameter.

Between personal computers 22 having the mailer function similar to that of the personal computer 21 having the above-described mailer function, E-mails can be exchanged by the post pet 103. If the personal computer 21 executes E-mail sending by the post pet 103A to send the E-mail to the personal computer 22, the latter executes the reception subroutine shown in FIG. 12 to check the E-mail reception time by the post pet 103A as shown by the time chart shown in FIG. 47. If the time is within the mail life, the post pet 103A is displayed on the screen of the display device 21B to automatically return the processed agent parameters.

If the sending side personal computer 21 executes the E-mail sending by the post pet 103A, the post pet 103 is absent that is outing, on the GUI picture of the 'PostPet (Room)', until the agent parameters of the post pet 103A are returned from the receiver such that the post pet 103 cannot execute mail sending. However, if the agent parameters are returned automatically within the mail life, the sole post pet 103A can be used repeatedly for sending the E-mails one-by-one.

In the sending personal computer 21, the operation determined by the automatically returned agent parameters is executed by the post pet 103A. Further, if a post pet 103B is registered as an agent on the receiving side personal computer 22, the agent parameters of the post pet 103B are changed, upon reception of the E-mail by the post head 103A sent from the personal computer 21, by the interaction with the post pet 103A performing the operation as determined by the agent parameters annexed to the E-mail.

If, when the personal computer 21 executes the E-mail sending by the post pet 103A to send the E-mail to the personal computer 22, the personal computer 21 fails to execute the reception subroutine shown in FIG. 11, that is, if the personal computer 22 is not connected to the communication network, the E-mail is reserved in the mail server on the Internet service provider 12 such that the E-mail is received at a time point the personal computer 22 is connected to the communication network. In this case, the post pet 103A stays in the mail server until the E-mail is received. Thus, with the sending personal computer 21, mail sending by the post pet 103A cannot be executed, with the post pet 103A being absent, that is when the post pet 103A is on an outing, on the GUI picture of the 'PostPet (Room)'. Therefore, the E-mail sent by the post pet 103A is designed to have a preset life, such that, if the agent parameters of the post pet 103A are not returned from the receiving side within the mail life period, the agent parameters of the post pet 103A are automatically generated upon expiration of the mail life period for causing the post pet 103A to appear on the GUI picture of the 'PostPet (Room)'.

Upon connection to the communication network, the receiving side personal computer 22 checks the reception timing of the E-mail by the post pet 103A to determine whether the time is within the mail life period based on the sending data and time information of the agent parameters annexed to the E-mail and on the mail life period information. If the time is within the mail life period, the processed parameters are automatically returned after waiting until the commencement of the above-mentioned reception subroutine. On the other hand, if the reception timing of the E-mail by the above-mentioned post pet 103A is after the expiration of the mail life period, the post pet 103A is not displayed since the agent parameters are not returned even if the above-mentioned reception subroutine is executed.

The pet arrival confirmation mail function, which is an additional function of the automatic mail return processing of the step SP57 of FIG. 11, is hereinafter explained.

For making the animation display on the E-mail sending side GUI picture 100 for indicating the state of the post pet 103 returning home, the main text 202 of the pet mail received on the receiving side is deleted at step SP57. In addition, the agent parameters 203 are processed on the basis of actuation by the user so that only the processed agent parameters 203 are annexed to the mail header 201 for automatic return mail. This enables the Email sending side to make animation display on the GUI picture 100 showing the post pet 103 returning home as shown in FIGS. 28 to 30 by the above-mentioned processing at the step SP49.

The function of automatic return mailing to the sender for advising the effect of arrival of the post pet as a text message of the E-mail, in addition to automatic return mailing of the agent parameters 203, is the pet arrival confirming function.

Referring to FIGS. 52 to 55 showing the processing flow, an 'automatic return mail A' is automatically returned from the receiving side personal computer 22 of the user B via mail server 11D to the personal computer 21 of the sending side user A. In addition, 'automatically returned mail A', a 'pet arrival confirmation mail' is automatically returned from the receiving side personal computer 22 of the user B via mail server 11D to the personal computer 21 of the sending side user A.

This 'pet arrival confirmation mail' is automatically generated by the E-mail sending/receiving program of the receiving side personal computer 22 of the user B.

Figure 55:
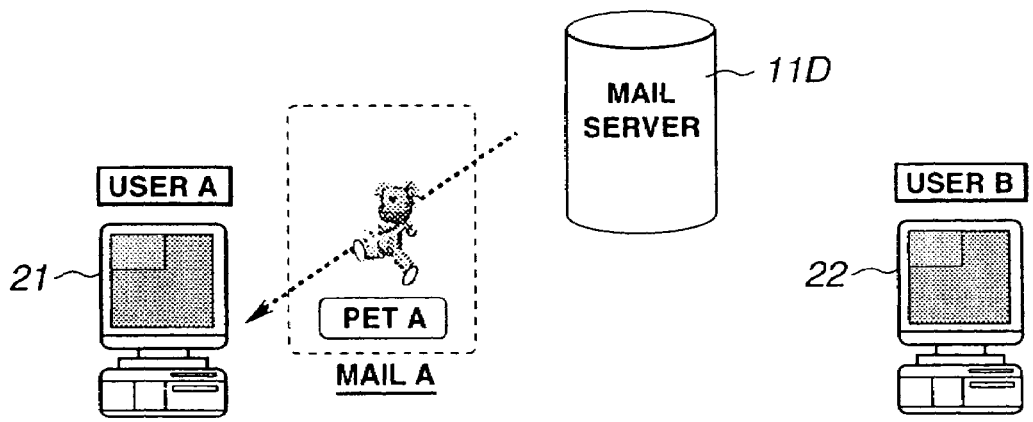
FIG. 55 schematically shows reception of an agent parameter automatically returned from the user B.

It is assumed that, in a GUI picture 140 of a setup shown in FIG. 55, the user A sets 'Momo' as the name of his or her pet, while the user B sets 'Mippi' as the name of his or her pet.

The following mail is then set as the 'pet arrival confirmation mail'.

That is, a 'secret diary' is automatically set as the title (Subject), and a main text reading, for example:

"Today, I went (to the user B).
I played with Mippi.
I was hit a little.
I was hit many times.
Momo." is set automatically.

This 'pet arrival confirmation mail', in addition to the 'automatically returned mail A', is automatically returned from the receiving side personal computer 22 of the user B via mail server 11D to the personal computer 21 of the sending side user A.

This adds the 'pet arrival confirmation mail' entitled 'secret diary' to the reception list of the user A, as is the usual E-mail.

This 'pet arrival confirmation mail', automatically generated by the E-mail sending/receiving program of the personal computer 22 of the user B, has the main text corresponding to the act of the user B on the post pet who delivered the mail, such as the act of caressing or hitting. This gives not only the practical effect of confirming the delivery of the E-mail to the receiving side but also the psychological effect that the keeper can actually feel the fact that the post pet is serving on his or her behalf.

It is noted that the behavior of the post pet is determined by the agent parameters 203 as follows:

Specifically, the relative intensities of the pseudo-desires are determined by the environment of the post pet and the stimuli from the user. Each desire agency has a score and sensitivity, whilst each behavior unit adds new scores with the scores of each desire agency as an input. The behavior unit having the maximum score is manifested.

The score of the behavior unit and the desire agency is calculated by:

new score=old score+(input×sensitivity)

with the sensitivity being the depth of the relation between each desire agency and the behavior unit and the input element. The sensitivity itself is also changed with input.

That is, the feeling unit determining the post pet behavior captures changed values of environmental parameters of the post pet at step A, determines the behavior based on the changed environmental parameters at step B, judges the behavior taken at step C and modifies the value of the inner parameters at step D by way of performing event processing.

Figure 51:
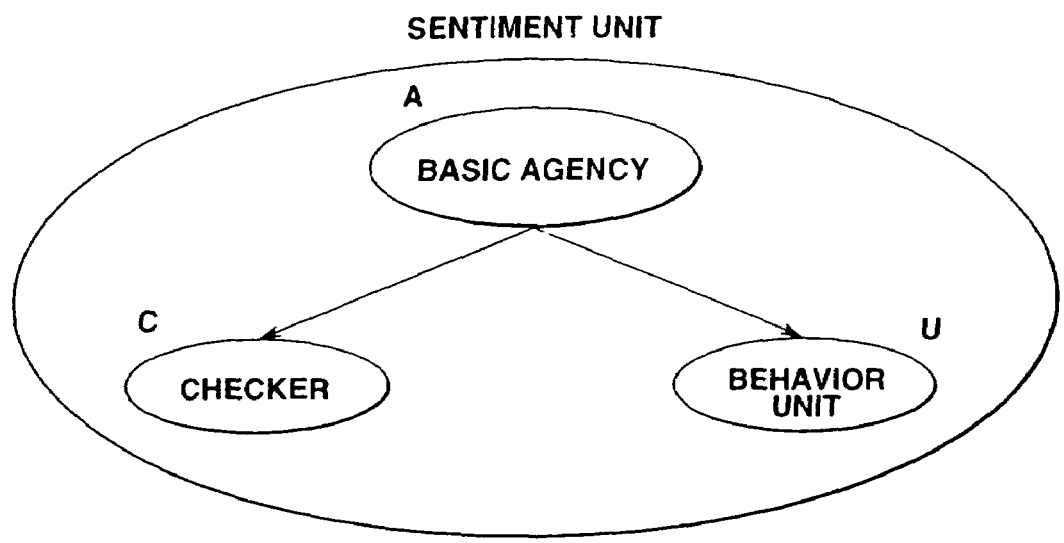
FIG. 51 shows the basic structure of the feeling unit.

Specifically, the agencies A1 to A18 of various desires receives environmental information items E1 to E7, specifying the environment of the input post pet, such as age, intellect, physical strength, vigor, intimacy, dirtiness or hungriness, and the information on stimuli, specifying the stimuli on the post pet from the user, such as hitting, kicking or dispatching an E-mail, as input, in order to check the environmental information items E1 to E7, through an age checker C5, an intelligence checker C6, a physical strength checker C3, a vigor checker C4, a like-don't like checker C5, an apparel checker C6 and a hungriness checker C7, while directly checking the information on stimuli, for calculating respective scores. Each of behavior units U1 to U25 has the scores of the desire agencies, thus calculated, as the input, and the behavior unit having the maximum score is started. That is, the feeling unit is made up of a basic agency A, a checker C and a behavior unit U, as shown in FIG. 51 showing the basic units for reaction.

The above-mentioned desire agencies may be exemplified by a mouse searcher A1 desirous to search for a mouse, a food searcher A2 desirous to search for food, a toy searcher A3 desirous to search a toy, a bathroom seeker A4 who seeks a bathroom, a sleep liker A5 desirous of sleep, a speech liker A6 desirous to have a chat, a sampling liker A7 desirous to make sampling, a writer A8 desirous to write letters, an eater A9 having strong appetite, a recollector A10 desirous to recollect the past, a soothsayer A11 desirous to make prophets, a rioter A12 desirous to make rages, a quietness liker A13 who likes quietness, a quarrel liker A14 desirous to make quarrels, a caress liker A15 desirous to be caressed, a searcher A16 desirous to make searches, a reflection liker desirous to be reflective and an evaluation liker A18 desirous to make evaluations.

The behavior units may be exemplified by a walking unit U1 for animated representation of the walking motion, a running unit U2 for animated representation of the running operation, a sitting unit U3 for animated representation of the sitting operation, a sit-and-raise-one-hand unit U4 for animated representation of the motion for sitting and raising one hand, a sit-and-raise-both-hands unit U5 for animated representation of the motion for sitting and raising both hands, a standup-and-raise-one-hand unit U6 for animated representation for the motion of standing up and raising one hand, a standup-and-raise-both-hands unit U7 for animated representation for the motion of standing up and raising both hands, a calling unit U8 for animated representation for the calling motion, a carry-and-walk unit U9 for animated representation for the carrying and walking motion, a hand-clapping unit U10 for animated representation for the hand-clapping motion, a standup-and-riot unit U11 for animated representation for the standing up and rioting operation, a lie-and riot unit U12 for animated representation for the lying and rioting operation, an eat-and-write unit U13 for animated representation for the eating and writing operation, a toilette unit U14 for animated representation for the going to the bathroom, a hit unit U15 for animated representation for the hitting operation, a defense unit U16 for animated representation for the defending operation, a sleeping unit U17 for animated representation for the sleeping operation, a fall-down unit U18 for animated representation for the falling-down operation, a nodding unit U19 for animated representation for the nodding operation, a dancing unit U20 for animated representation for the dancing operation, a swinging unit U21 for animated representation for the swinging operation, an stand-upside-down unit U22 for animated representation for the stand-upside-down operation, a put-into-order unit U23 for animated representation for the putting-into-order or housing operation, a special technique unit U24 for animated representation for showing the special technique, and a carrying unit U25 for animated representation for the carrying operation.

In the present embodiment, about 50 illustrative sentences are provided for the post pet 103. These sentences are ranked depending on the 'intellect' of the post pet 103. For example, if the eat-write unit U13 is started, an illustrative legend belonging to a rank 'intellect' at the time point is selected at random. The intellect of the post pet 103 is varied depending on the age E1 of the post pet 103 as set by the time elapsed since registration in the user computer or the serial number information 203 specifying the number of mail handled by the post pet 103.

The selected sentence is sent as the E-mail on randomly selecting the counterpart of the E-mailing to whom the user has so far sent E-mails, including the user.

Among the illustrative sentences voluntarily sent by the post pet 103, there are such sentences as "ah-" or "I say-" uttered when the pet is just installed and is at a low intellectual stage; "I have realized the structure of mailing-it is rather simple" uttered when the pet is at a medium intellectual stage; "All's well for me" uttered when the pet is at an advanced intellectual stage; and a farewell mail: "My time seems to have come to a close—I can no longer think—I'm going lest you should feel sad—I've been happy So long". These sentences are provided separately or in common for different pet species.

The post pet 103A of the present embodiment can voluntarily send to the user or to his or her counterpart an E-mail with an illustrative sentence running: "My name is Momo—please remember me". The scores of the eat-write unit U13 is varied with the age E1, intellect E2, bodily strength E3, or the vigor E4 of the post pet 103, and is automatically reset at a timing the post pet voluntarily sends an E-mail. Bodily strength E3 or the vigor E4 of the post pet 103 are varied with the stimuli from or the contents of experiences with the user or his or her E-mailing counterparts. For example, the bodily strength of the post pet 103 is lowered or increased upon sending an E-mail or upon eating or sleeping, respectively. On the other hand, the vigor E4 of the post pet 103 is lowered or increased upon being persecuted or caressed by the user or his or her counterparts, respectively. This enables the post pet 103 to send many E-mails voluntarily to the user or his or her counterparts.

For preventing the user from disliking the post pet 103 as a result of the increased age E1 or intellect E2 of the post pet 103 resulting in the increased number of times of dispatching E-mails to the user or to his or her counterparts and in repeated occurrences of the same sentences, a 'life' is set for the post pet 103.

This 'life' for the post pet 103 is two years and is varied with the physical strength E3 or the vigor E4.

The post pet 103, whose life has come to a close, sends the final E-mail reading, for example: "Momo now goes to an unknown place . . . Thank you for your attention to me . . . So long" to the user or to his or her counterparts to stop the function as an agent.

Figure 52:
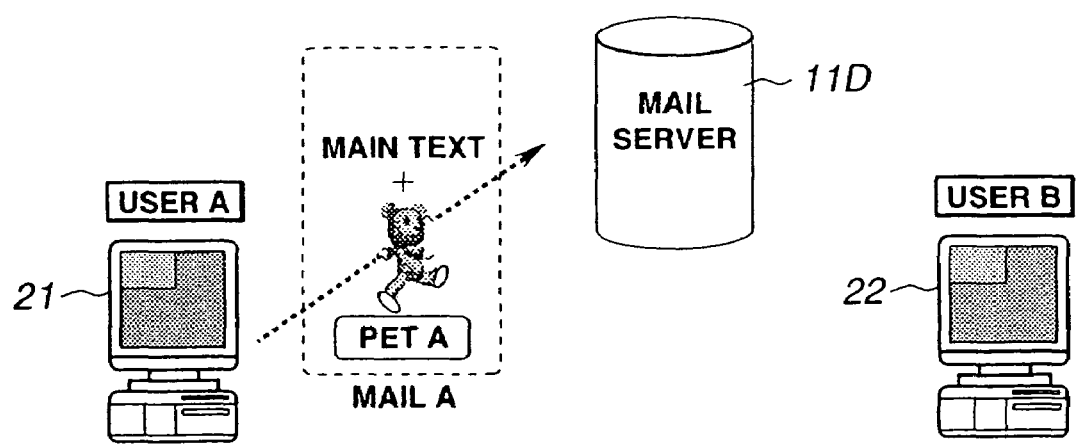
FIG. 52 schematically shows sending a mail A form a user A to another user B by the post pet.

With the above-described E-mail system, the 'post pet' of the personal computer 21 of the user A encodes the agent parameters as a mail of the MIME format along with the main text of the mail carried by the pet A and sends the encoded mail A to the destination, that is, to the user B as shown in FIG. 52. This eliminates the pet A from the personal computer 21 of the user A.

Figure 53:
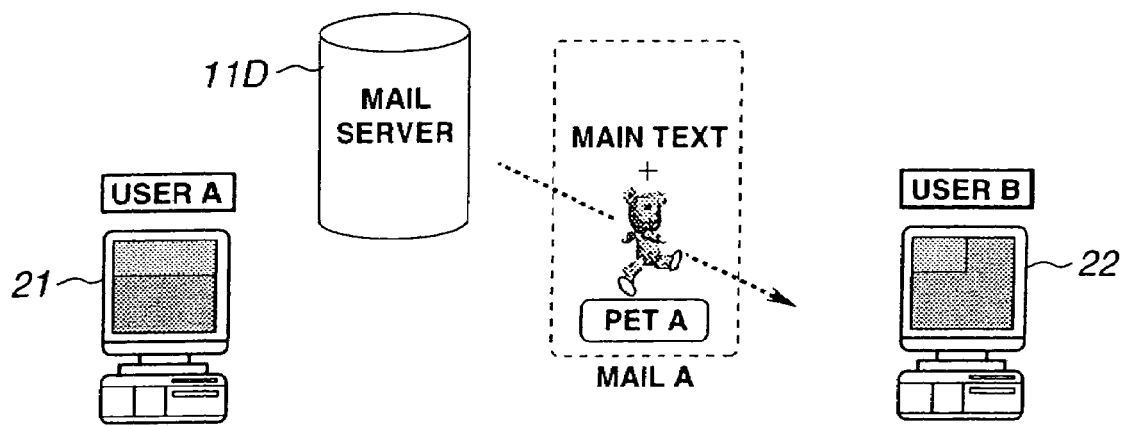
FIG. 53 schematically shows capturing the mail A by the user B.

If next the 'post pet' of the user B of the destination executes mail check, the mail A is captured by the 'post pet' of the personal computer 22 of the user B, as shown in FIG. 53.

Figure 54:
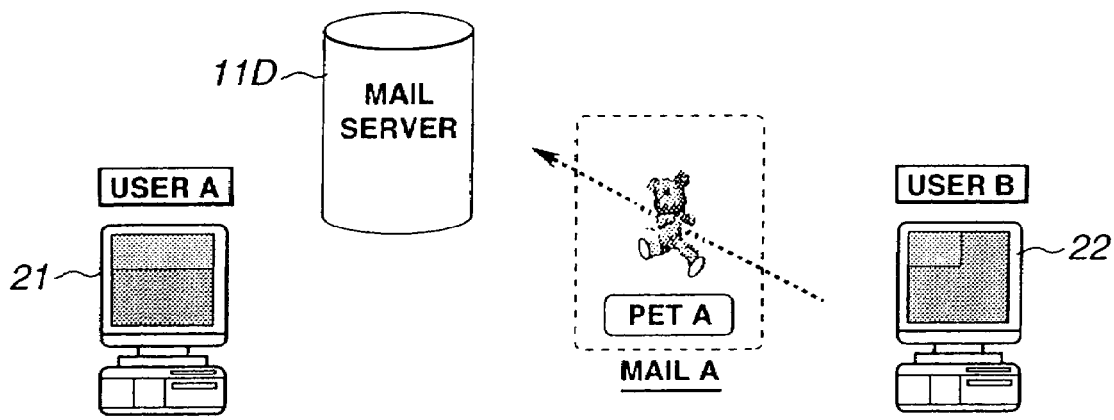
FIG. 54 schematically shows automatic mail returning of an agent parameter by the user B.

Then, the 'post pet' of the user B records changes in the state of the pet A caused by various events occurring in the pet room of the user B and sends the pet A back to the user A as the 'automatically returned mail A', as shown in FIG. 54.

If the user A checks the mail by the 'post pet' of the personal computer 21, the automatically returned mail A' is captured as shown in FIG. 55. Thus, the 'post pet' of the personal computer 21 of the user A uses the new agent parameters reflecting the events that occurred at the user B.

That is, by having the picture data of the agent on the personal computers of the user and the counterpart of the E-mailing of the user, and actually sending agent parameters controlling the agent's behavior, the result as though picture data of the agent were being sent is obtained. By sending the agent parameters instead of the picture data, the user connection time is shortened, such that, for a dial-up user, the Internet connection charges and telephone charges are reduced. Moreover, since the amount of exchanged data is relatively decreased, use of the resources of the Internet in their entirety may also be reduced.

Figure 56:
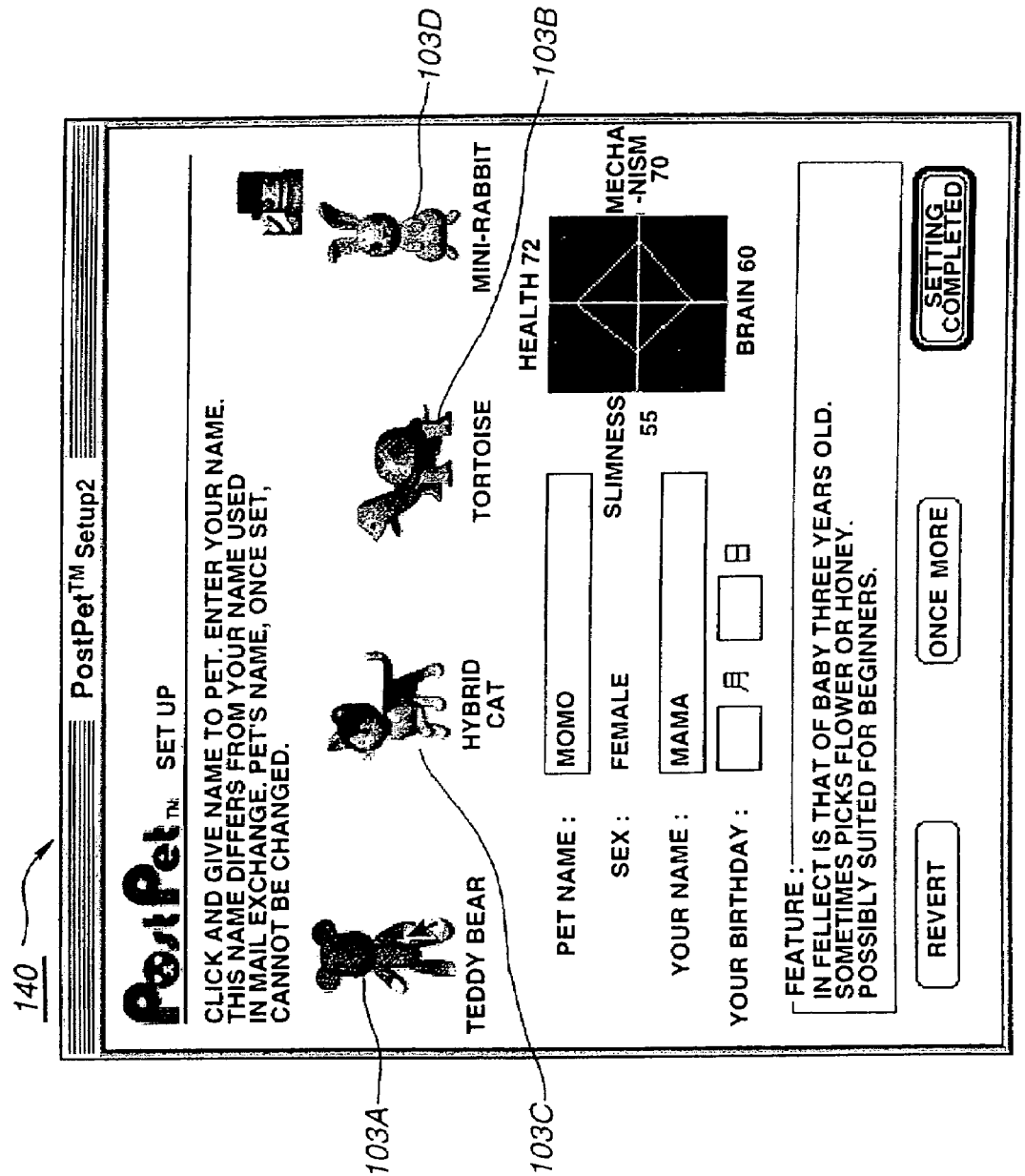
FIG. 56 shows a GUI picture for selecting the post pet.

Meanwhile, if the post pet is started first, the GUI picture 140 for selecting the pet is displayed as shown in FIG. 56, such that one of the Teddy-bear 103A, tortoise 103B, hybrid cat 103C and mini-rabbit 103D can be selected. The parameters of 'condition', 'temper', 'brain' and 'slimness' are varying at all times and are set by the timing of selecting (clicking) the pet. It should be noted that the parameters as set by the timing of selecting (clicking) the pet are initial values, and are varied depending on the pet keeping state of the user. The items 'pet's name' and 'your name' can be freely entered by the user.

Figure 57:
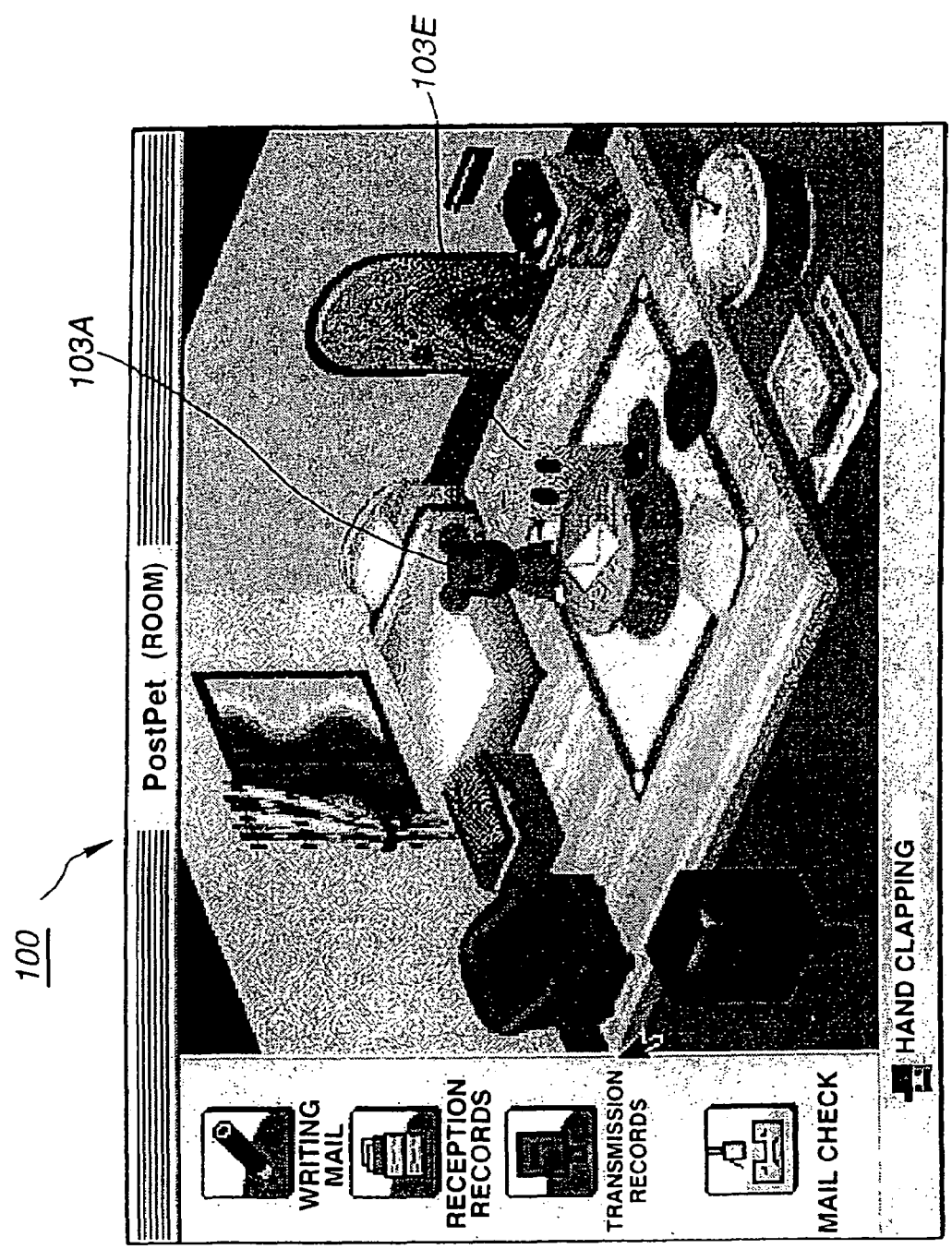
FIG. 57 shows a GUI picture of the 'PostPet (Room)' in which Hatena-kun made debut.

In the post pet, the picture data of the pet are stored in the local disc of the user, so that, if the number of pet types is increased in future, these new pets cannot be represented. Thus, picture data of a character 'hatena-kun' (Mr. Question) shown in FIG. 4 is used. That is, if a mail is sent by a post pet of a newly defined character to a user having only picture data of Teddy bear 103A, tortoise 103B, a hybrid cat 103C, and a mini-rabbit 103D, the hatena-kun 103E is displayed, as shown in FIG. 57. Thus, it is possible with the post pet to cope with an increased number of the pets by using the hatena-kun 103E, or adding new pets.

Although the foregoing description has been made in connection with application of the present invention to the Internet, the present invention can be applied to a mail communication system exploiting a personal handy phone or other mobile communication terminals capable of supporting the mail communication on the Intranet or PHS Internet Access Forum Standard (PIAFS), in addition to mail exchange on the Internet.

Although the present invention has been described with reference to specific embodiments, those of skill in the art will recognize that changes may be made thereto without departing from the spirit and scope of the invention as set forth in the hereafter appended claims.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A computer readable medium for providing a virtual agent executable on a processor for controlling the virtual agent, wherein the agent includes at least one inner parameter and at least one outer parameter, wherein the medium stores a first agent parameter controlling a first agent kept by a first person a first computer operated by the first person; stores a first image data of the first agent on the first computer; stores a second image data of a second agent being kept by second person on the first computer; stores a state of the first agent in a first storage device; displays the first agent on a first screen connected to the first computer based on the first image data and the first agent parameter when the state of the first agent represents other than an absent state; and wherein the first agent parameter is sent to the first computer through a communication network; sets the state of the first agent to an absent state corresponding to sending the first agent parameter.

2. The computer readable medium according to claim 1, wherein a behavior of the virtual agent is determined by one of the agent parameters sent via E-mail.

3. A computer readable medium for providing a virtual agent executable on a processor for controlling the virtual agent, wherein the agent includes at least one inner parameter and at least one outer parameter, wherein a first agent parameter is stored in a first storage device, the first agent parameter controlling a first virtual agent kept by a first person; wherein the first agent parameter is transferred from the first storage device to a first memory for controlling the first agent at a first computer operated by the first person; wherein a state of the first agent is stored in the first storage device; and wherein the first agent parameter is sent from the first memory to a second computer remote from both the first storage and the first computer through a communication network; wherein the state of the first agent is set to an absent state corresponding to sending the first agent parameter; and wherein the first agent is displayed on a display unit when the state represents other than the absent state.

4. The computer readable medium according to claim 3, wherein a behavior of the virtual agent is determined by one of the agent parameters sent via E-mail.

5. A computer readable medium for providing a virtual agent executable on a processor for controlling the virtual agent, wherein the agent includes at least one inner parameter and at least one outer parameter, wherein a first agent parameter at a first computer operated by a first person is sent to a second computer remote from the first computer through a communication network, wherein the second computer is operated by a second person and the first agent parameter controls a first agent kept by the first person; wherein a state of the first agent is stored in the first storage device; wherein the first agent parameter sent from the second computer is received using the first computer; wherein a second agent parameter sent from second computer is received using the first computer, the second agent parameter controlling a second virtual agent kept by the second person; and wherein the received second agent parameter is sent to the second computer using the first computer; wherein the state of the first agent is set to an absent state corresponding to sending the first agent parameter; and wherein the first agent is displayed on a display unit when the state represents other than the absent state.

6. The computer readable medium according to claim 5, wherein a behavior of the virtual agent is determined by one of the agent parameters sent via E-mail.

* * * * *